US012652520B2

(12) United States Patent
Kumar et al.

(10) Patent No.: US 12,652,520 B2
(45) Date of Patent: Jun. 9, 2026

(54) CONSENT MANAGEMENT PROCEDURES FOR WIRELESS DEVICES

(71) Applicant: QUALCOMM Incorporated, San Diego, CA (US)

(72) Inventors: Rajeev Kumar, San Diego, CA (US); Gavin Bernard Horn, La Jolla, CA (US); Olufunmilola Omolade Awoniyi-Oteri, San Diego, CA (US); Aziz Gholmich, Del Mar, CA (US); Soo Bum Lee, San Diego, CA (US); Giridhar Dhati Mandyam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 403 days.

(21) Appl. No.: 17/825,946

(22) Filed: May 26, 2022

(65) Prior Publication Data

US 2023/0413032 A1 Dec. 21, 2023

(51) Int. Cl.
*H04W 8/18* (2009.01)
*H04W 12/06* (2021.01)

(52) U.S. Cl.
CPC ........... *H04W 8/183* (2013.01); *H04W 12/06* (2013.01)

(58) Field of Classification Search
CPC ..... H04W 8/183; H04W 12/06; H04W 12/08; H04W 12/10; G06F 21/10; G06F 21/60; H04L 63/04; H04L 63/10
See application file for complete search history.

(56) References Cited

U.S. PATENT DOCUMENTS

| | | | | |
|---|---|---|---|---|
| 11,216,623 B1* | 1/2022 | Hart | ..................... | G06Q 20/382 |
| 2014/0351368 A1* | 11/2014 | Dudziak | ............. | H04W 12/084 |
| | | | | 709/217 |
| 2019/0392162 A1* | 12/2019 | Stern | ................... | G06F 21/6245 |
| 2020/0280854 A1* | 9/2020 | Kunz | ............... | H04W 12/0431 |
| 2021/0075782 A1* | 3/2021 | Dunjic | ................... | G06F 9/4451 |
| 2021/0204207 A1* | 7/2021 | Fiorese | ................. | H04L 67/146 |
| 2021/0234869 A1* | 7/2021 | Bondugula | ......... | H04L 63/0254 |
| 2021/0390196 A1* | 12/2021 | Lavine | .................. | H04L 63/102 |
| 2022/0095240 A1* | 3/2022 | Ying | ................... | H04B 17/336 |
| 2022/0141662 A1* | 5/2022 | Liao | ..................... | H04W 12/37 |
| | | | | 726/1 |
| 2022/0225093 A1* | 7/2022 | Sasi | ..................... | H04W 12/06 |

(Continued)

FOREIGN PATENT DOCUMENTS

| | | | | | |
|---|---|---|---|---|---|
| CN | 119156847 A | * | 12/2024 | ............. | H04W 12/08 |
| WO | WO-2022026482 A1 | * | 2/2022 | ............. | H04L 43/04 |

OTHER PUBLICATIONS

International Search Report and Written Opinion—PCT/US2023/067121—ISA/EPO—Jul. 10, 2023.

*Primary Examiner* — Nizar N Sivji
(74) *Attorney, Agent, or Firm* — Holland & Hart LLP

(57) ABSTRACT

Methods, systems, and devices for wireless communication are described. A user equipment (UE) may transmit, to a network entity, a consent profile registration request, the consent profile registration request identifying a user identifier. The UE may transmit, to the network entity, a consent profile based at least in part on the consent profile registration request, the consent profile comprising one or more consent types for the user identifier that configure one or more consent parameters for the user identifier on a least a per-user basis.

21 Claims, 26 Drawing Sheets

(56) References Cited

U.S. PATENT DOCUMENTS

| | | | |
|---|---|---|---|
| 2022/0377810 A1* | 11/2022 | Bhamri | H04B 7/06966 |
| 2023/0130252 A1* | 4/2023 | Xu | H04M 15/8083 |
| | | | 455/405 |
| 2023/0362640 A1* | 11/2023 | Edge | H04B 7/1851 |
| 2024/0073109 A1* | 2/2024 | Vaishnavi | H04L 41/5058 |
| 2024/0214365 A1* | 6/2024 | Li | H04L 9/0891 |

* cited by examiner 400-a 400-b 130        105        115

Network
Entity

Transceiver        Antenna 1810        1815

Communications
Manager

Memory

Code

1830

1820        1825

1840

Processor

1835

1805

1800

Receiver

1910

Communications Manager

1920

Transmitter

1915

1905

1900

DGC Manager

2125

Update Manager

2135

Query Manager

2130

2120

2100

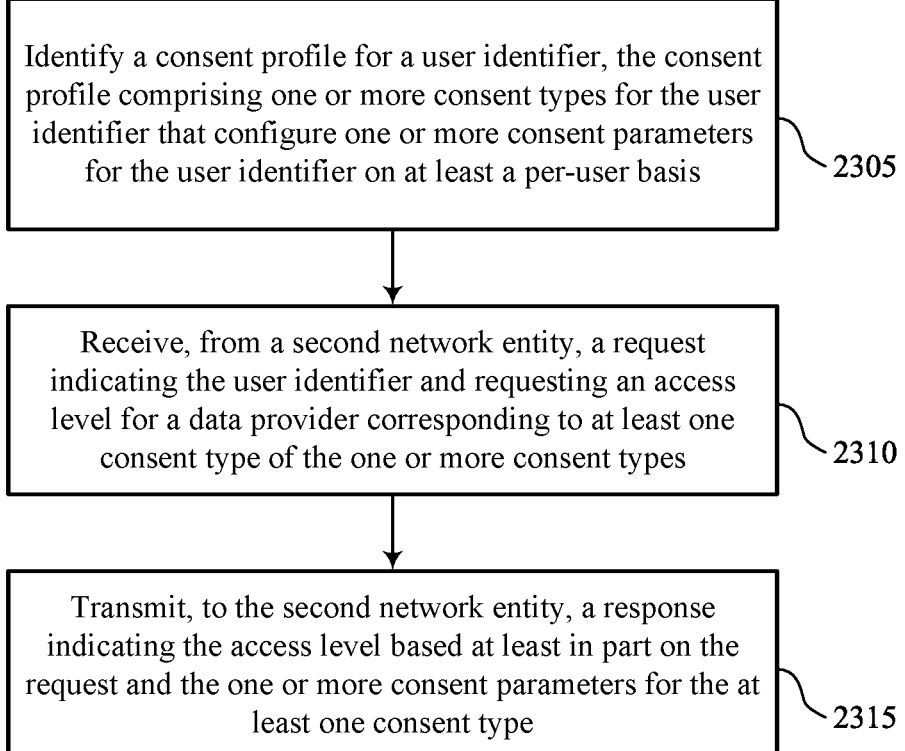

Identify a consent profile for a user identifier, the consent profile comprising one or more consent types for the user identifier that configure one or more consent parameters for the user identifier on at least a per-user basis — 2305

Receive, from a second network entity, a request indicating the user identifier and requesting an access level for a data provider corresponding to at least one consent type of the one or more consent types — 2310

Transmit, to the second network entity, a response indicating the access level based at least in part on the request and the one or more consent parameters for the at least one consent type — 2315

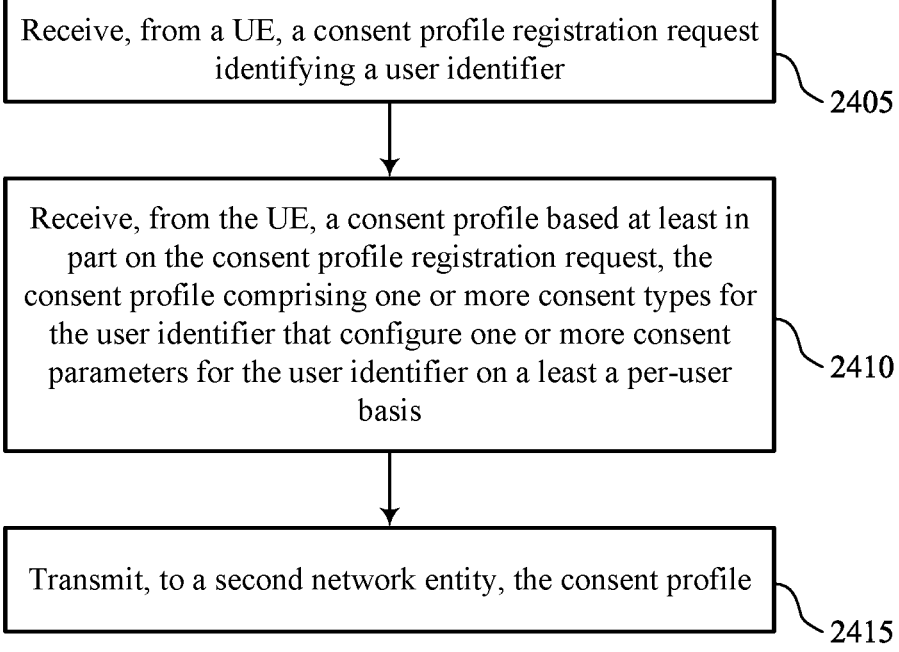

Receive, from a UE, a consent profile registration request identifying a user identifier

2405

Receive, from the UE, a consent profile based at least in part on the consent profile registration request, the consent profile comprising one or more consent types for the user identifier that configure one or more consent parameters for the user identifier on a least a per-user basis

2410

Transmit, to a second network entity, the consent profile

Figure 25:
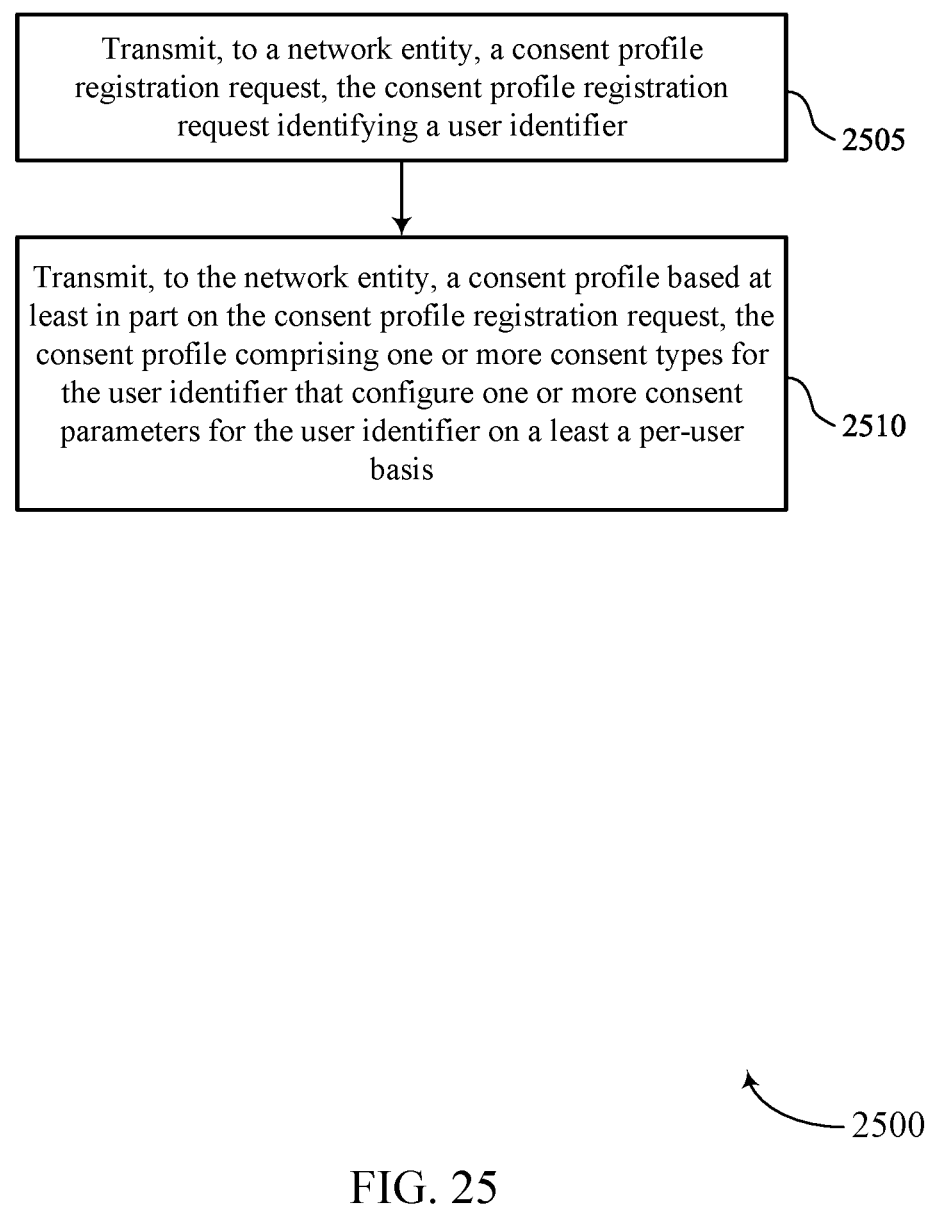

```
┌─────────────────────────────────────────┐
│   Transmit, to a network entity, a consent profile  │
│   registration request, the consent profile registration  │      2505
│   request identifying a user identifier  │
└─────────────────────────────────────────┘
                     │
                     ▼
┌─────────────────────────────────────────┐
│ Transmit, to the network entity, a consent profile based at  │
│ least in part on the consent profile registration request, the  │
│ consent profile comprising one or more consent types for  │
│ the user identifier that configure one or more consent  │      2510
│ parameters for the user identifier on a least a per-user  │
│ basis  │
└─────────────────────────────────────────┘
```

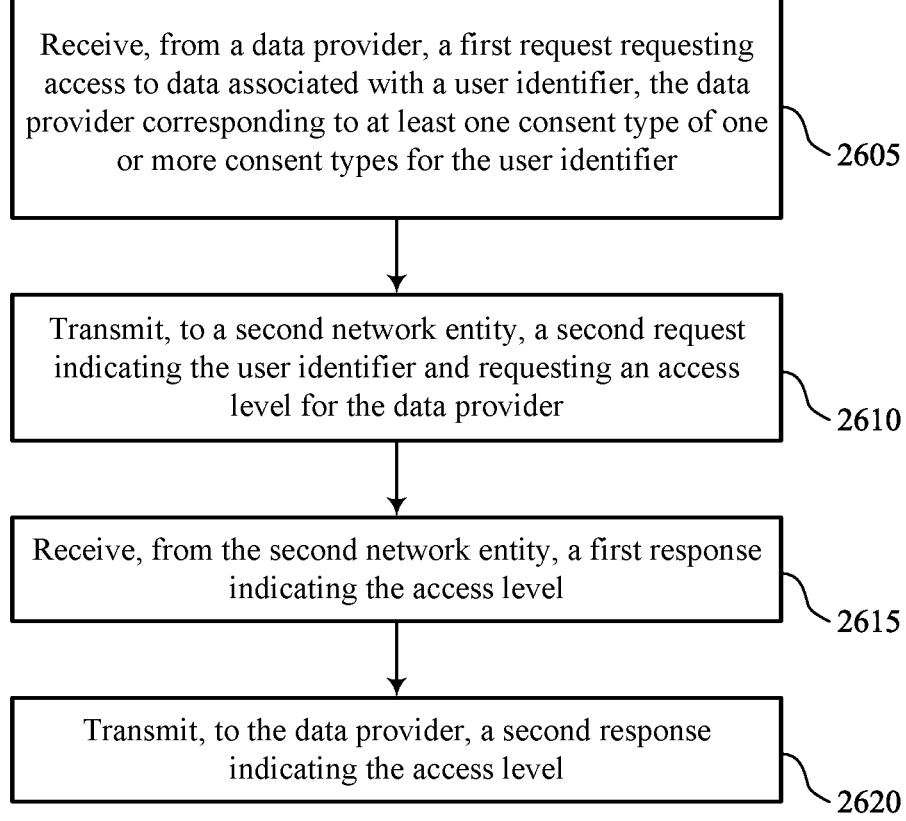

Receive, from a data provider, a first request requesting access to data associated with a user identifier, the data provider corresponding to at least one consent type of one or more consent types for the user identifier
2605

Transmit, to a second network entity, a second request indicating the user identifier and requesting an access level for the data provider
2610

Receive, from the second network entity, a first response indicating the access level
2615

Transmit, to the data provider, a second response indicating the access level
2620

CONSENT MANAGEMENT PROCEDURES FOR WIRELESS DEVICES

FIELD OF TECHNOLOGY

The following relates to wireless communication, including consent management procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support consent management procedures. For example, the described techniques provide for a consent platform implemented within a wireless network that improves consent management for user data. For example, aspects of the techniques described herein provide the consent platform implementing various network functions (e.g., network functions implemented via a network entity at least to some degree). The consent platform may include a data governance server (DGS) that provides an interface to the user or end-user to manage the user consent and query the network regarding active data processing, among other data governance procedures. The consent platform may include a consent profile storage per subscription (e.g., a unified data repository (UDR)), that hosts one or more consent profile per subscription basis within the network (e.g., within the network operators cloud network, a user equipment (UE) cloud, a core network, etc.). The consent profile(s) in UDR may be made available to different network function(s) and service(s) via a unified data management (UDM). The consent platform may include a consent profile storage shared across subscriptions (e.g., an end-user data repository (EUDR)), that hosts the consent profile(s) on a per-user (e.g., per end-user) basis and/or on a per-user per-device basis within the network. The consent profile(s) stored in EUDR may be implemented as part of UDR or separately from UDR. Similarly, an end-user data manager (EUDM) may be implemented as part of the UDM or separate from the UDM, with references to (E)UDM referring to either configuration (e.g., those implemented as part of the UDM or separate from the UDM). The consent platform may include a consent management function (CMF) that manages user consent within the network in real-time (e.g., dynamically).

For example, a first network entity (e.g., a network entity coupled with the (E)UDM, in this example) may identify, store, or otherwise manage aspects of a consent profile for a user identifier (ID), such as an identifier associated with a user/end-user. Broadly, the consent profile may include one or multiple consent types for the user ID. In some aspects, each consent type may broadly configure consent parameter(s) for the user identifier, such as on a per-user or end-user basis. The first network entity may receive, obtain, or otherwise identify a request indicating the user identifier from a second network entity (e.g., the CMF in this example). In some aspects, the request may carry or otherwise convey a request for an access level for a data provider for at least one consent type. Accordingly, the first network entity may transmit, provide, or otherwise output a response to the second network entity indicating the access level. For example, the first network entity may use one or more of the consent types of the consent profile to identify or otherwise determine what, if any, level of access to the user's data that the data provider has. The response may indicate the access level in response to the request and the consent parameter(s) for the consent type(s).

In some examples, a first network entity (e.g., a network entity coupled with the DGS, in this example) may receive, obtain, or otherwise identify a consent profile registration request. The network entity may receive or otherwise obtain the request from the user, such as from a user equipment (UE) or other device of the user. The request may, in some examples, carry or otherwise convey an indication of the user ID. The first network entity in this example may receive or otherwise obtain (e.g., from the UE) the consent profile in response to the request. The consent profile may include consent type(s) for the user ID that configure consent parameter(s) for the user ID on the per-user basis. The first network device may transmit or otherwise provide the consent profile to a second network entity (e.g., the (E)UDM, in this example). Accordingly, the DGS may provision the consent profile for the user ID in cooperation with the (E)UDM.

In some examples, the device of the user (e.g., one of the user's UE(s) or other device(s)) may include a data governance client (DGC) (e.g., operating at the application layer within the wireless network) that supports consent management functions for the user. For example, the UE may transmit or otherwise provide the consent profile registration request to a network entity (e.g., a network entity coupled with the DGS, in this example). The UE may transmit or otherwise provide the consent profile to the network entity in response to the request.

In some examples, a first network entity (e.g., a network entity coupled with the CMF, in this example) may receive or otherwise obtain a first request requesting access to the user's data. The first request may be obtained from a data provider, such as a data provider within the network or separate from the network. The data provider (e.g., alone or in combination with one or more consumers of the user's data) may correspond to or otherwise be associated with a consent type for the user ID. The first network entity may transmit or otherwise provide a second request indicating the user ID and requesting the access level for the user identifier (e.g., the access level of the data provider, or a data consumer initiating the first request). The second request may be provided to a second network entity (e.g., the UDM/EUDM, in this example). The first network entity may receive or otherwise obtain a first response from the second network entity indicating the requested access level and transmit or otherwise provide a second response to the data provider indicating the access level.

A method for wireless communication at a first network entity is described. The method may include identifying a consent profile for a user ID, the consent profile including one or more consent types for the user ID that configure one or more consent parameters for the user ID on at least a per-user basis, receiving, from a second network entity, a request indicating the user ID and requesting an access level for a data provider corresponding to at least one consent type of the one or more consent types, and transmitting, to the second network entity, a response indicating the access level based on the request and the one or more consent parameters for the at least one consent type.

An apparatus for wireless communication at a first network entity is described. The apparatus may include a processor, memory coupled with the processor, and instructions stored in the memory. The instructions may be executable by the processor to cause the apparatus to identify a consent profile for a user ID, the consent profile including one or more consent types for the user ID that configure one or more consent parameters for the user ID on at least a per-user basis, receive, from a second network entity, a request indicating the user ID and requesting an access level for a data provider corresponding to at least one consent type of the one or more consent types, and transmit, to the second network entity, a response indicating the access level based on the request and the one or more consent parameters for the at least one consent type.

Another apparatus for wireless communication at a first network entity is described. The apparatus may include means for identifying a consent profile for a user ID, the consent profile including one or more consent types for the user ID that configure one or more consent parameters for the user ID on at least a per-user basis, means for receiving, from a second network entity, a request indicating the user ID and requesting an access level for a data provider corresponding to at least one consent type of the one or more consent types, and means for transmitting, to the second network entity, a response indicating the access level based on the request and the one or more consent parameters for the at least one consent type.

A non-transitory computer-readable medium storing code for wireless communication at a first network entity is described. The code may include instructions executable by a processor to identify a consent profile for a user ID, the consent profile including one or more consent types for the user ID that configure one or more consent parameters for the user ID on at least a per-user basis, receive, from a second network entity, a request indicating the user ID and requesting an access level for a data provider corresponding to at least one consent type of the one or more consent types, and transmit, to the second network entity, a response indicating the access level based on the request and the one or more consent parameters for the at least one consent type.

Some examples of the method, apparatuses, and non-transitory computer-readable medium described herein may further include operations, features, means, or instructions for storing the consent profile and a subscription ID for the user ID in a UDM entity, where the first network entity includes the UDM entity.

Some examples of the method, apparatuses, and non-transitory computer-readable medium described herein may further include operations, features, means, or instructions for storing a subscription ID for the user ID in a UDM entity and the consent profile for the user ID in an end-user UDM entity, where the first network entity includes the end-user UDM entity.

Some examples of the method, apparatuses, and non-transitory computer-readable medium described herein may further include operations, features, means, or instructions for receiving a consent profile ID from a third network entity associated with the first network entity, where identifying the consent profile for the user ID may be based on receiving the consent profile ID.

In some examples of the method, apparatuses, and non-transitory computer-readable medium described herein, the consent profile ID maps the consent profile to a user associated with the user ID at a UE.

Some examples of the method, apparatuses, and non-transitory computer-readable medium described herein may further include operations, features, means, or instructions for receiving an update message identifying updated parameters for at least one consent type of the one or more consent types and updating the one or more consent parameters for at least one consent type of the consent profile based on the update message.

In some examples of the method, apparatuses, and non-transitory computer-readable medium described herein, the update message may be received from a third network entity or a UE associated with a consent profile ID of the consent profile.

Some examples of the method, apparatuses, and non-transitory computer-readable medium described herein may further include operations, features, means, or instructions for receiving, from the second network entity, an update message identifying an updated end-user device associated with the user ID and updating the one or more consent parameters for the user ID to include the updated end-user device based on the update message.

In some examples of the method, apparatuses, and non-transitory computer-readable medium described herein, a subscription ID associated with the user ID includes a fifth generation subscription permanent ID.

In some examples of the method, apparatuses, and non-transitory computer-readable medium described herein, a subscription ID associated with the user ID includes a generic public subscription ID.

In some examples of the method, apparatuses, and non-transitory computer-readable medium described herein, the user ID may be associated with a subscription ID, a consent profile ID, or both.

In some examples of the method, apparatuses, and non-transitory computer-readable medium described herein, the consent profile and a consent profile ID of the consent profile may be determined based on a result of a Fast Identity Online (FIDO) authentication procedure for a user associated with the user ID.

A method for wireless communication at a first network entity is described. The method may include receiving, from a UE, a consent profile registration request identifying a user ID, receiving, from the UE, a consent profile based on the consent profile registration request, the consent profile including one or more consent types for the user ID that configure one or more consent parameters for the user ID on a least a per-user basis, and transmitting, to a second network entity, the consent profile.

An apparatus for wireless communication at a first network entity is described. The apparatus may include a processor, memory coupled with the processor, and instructions stored in the memory. The instructions may be executable by the processor to cause the apparatus to receive, from a UE, a consent profile registration request identifying a user ID, receive, from the UE, a consent profile based on the consent profile registration request, the consent profile including one or more consent types for the user ID that configure one or more consent parameters for the user ID on a least a per-user basis, and transmit, to a second network entity, the consent profile.

Another apparatus for wireless communication at a first network entity is described. The apparatus may include means for receiving, from a UE, a consent profile registration request identifying a user ID, means for receiving, from the UE, a consent profile based on the consent profile registration request, the consent profile including one or more consent types for the user ID that configure one or more consent parameters for the user ID on a least a per-user basis, and means for transmitting, to a second network entity, the consent profile.

A non-transitory computer-readable medium storing code for wireless communication at a first network entity is described. The code may include instructions executable by a processor to receive, from a UE, a consent profile registration request identifying a user ID, receive, from the UE, a consent profile based on the consent profile registration request, the consent profile including one or more consent types for the user ID that configure one or more consent parameters for the user ID on a least a per-user basis, and transmit, to a second network entity, the consent profile.

Some examples of the method, apparatuses, and non-transitory computer-readable medium described herein may further include operations, features, means, or instructions for receiving, from the UE, a data collection query requesting a data access status associated with a user associated with a consent profile ID of the consent profile, transmitting, to a third network entity, the data collection query and the user ID, receiving, from the third network entity, a data collection response based on the data collection query and the user ID, the data collection response identifying a data provider accessing data associated with the consent profile, and transmitting, to the UE, the data collection response based on the data collection query.

A method for wireless communication at a UE is described. The method may include transmitting, to a network entity, a consent profile registration request, the consent profile registration request identifying a user ID and transmitting, to the network entity, a consent profile based on the consent profile registration request, the consent profile including one or more consent types for the user ID that configure one or more consent parameters for the user ID on a least a per-user basis.

An apparatus for wireless communication at a UE is described. The apparatus may include a processor, memory coupled with the processor, and instructions stored in the memory. The instructions may be executable by the processor to cause the apparatus to transmit, to a network entity, a consent profile registration request, the consent profile registration request identifying a user ID and transmit, to the network entity, a consent profile based on the consent profile registration request, the consent profile including one or more consent types for the user ID that configure one or more consent parameters for the user ID on a least a per-user basis.

Another apparatus for wireless communication at a UE is described. The apparatus may include means for transmitting, to a network entity, a consent profile registration request, the consent profile registration request identifying a user ID and means for transmitting, to the network entity, a consent profile based on the consent profile registration request, the consent profile including one or more consent types for the user ID that configure one or more consent parameters for the user ID on a least a per-user basis.

A non-transitory computer-readable medium storing code for wireless communication at a UE is described. The code may include instructions executable by a processor to transmit, to a network entity, a consent profile registration request, the consent profile registration request identifying a user ID and transmit, to the network entity, a consent profile based on the consent profile registration request, the consent profile including one or more consent types for the user ID that configure one or more consent parameters for the user ID on a least a per-user basis.

Some examples of the method, apparatuses, and non-transitory computer-readable medium described herein may further include operations, features, means, or instructions for transmitting, to the network entity, a data collection query requesting a data access status associated with the consent profile and receiving, from the network entity and based on the data collection query, a data collection response identifying a data provider accessing data associated with the consent profile.

Some examples of the method, apparatuses, and non-transitory computer-readable medium described herein may further include operations, features, means, or instructions for transmitting, to the network entity, an update message identifying updated parameters for at least one consent type of the one or more consent types and receiving, from the network entity and based on the update message, an updated confirmation message confirming the updated parameters for the at least one consent type.

A method for wireless communication at a first network entity is described. The method may include receiving, from a data provider, a first request requesting access to data associated with a user ID, the data provider corresponding to at least one consent type of one or more consent types for the user ID, transmitting, to a second network entity, a second request indicating the user ID and requesting an access level for the data provider, receiving, from the second network entity, a first response indicating the access level, and transmitting, to the data provider, a second response indicating the access level.

An apparatus for wireless communication at a first network entity is described. The apparatus may include a processor, memory coupled with the processor, and instructions stored in the memory. The instructions may be executable by the processor to cause the apparatus to receive, from a data provider, a first request requesting access to data associated with a user ID, the data provider corresponding to at least one consent type of one or more consent types for the user ID, transmit, to a second network entity, a second request indicating the user ID and requesting an access level for the data provider, receive, from the second network entity, a first response indicating the access level, and transmit, to the data provider, a second response indicating the access level.

Another apparatus for wireless communication at a first network entity is described. The apparatus may include means for receiving, from a data provider, a first request requesting access to data associated with a user ID, the data provider corresponding to at least one consent type of one or more consent types for the user ID, means for transmitting, to a second network entity, a second request indicating the user ID and requesting an access level for the data provider, means for receiving, from the second network entity, a first response indicating the access level, and means for transmitting, to the data provider, a second response indicating the access level.

A non-transitory computer-readable medium storing code for wireless communication at a first network entity is described. The code may include instructions executable by a processor to receive, from a data provider, a first request requesting access to data associated with a user ID, the data provider corresponding to at least one consent type of one or more consent types for the user ID, transmit, to a second network entity, a second request indicating the user ID and requesting an access level for the data provider, receive, from the second network entity, a first response indicating the access level, and transmit, to the data provider, a second response indicating the access level.

Some examples of the method, apparatuses, and non-transitory computer-readable medium described herein may further include operations, features, means, or instructions for transmitting, to the data provider, an indication to permit access to at least a portion of data associated with the user ID based on the second response, where at least the portion of the data may be based on the access level.

Some examples of the method, apparatuses, and non-transitory computer-readable medium described herein may further include operations, features, means, or instructions for receiving, from a second data provider, an access level request for data associated with at least one consent type for the user ID and transmitting, to the second data provider, an access level response indicating a second access level of the second data provider.

Some examples of the method, apparatuses, and non-transitory computer-readable medium described herein may further include operations, features, means, or instructions for identifying a set of one or more data consumers accessing data associated with the user ID according to the one or more consent types for the user ID.

Some examples of the method, apparatuses, and non-transitory computer-readable medium described herein may further include operations, features, means, or instructions for receiving, from the data provider, a deactivate request for a subset of the one or more consent types for the user ID and updating the access level for the data provider to a deactivated status based at lest in part on the deactivate request.

Some examples of the method, apparatuses, and non-transitory computer-readable medium described herein may further include operations, features, means, or instructions for receiving, from the second network entity, a revocation request for a subset of the one or more consent types for the user ID and updating the access level associated with the subset of the one or more consent types to a revoked status based on the revocation request.

Some examples of the method, apparatuses, and non-transitory computer-readable medium described herein may further include operations, features, means, or instructions for receiving, from the data provider, a dynamic access request message requesting access to a portion of data associated with the user ID, transmitting, to the second network entity, the dynamic access request message that identifies the portion of the data associated with the user ID and the at least one consent type of the one or more consent types, receiving, from the second network entity, a dynamic access response that authorizes or rejects access to the portion of the data associated with the user ID, and transmitting, to the data provider, the dynamic access response.

BRIEF DESCRIPTION OF THE DRAWINGS

FIGS. 23 through 26 show flowcharts illustrating methods that support consent management procedures in accordance with one or more aspects of the present disclosure.

DETAILED DESCRIPTION

Figure 1:
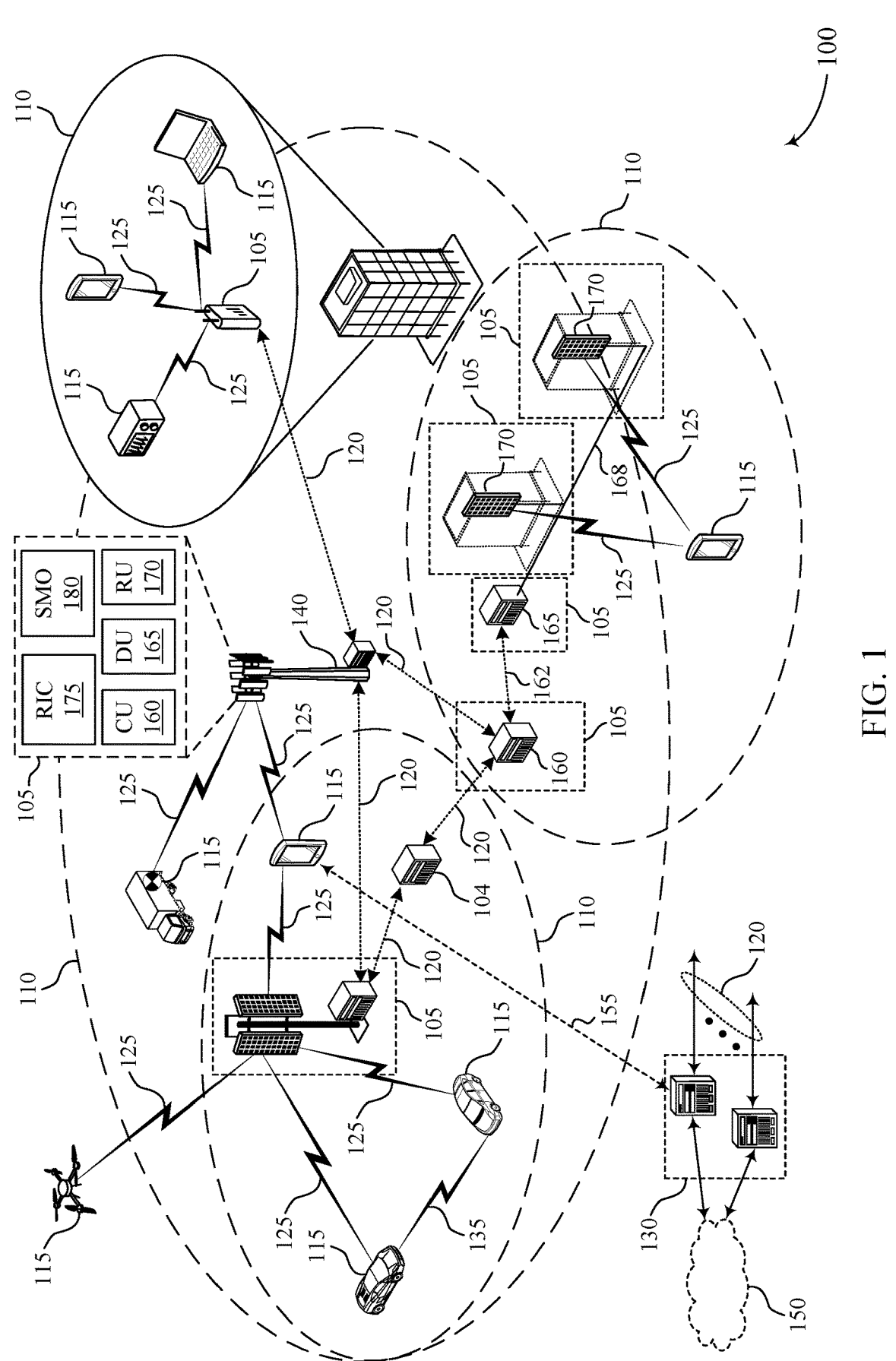
FIG. 1 illustrates an example of a wireless communications system that supports consent management procedures in accordance with one or more aspects of the present disclosure.

Wireless communications systems may benefit from data analytics to support enhanced mobile user experience. Such techniques generally leverage data or other information regarding a user (e.g., associated with a user identifier of the user) to improve products and services offered to the user. Such data analytics may involve user consent to manage access to the user's data, among other information. Other different networks generally define the user consent on a per subscription basis. For example, the user may subscribe, sign up to, to or otherwise access a service (e.g., a data consumer) and may grant access to the user's data as part of the subscription procedure. Based on the granted user consent, the service may access the user's data when providing the service to the user, which may be on an as-needed basis or a continuous access. However, such techniques are insufficient to address expanding user data as well as the nature of users of wireless communications (e.g., such as when the same user may be associated with multiple devices). Moreover, such techniques do not provide a mechanism supporting granular consent provisioning and management of the user's data across multiple services, using multiple devices, and the like. Moreover, such techniques limit the ability of the user to update or revoke the user's consent for data access.

Accordingly, aspects of the described techniques provide for a consent platform implemented within a wireless network that improves consent management for user data. For example, aspects of the techniques described herein provide a consent platform implementing various network functions (e.g., network functions implemented via a network entity at least to some degree). The consent platform may include a data governance server (DGS) that provides an interface to the user or end-user to manage the user consent and query the network regarding active data processing, among other data governance procedures. The consent platform may include a consent profile storage per-subscription (e.g., in a unified data repository (UDR)) that hosts one or more consent profiles within the network (e.g., on a per-subscription basis). The consent profile may include unified data management (UDM) that provides access to the consent profile(s) at the UDR to other network functions and services. The consent platform may include a consent profile storage shared across subscriptions (e.g., an end-user data repository (EUDR) that hosts the consent profile(s) per-user (e.g., per end-user) basis and/or per-user per-device basis within the network. The consent profile(s) stored in EUDR may be made available to the different network functions and services via UDM or end-user unified data management (EUDM). In some examples, EUDR may be implemented as part of UDR or separately from UDR. Similarly, the EUDM may be implemented as part of the UDM or separate from the UDM, with references to (E)UDM referring to either figuration (e.g., those implemented as part of the UDM or separate from the UDM). The consent platform may include a consent management function (CMF) that manages user consent within the network in real-time (e.g., dynamically). For example, a first network entity (e.g., a network entity coupled with the (E)UDM, in this example) may identify, store, or otherwise manage aspects of a consent profile for a user identifier (ID), such as an identifier associated with a user/end-user. Broadly, the consent profile may include one or multiple consent types for the user ID. In some aspects, each consent type may broadly configure consent parameter(s) for the user identifier, such as on a per-user or end-user basis. The first network entity may receive, obtain, or otherwise identify a request indicating the user identifier from a second network entity (e.g., the CMF in this example). In some aspects, the request may carry or otherwise convey a request for an access level for a data provider for at least one consent type. Accordingly, the first network entity may transmit, provide, or otherwise output a response to the second network entity indicating the access level. For example, the first network entity may use one or more of the consent types of the consent profile to identify or otherwise determine what, if any, level of access to the user's data that the data provider has. The response may indicate the access level in response to the request and the consent parameter(s) for the consent type(s).

In some examples, a first network entity (e.g., a network entity coupled with the DGS, in this example) may receive, obtain, or otherwise identify a consent profile registration request. The network entity may receive or otherwise obtain the request from the user, such as from a user equipment (UE) or other device of the user. The request may, in some examples, carry or otherwise convey an indication of the user ID. The first network entity in this example may receive or otherwise obtain (e.g., from the UE) the consent profile in response to the request. The consent profile may include consent type(s) for the user ID that configure consent parameter(s) for the user ID on the per-user basis. The first network device may transmit or otherwise provide the consent profile to a second network entity (e.g., the (E)UDM, in this example). Accordingly, the DGS may provision the consent profile for the user ID in cooperation with the (E)UDM.

In some examples, the device of the user (e.g., one of the user's UE(s) or other device(s)) may include a data governance client (DGC) (e.g., operating at the application layer within the wireless network) that supports consent management functions for the user. For example, the UE may transmit or otherwise provide the consent profile registration request to a network entity (e.g., a network entity coupled with the DGS, in this example). The UE may transmit or otherwise provide the consent profile to the network entity in response to the request.

In some examples, a first network entity (e.g., a network entity coupled with the CMF, in this example) may receive or otherwise obtain a first request requesting access to the user's data. The first request may be obtained from a data provider, such as a data provider within the network or separate from the network. The data provider (e.g., alone or in combination with one or more consumers of the user's data) may correspond to or otherwise be associated with a consent type for the user ID. The first network entity may transmit or otherwise provide a second request indicating the user ID and requesting the access level for the user identifier (e.g., the access level of the data provider, or a data consumer initiating the first request). The second request may be provided to a second network entity (e.g., the UDM/EUDM, in this example). The first network entity may receive or otherwise obtain a first response from the second network entity indicating the requested access level and transmit or otherwise provide a second response to the data provider indicating the access level.

Aspects of the disclosure are initially described in the context of wireless communications systems. Aspects of the disclosure are further illustrated by and described with reference to apparatus diagrams, system diagrams, and flowcharts that relate to consent management procedures.

FIG. 1 illustrates an example of a wireless communications system 100 that supports consent management procedures in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support consent management procedures as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrow-band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multipanel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A network entity 105 (e.g., a first network entity, which may include a (E)UDM in this example) may identify a consent profile for a user ID, the consent profile comprising one or more consent types for the user ID that configure one or more consent parameters for the user ID on at least a per-user basis. The network entity 105 may receive, from a second network entity (e.g., a CMF and/or DGS in this example), a request indicating the user ID and requesting an access level for a data provider corresponding to at least one consent type of the one or more consent types. The network entity 105 may transmit, to the second network entity, a response indicating the access level based at least in part on the request and the one or more consent parameters for the at least one consent type.

A network entity 105 (e.g., a first network entity, which may include a DGS in this example) may receive, from a UE 115, a consent profile registration request identifying a user ID. The network entity 105 may receive, from the UE 115, a consent profile based at least in part on the consent profile registration request, the consent profile comprising one or more consent types for the user ID that configure one or more consent parameters for the user identifier on a least a per-user basis. The network entity 105 may transmit, to a second network entity (e.g., a (E)UDM in this example), the consent profile.

A UE 115 (e.g., a DGC implemented at the UE 115 in this example) may transmit, to a network entity 105 (e.g., a DGS), a consent profile registration request, the consent profile registration request identifying a user ID. The UE 115 may transmit, to the network entity 105, a consent profile based at least in part on the consent profile registration request, the consent profile comprising one or more consent types for the user ID that configure one or more consent parameters for the user IID on a least a per-user basis.

A network entity 105 (e.g., a first network entity, which may include a CMF in this example) may receive, from a data provider, a first request requesting access to data associated with a user ID, the data provider corresponding to at least one consent type of one or more consent types for the user ID. The network entity 105 may transmit, to a second network entity (e.g., a DGS and/or (E)UDM, in this example), a second request indicating the user ID and requesting an access level for the data provider. The network entity 105 may receive, from the second network entity, a first response indicating the access level. The network entity 105 may transmit, to the data provider, a second response indicating the access level.

Figure 2:
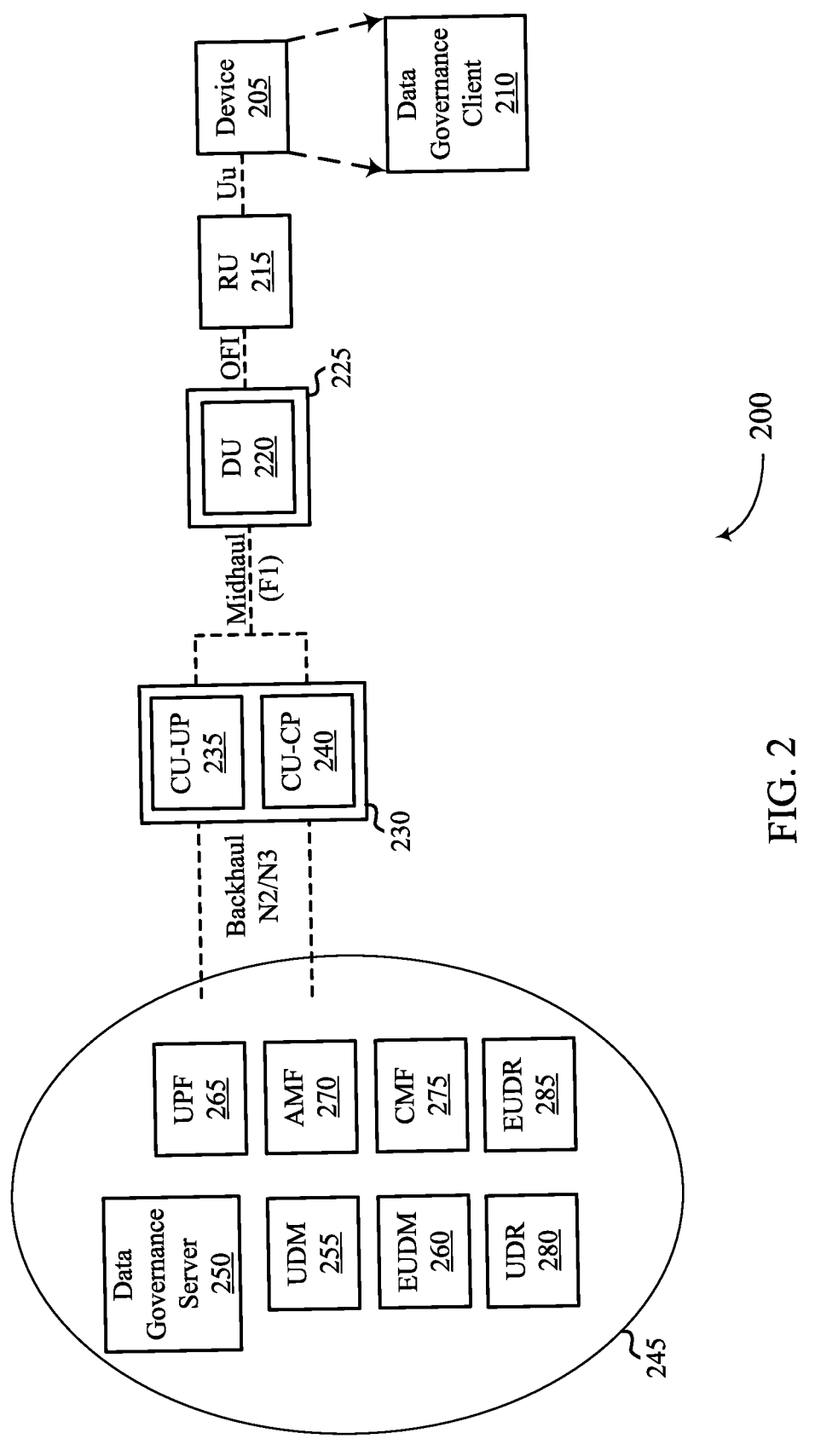
FIG. 2 illustrates an example of a wireless communications system that supports consent management procedures in accordance with one or more aspects of the present disclosure.

FIG. 2 illustrates an example of a wireless communications system 200 that supports consent management procedures in accordance with one or more aspects of the present disclosure. Wireless communications system 200 may implement aspects of wireless communications system 100.

Wireless communications system 200 may include device 205, RU 215, DU 220 of one or more DU 225, CU-UP 235 and CU-CP 240 of CU-230, and core network 245, which may be examples of the corresponding devices described herein. For example, device 205 may be an example of a UE or any other device associated with a user or end-user. In some aspects, RU 215, DU 220 of one or more DU 225, and/or CU-UP-235 and CU-CP 240 of CU 230 may be components or functions of, or otherwise support aspects of a network entity 105 discussed herein. In some examples, core network 245 may include a DGS 250, UDM 255, EUDM 260, UPF 265, AMF 270, CMF 275, UDR 280, and EUDR 285, which may be examples of the corresponding devices described herein. For example, DGS 250, UDM 255, EUDM 260, UPF 265, AMF 270, CMF 275, UDR 280, and EUDR 285 may be examples of one or more servers, functions, devices, or otherwise supported features within a core network. Although shown separately, it is to be understood that aspects, features, or other functionality of EUDM 260 may be implemented or otherwise performed at or by UDM 255. In some examples, UDR 280 may be accessed via UDM 255. In some examples, EUDR 285 may be accessed via UDM 255, or EUDM 260, or some combination of both.

Generally, device 205 may communicate via a Uu interface (e.g., a cellular interface) with a network entity, such as with RU 215 associated with the network entity. The RU 215 may communicate aspects of the wireless communications to one or more DU 225 via an open fronthaul interface (OFI), which communicate aspects of the communication to CU 230 via a midhaul interface (e.g., an F1 interface). CU 230 may communicate with core network 245 via a backhaul interface (e.g., a N2 interface, a N3 interface, etc.).

Advanced wireless networks—such as wireless communications system 200—may create new services and capabilities within a connected intelligent edge. The connected intelligent edge may generally include an integrated platform that distributes intelligence across the cloud, network and diverse devices. New applications and technology may converge into cloud connected devices, such as UE, IoT devices, etc.). A similar convergence may be supported at the edge and infrastructure (e.g., network, RSU, etc.). Such edge features may include connectivity (e.g., transporting data across networks), computing (e.g., hosting network functions across services, etc.), analytics, and security. Leveraging data analytics may provide support for new/ enhanced mobile experiences. Such edge security features may include providing data provenance (e.g., identity, attestation) and governance (e.g., security, privacy, consent).

Accordingly, aspects of such advanced wireless networks generally utilize consent from the user in support of data provenance and governance. Such user consent may generally apply in multiple scenarios, such as single user using a single device, a single user using multiple devices, a single device being used by multiple users, and/or multiple users spread across multiple devices.

There are different laws, regulations, and principles surrounding privacy/user consent across different countries and across different states/provinces within a country. For example, consent may use an affirmative action by the data subject (e.g., the user or end-user, who may be associated with one or more user IDs). The consent may be associated with the end-user (e.g., on a per-user basis, rather than with a specific device or on a per-device basis). The consent may be applied for specific purposes and may be withdrawn at any time. Moreover, the current use of data (e.g., the user's data and/or data associated with the user) may be queried by the data subject (e.g., dynamically or otherwise end-user initiated query).

However, legacy wireless networks are generally unable to support such new services and use cases. For example, such legacy networks may not provide for granular user consent parameters (e.g., the duration of the consent, the coverage area, etc.). Moreover, such legacy networks may not provide a unified set of procedures for addressing user consent for all services and use cases handled by or otherwise involving the wireless network. Conventional networks also may not support differentiation between the end-user and the device for consent for regulatory conformity.

Generally, user consent defines a specific and clear opt-in by the user to indicate permission to the processing and/or collection of the user's personal data for a specific purpose. User consent generally includes a data subject (e.g., a subscriber, such as an end-user or entity authorized by the end-user), a data controller (e.g., a data operator/provider that collects and stores the personal data and provides personal data to a data processor/consumer. The data processor/consumer may generally be part of the network operator or a third party that receives personal data from the data controller and returns a result. The user provides user consent for a service to the data controller for a service.

User consent is generally obtained from the end-user (e.g., the end-user and/or an entity authorized to provide consent on behalf of the end-user). Such consent is conventionally tied to the subscription information. The subscription information (e.g., a subscription ID) may be an example of globally unique 5G subscription permanent ID (SUPI) within a wireless network and/or an example of a generic public subscription ID (GPSI) outside of the wireless network. For example, the GPSI may be used for addressing the wireless network subscription (e.g., SUPI) when outside of the wireless network.

In other different systems, a UDM (such as UDM 255) supports retrieval of user consent parameters from UDR 280 and notification of user consent parameter change to UDR 280 related to user consent. That is, the user consent parameters are conventionally stored in the UDM/unified data repository (UDR) as subscription data that is bound to a SUPI/GPSI, bound to a specific purpose of data processing, and include whether the user consent is granted or not. User consent parameters are effective after consent is given and until revoked, although the UDM generally doesn't provide revocation services.

Access to user data generally involves a user consent check. For example, any network function (NF) (which may be examples of the data processor/consumer) deemed an enforcement point for user consent may support retrieval of the user consent parameters from the UDM, may not accept any services or requests for data processing unless user consent is granted, and the like. User consent is conventionally associated with a particular subscription, which may not be the end-user of the device. For example, personal identification information for a user on a per-use case basis may include the subscription ID and a user ID.

Accordingly, the described techniques provide for a consent platform implemented within wireless communications system 200, at least to some degree, that improves consent management for user data. For example, aspects of the techniques described herein provide a consent platform implementing various network functions (e.g., core network 245 functions implemented via a network entity, at least to some degree). The consent platform may include DGS 250 that provides an interface to the user or end-user to manage the user consent and query the network regarding active data processing, among other data governance procedures. The consent platform may include UDR 280 that hosts consent profile(s) within the core network 245 (e.g., on a per-subscription basis and/or a per-user basis). UDM 255 may access the consent profile(s) stored in UDR 280 within the network. The consent platform may include EUDR 285 that hosts the consent profile(s) within the core network (e.g., on a per-user basis, on a per-subscription basis, and/or on a per-user per-device basis). UDM 255 and/or EUDM 260 may access the consent profile(s) stored EUDR 285. In some examples, the EUDM 260 may be implemented as part of the UDM 255 or separate from the UDM 255 (as shown). The consent platform may include CMF 275 that manages user consent within the network in real-time (e.g., dynamically).

Aspects, of the consent platform support user consent requiring an affirmative action by the data subject, consent may be associated with the end-user vs the device (e.g., on a per-user basis), consent may be required for specific purposes, consent may be withdrawn at any time, and the current use of the data may be queried by the data subject. Broadly, consent management may refer to the management of a consent profile of the user (e.g., including registration and updates, such as revocation of consent). Consent enforcement may include enforcement of verification of the user's consent defined in the consent profile in order to perform data collection and processing (e.g., including dynamic consent updates and end-user switching). End-user authentication may include authentication of the end-user of the device (e.g., including on-boarding of the end-user(s), end-user switching, continuous authentication, etc.). A data processing query may generally include determining which service(s) are currently processing or collecting data for the user (e.g., associated with a subscription).

In some aspects, the consent platform may support (E)UDM (e.g., a first network entity in this example) identifying, storing, or otherwise managing aspects of a consent profile for a user ID, such as an identifier associated with a user/end-user. The consent profile may generally include the consent parameter(s) associated with a user ID. For example, the consent profile may include one or multiple consent types for the user ID, with each consent type broadly configuring the consent parameter(s) for the user ID. The user ID may generally be associated with a subscription ID (e.g., SUPI and/or GPSI) and an identifier of the consent profile (e.g., the consent profile ID).

In some examples, this may include the consent profile being provisioned or otherwise stored in the UDR 280 and/or EUDR 285. For example, the user ID may be for a subscriber (e.g., as identified by the subscriber ID, corresponding to SUPI or GPSI) and for the end-user (e.g., as identified using a consent profile ID of the consent profile). In other examples, the subscription ID for the user ID may be provisioned or otherwise stored in the UDR 280 with the consent profile for the user ID being provisioned or otherwise stored in EUDR 285. As discussed, in some examples UDM 255 and/or EUDM 260 may access aspects of the consent profile(s) stored in UDR 280 and/or EUDR 285 within the network.

The (E)UDM may receive, obtain, or otherwise identify a request indicating the user identifier from a second network entity (e.g., DGS 250 and/or CMF 275, in this example). In some aspects, the request may carry or otherwise convey a request for an access level for a data provider (e.g., a data controller/operator) for at least one consent type. Accordingly, the (E)UDM may transmit, provide, or otherwise output a response to the second network entity indicating the access level. For example, the (E)UDM may use the consent type(s) of the consent profile to identify or otherwise determine what, if any, level of access to the user's data that the data provider has. Additionally, or alternatively, the (E)UDM may simply convey some or all of the consent parameter(s) of the consent type to the second network entity. The response may indicate the access level and/or consent parameter(s) in response to the request.

In some aspects, the consent platform may support DGS 250 (e.g., a first network entity in this example) receiving, obtaining, or otherwise identifying a consent profile registration request. DGS 250 receive or otherwise obtain the request from the user, such as from device 205 or other device, such as a UE, of the user. The request may, in some examples, carry or otherwise convey an indication of the user ID. DGS 250 in this example may receive or otherwise obtain (e.g., from device 205) the consent profile in response to the request. Again, the consent profile may include consent type(s) for the user ID that configure consent parameter(s) for the user ID on the per-user basis, on a per-device basis, and/or on a per-subscription basis. DGS 250 may transmit or otherwise provide the consent profile to (E)UDM (e.g., a second network entity in this example). That is, DGS 250 may transmit or otherwise provide the consent profile for the user ID to be stored in UDM 255 and/or EUDM 260. Accordingly, DGS 250 may provision the consent profile for the user ID in cooperation with the (E)UDM.

In some aspects, this consent platform may support the device of the user (e.g., one of the user's UE(s), such as device 205 or other device(s)) implementing, supporting, or otherwise including a DGC 210 (e.g., operating at the application layer within the wireless network) that supports consent management functions for the user. For example, device 205 may transmit or otherwise provide the consent profile registration request to DGS 250 (e.g., a network entity in this example). Device 205 may transmit or otherwise provide the consent profile to DGS 250 in response to the request (e.g., to provision the consent profile of the user ID being stored within the (E)UDM).

In another example, the consent platform may support CMF 275 (e.g., a first network entity in this example) receiving or otherwise obtaining a first request requesting access to the user's data. The first request may be obtained from a data provider, such as a data provider within the network or separate from the network. The data provider (e.g., alone or in combination with one or more data processors/consumers of the user's data) may correspond to or otherwise be associated with a consent type for the user ID. That is, in some examples each consent type may correspond to a specific data processor/consumer, such as to provide granular consent provisioning and enforcement for each service/processor of the user's data. CMF 275 may transmit or otherwise provide a second request indicating the user ID and requesting the access level for the user identifier (e.g., the access level of the data provider, or a data processor/consumer associated with the first request). The second request may be provided to DGS 250 and/or (E)UDM (e.g., a second network entity in this example). The request may carry or otherwise convey an indication of the user ID, the consent profile (e.g., the consent profile ID), the subscription ID, etc.

CMF 275 may receive or otherwise obtain a first response from the second network entity indicating the requested access level and transmit or otherwise provide a second response to the data provider indicating the access level. That is, the second response may indicate the consent parameter(s) of the consent type, indicate an access granted or revoked, indicate a coverage area/period/etc. for the consent type, etc.

More particular examples of the features of the consent platform functionality are provided in the following discussions.

Figure 3:
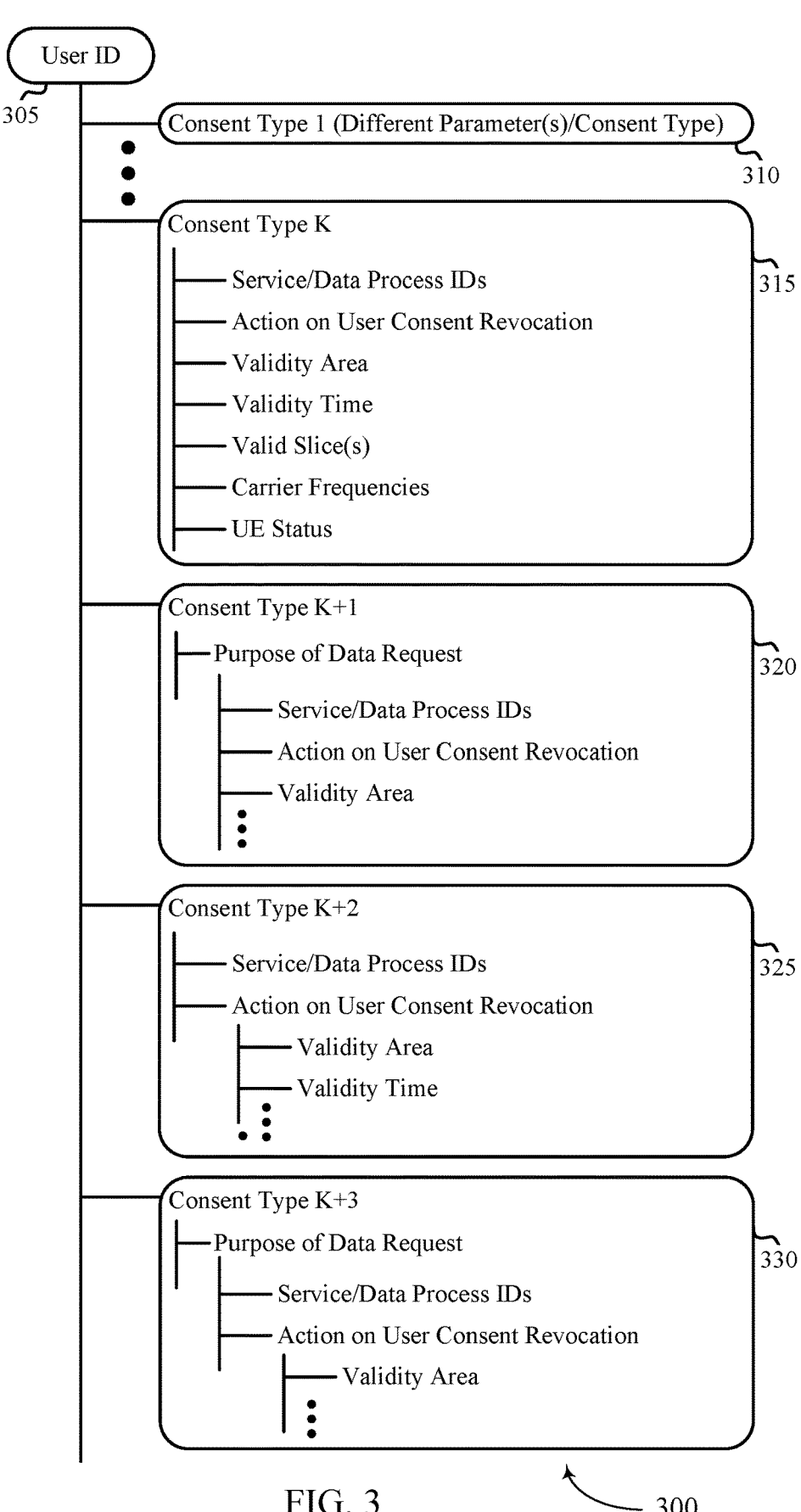
FIG. 3 illustrates an example of a consent profile that supports consent management procedures in accordance with one or more aspects of the present disclosure.

FIG. 3 illustrates an example of a consent profile 300 that supports consent management procedures in accordance with one or more aspects of the present disclosure. Consent profile 300 may implement aspects of wireless communications systems 100 and/or 200. Aspects of consent profile 300 may be implemented at or by a UE and/or a network entity, which may be examples of the corresponding devices described herein.

For example, aspects of the techniques described herein provide for provisioning a consent profile for a user ID 305 at a (E)UDM. The provisioning may include a UE (e.g., a DGC implemented at or by the UE, such as at an application layer), a DGS and/or the (E)UDM communicating various information configuring the consent profile for the user ID 305. Broadly, the provisioning may include the UE transmitting or otherwise conveying a consent profile registration request. The request may be transmitted or otherwise provided from the DGC of/at the UE to the DGS within the core network (e.g., to a network entity). The DGS may receive or otherwise obtain the request from the UE (or other device of the end-user) and, in response, receive or otherwise obtain the consent profile of the user ID 305. The DGS may transmit or otherwise provide the consent profile to the (E)UDM, which may store the consent profile for the user ID 305.

As discussed above, the user ID 305 may generally include or otherwise be associated with a subscription ID (e.g., SUPI and/or GPSI) and a consent profile ID, where the consent profile ID is an identifier of the consent profile.

Generally, the consent profile corresponding to user ID 305 may generally include one or more consent types, with consent type 310, consent type 315, consent type 320, consent type 325, and consent type 330 being shown by way of example only. Broadly, each consent type for the user ID 305 may include consent parameter(s) for the user ID 305 on a per-user basis and/or on a per-device basis. Each consent type may be separately configured (e.g., using different parameter(s)) for each subscription/use case. Each consent type may be separately or jointly enabled, activated, revoked, deactivated, etc. This may support granular consent provisioning/management/enforcement within the consent platform supporting a connected intelligent edge.

Consent type 310 broadly illustrates the feature where each consent type is associated with different consent parameters. That is, some or all of the consent type(s) in the consent profile may include different parameters, have parameters reconfigured to generate weighted/triggered parameters, etc. Accordingly, for different consent types, the end-user can have different granularity with the corresponding consent parameters.

Consent type 315 illustrates a consent type K, where K may correspond to an identifier of the consent type. Consent type K may generally include a plurality of consent parameters. A consent parameter of the consent type K may include a service data/processor ID, which may generally be identifier(s) for allowed and/or prohibited data processor(s)/consumer(s) (e.g., based on a corresponding subscription). Another consent parameter of the consent type K may include an action on user consent revocation, which may generally indicate the actions that the data processor(s)/consumer(s) are to take when the end-user revokes consent (e.g., erase, modify, stop, etc.). Another consent parameter of the consent type K may include a validity area, which may generally define the area in which the consent profile is applicable (e.g., within a public land mobile network (PLMN), within a radio access technology (RAT), within a radio network controller (RNC), within a target area, etc.

Another consent parameter of the consent type K may include a validity time, which may generally define timeline in which the user consent is applicable (e.g., such as the periodicity, time of the day/month/etc., start time, end time, etc.). Another consent parameter of the consent type K may include a valid slice, which may generally define the slice(s)/service(s) that the consent type is applicable for. Another consent parameter of the consent type K may include a carrier frequency, which may generally define the carrier frequencies that the consent type is applicable for. Another consent parameter of the consent type K may include a UE status, such as whether the consent profile is applicable for a particular UE status, such as when the UE operates in an active or connected state, operates in an inactive or idle state, etc. Consent type 315 generally illustrates an example where each consent parameters is equally listed within the consent type stored at (E)UDM.

Consent type 320 illustrates a consent type K+1, where K corresponds to an identifier of consent type 320. Consent type 320 includes similar consent parameters discussed with reference to consent type 315. However, consent type 320 may include a purpose of data request consent parameter, which generally defines the consent type 320 in terms of a threshold related to the purpose of the data request. That is, data processor(s)/consumer(s) may utilize a user's data for different purposes (e.g., tracking, ad preference updates, etc.). A request to access the user's data may include a purpose indication, which may be matched to the purpose of data request consent parameter. If the purpose indication matches the purpose of data request consent parameter, this may serve as an enabling threshold where the remaining consent parameters of consent type 320 are applied.

Consent type 325 illustrates a consent type K+2, where K corresponds to an identifier of consent type 325. Consent type 325 includes similar consent parameters discussed with reference to consent type 315 and consent type 320. However, consent type 325 may be configured such that the service/data process ID(s) consent parameter and the action on user consent revocation consent parameter are afforded equal weight. However, the action on user consent revocation consent parameter may be configured to serve as a threshold gate to the validity area consent parameter, the validity time consent parameter, etc., being applied.

Consent type 330 illustrates a consent type K+3, wherein K corresponds to an identifier of consent type 330. Consent type 330 includes similar parameters discussed with reference to consent type 315, consent type 320, and consent type 325. However, consent type 330 may be configured such that the purpose of data request serves as a threshold gate to the service/data process ID(s) consent parameter and the action on user consent revocation consent parameter. Further, the action on user consent revocation consent parameter serving as the threshold gate to the validity area and other consent parameters.

Accordingly, the consent profile of the user ID provisioned at the (E)UDM may include one or more consent types, with each consent type configuring or otherwise identifying consent parameters. The consent parameters may be differently configured within a consent type to enable granular user consent provisioning within or otherwise involving a wireless communications network.

Figure 4A:
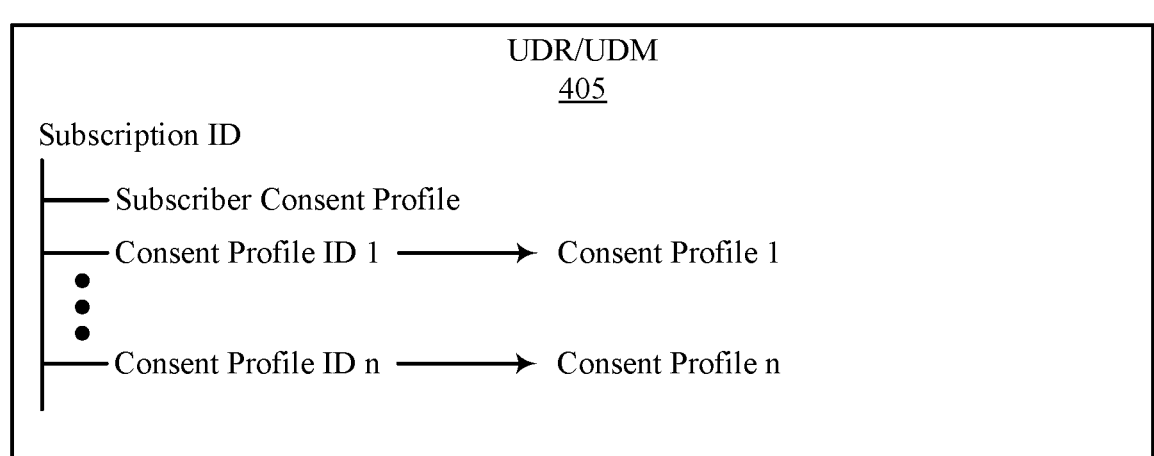
FIGS. 4A and 4B illustrate examples of a provisioning configuration that supports consent management procedures in accordance with one or more aspects of the present disclosure.
Figure 4B:
Figure 4B:
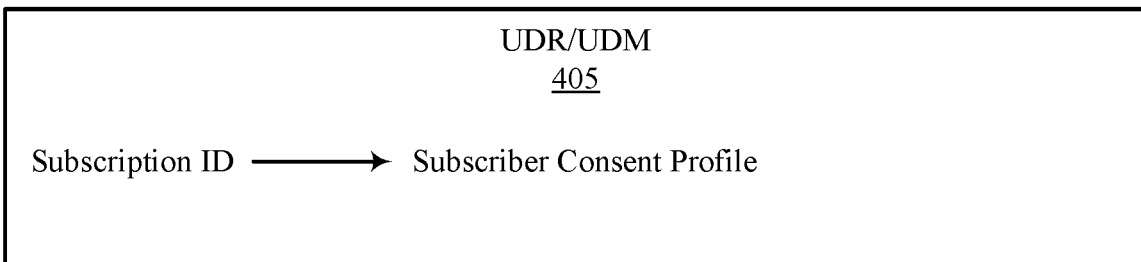
Figure 4B:
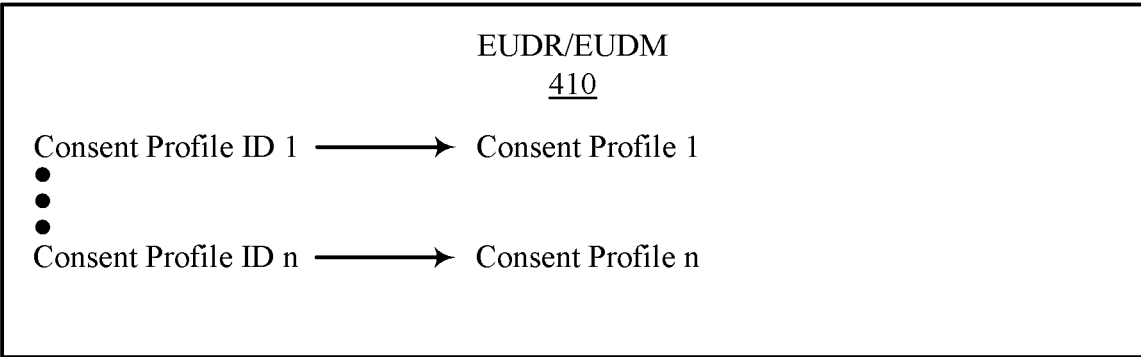

FIGS. 4A and 4B illustrate examples of a provisioning configuration 400 that supports consent management procedures in accordance with one or more aspects of the present disclosure. Provisioning configuration 400 may implement aspects of wireless communications systems 100 and/or 200, and/or aspects of consent profile 300. Aspects of provisioning configuration 400 may include UDR/UDM 405 and EUDR/EUDM 410, which may be examples of the corresponding devices described herein. For example, UDR/UDM 405 and/or EUDR/EUDM 410 may implement aspects of a consent platform within a wireless communications system. In some aspects, UDR/UDM 405 may refer to aspects of consent profile(s) stored or otherwise provisioned within a UDR and accessed via a UDM within the network on a per-subscription basis. In some aspects, EUDR/EUDM 410 may refer to aspects of consent profile(s) stored within a EUDR and accessed via a EUDM (or UDR in some examples) within the network on an across-subscription basis. Provisioning configuration 400-*a* of FIG. 4A illustrates an example where aspects of a consent profile for a user ID is provisioned or otherwise stored on/accessed by UDR/UDM 405 where provisioning configuration 400-*b* of FIG. 4B illustrates an example where aspects of the consent profile is provisioned or otherwise stored on/accessed by EUDR/EUDM 410.

For example, aspects of the techniques described herein provide for provisioning a consent profile for a user ID at a (E)UDM (e.g., stored at UDR/EUDR and accessed by (E)UDM). The provisioning may include a UE (e.g., a DGC implemented at or by the UE, such as at an application layer), a DGS and/or the (E)UDM communicating various information configuring the consent profile for the user ID. Broadly, the provisioning may include the UE transmitting or otherwise conveying a consent profile registration request. The request may be transmitted or otherwise provided from the DGC of/at the UE to the DGS within the core network (e.g., to a network entity). The DGS may receive or otherwise obtain the request from the UE (or other device of the end-user) and, in response, receive or otherwise obtain the consent profile of the user ID. The DGS may transmit or otherwise provide the consent profile to the (E)UDM, which may store the consent profile for the user at UDR/EUDR and access the consent profile by (E)UDM.

The user ID may generally include or otherwise be associated with a subscription ID (e.g., SUPI and/or GPSI) and a consent profile ID, where the consent profile ID is an identifier of the consent profile. The consent profile corresponding to the user ID may generally include consent type(s), where each consent type for the user ID may include consent parameter(s) for the user ID on a per-user basis and/or on a per-device basis. Each consent type may be separately configured (e.g., using different parameter(s)) for each subscription/use case. Each consent type may be separately or jointly enabled, activated, revoked, deactivated, etc. This may support granular consent provisioning/management/enforcement within the consent platform supporting a connected intelligent edge.

Provisioning configuration 400-*a* of FIG. 4A generally illustrates an example where the consent profile and the subscription ID of the user ID is stored or otherwise provisioned at the UDR/UDM 405. That is, the techniques and features discussed herein with respect to a separate EUDM may be adopted, supported, or otherwise implemented at the UDM. In particular, the DGS may transmit or otherwise provide to UDM the consent profile of the user ID. UDM may provision, store, or otherwise save consent profile(s) associated with a subscription ID (e.g., an identifier of a service, use case, data processor/consumer, etc., that the user has subscribed and consented to) at UDR/EUDR. For example, UDR may store the subscriber consent profile for the subscription ID, which may generally include information regarding the subscription information, the subscriber consent profile, etc. Under the subscription ID, UDR may store one or more consent profiles, with consent profiles 1-n being shown by way of example only. The UDM may access the consent profiles stored at UDR within the network.

Accordingly, provisioning configuration 400-*a* illustrates an example where the subscriber store (e.g., UDR/UDM 405) maintains the consent profile(s) on a per-subscription basis. The consent profile(s) may be for a subscriber (e.g., based, at least to some degree, on SUPI and/or GPSI), which may correspond to an end-user (e.g., as identified using the consent profile ID).

Provisioning configuration 400-*b* of FIG. 4B generally illustrates a different example where the subscription ID of the user ID is stored or otherwise provisioned at the UDR/UDMM 405, but the consent profile(s) of the user ID associated with the subscription ID are stored or otherwise provisioned at EUDR/EUDM 410. In particular, the DGS may transmit or otherwise provide to UDM the subscription ID of the user ID. UDM may provision, store, or otherwise save the subscription ID for the user ID at UDR. The DGS may also transmit or otherwise provide to EUDM the consent profile(s) of the user ID that are associated with the subscription ID stored at UDR/UDM 405. UDR/UDM 405 may store the subscriber consent profile for the subscription ID, which may generally include information regarding the subscription information, the subscriber consent profile, etc. EUDM 410 may provision, store, or otherwise save consent profile(s) associated with the subscription ID. For example and for the subscription ID, EUDR/EUDM 410 may store the subscriber consent profile(s) for the user ID that are associated with the subscription ID stored at UDR/UDM 405. EUDR may store one or more consent profiles, with consent profiles 1-n being shown by way of example only, for the user ID that are associated with the subscription ID. (E)UDM may access the consent profiles stored at EUDR within the network.

Accordingly, provisioning configuration 400-*b* illustrates an example where the subscriber store (e.g., UDR/UDM 405) maintains and accesses the consent profile for the subscriber (e.g., as identified using SUPI and/or GPSI). The end-user store (e.g., EUDR/EUDM 410) maintains and accesses the consent profile for the end-user (e.g., as identified using the consent profile ID across multiple subscriptions). Again, reference to the user ID may include both the subscription ID and the consent profile ID.

Figure 5:
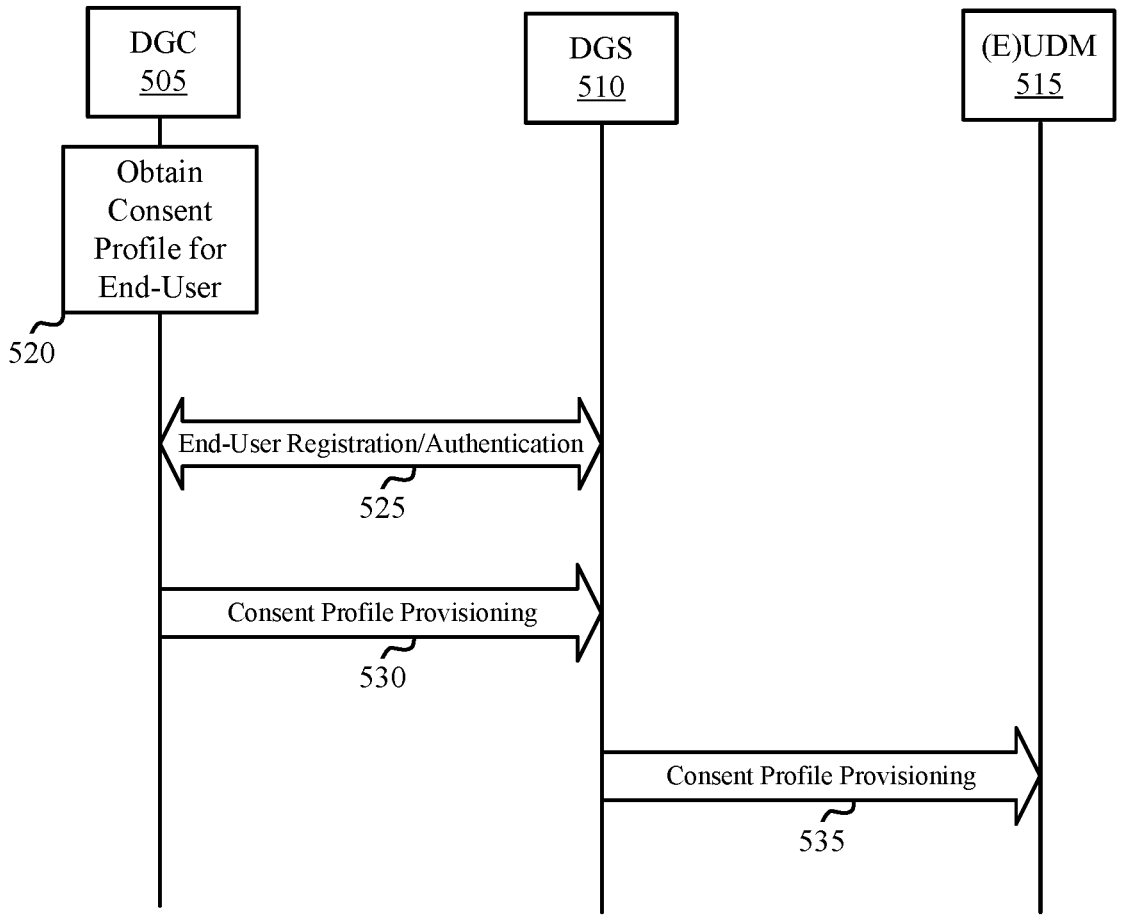
FIG. 5 illustrates an example of a method that supports consent management procedures in accordance with one or more aspects of the present disclosure.

FIG. 5 illustrates an example of a method 500 that supports consent management procedures in accordance with one or more aspects of the present disclosure. Method 500 may implement aspects of wireless communications systems 100 and/or 200, aspects of consent profile 300, and/or aspects of provisioning configuration 400. Aspects of method 500 may be implemented by or implemented at DGC 505, DGS 510, and (E)UDM 515, which may be examples of the corresponding devices described herein. For example, DGC 505 may refer to an application, feature, or other function operating at a device (e.g., a UE or some other device) of or otherwise associated with an end-user (e.g., operating at the application layer of the UE). DGC 505 may be a component within a consent platform that includes DGS 510 and/or (E)UDM 515 operating within a core network. Accordingly, references to a network entity may include DGS 510 and/or (E)UDM 515.

As discussed above, aspects of the techniques described herein provide for consent profile provisioning within a consent platform. Method 500 illustrates a non-limiting example of an overview of consent management by the end-user within the consent platform.

For example, at 520 DGC 505 may generally obtain, identify, or otherwise obtain a consent profile for the end-user. For example, the end-user may activate one or more applications, programs, or other functions at the end-user's device, such as DGC 505. In some examples, this may include the end-user initiating the consent registration at DGC 505. DGC 505 may support or otherwise facilitate the end-user entering various information related to the consent profile. For example, the consent profile may include one or more consent types, with each or some consent types being associated with specific subscriptions, associated with different user consent levels for different data access features of a subscription, and the like. The different consent types may also be configured differently, such as is illustrated in FIG. 3.

In some aspects, the user may use DGC 505 to configure user information for the consent profile, subscription information for the consent profile, consent information for the consent profile, and the like. For example, user information may include personal information regarding the end-user, such as personally identifying information (e.g., user biometrics, login name, password, etc.). Generally the personally identifying information may be used to confirm the identity of the end-user (e.g., during initial consent profile provisioning, during dynamic consent enforcement procedures, during end-user and/or subscriber initiated consent profile update procedures, etc.). The subscription information may generally identify the data processor/consumer that the end-user has subscribed to. For example, the subscription information may generally include a subscriber ID (or other information usable to identify and distinguish the subscribed service), an indication of the nature of service being subscribed to (e.g., how the user's data is to be used, what the end-user receives in exchange for access to the user's data, etc.), and the like. The consent profile information may include an indication of the access level the end-user consents to or otherwise grants to the subscriber when accessing the end-user's data, which end-user data the subscriber is allowed to access, and the like. In some examples, the consent information may include additional information, such as defining the action to be taken by the subscriber (e.g., data processor/consumer) when the end-user revokes the consent, the area(s)/time(s)/slice(s) in which the user's consent is valid, and the like.

DGC 505 may generally use the user information, the subscription information, and/or the consent information to generate consent parameters for the consent type(s) of the consent profile to be provisioned within the consent platform. Accordingly, at 525 DGC 505 and DGS 510 may exchange one or more messages during an end-user registration and authentication process. In some examples, the end-user registration and authentication process may be a Fast Identity Online (FIDO) online authentication procedure using public key cryptography. The FIDO procedure generally relies on the end-user authentication at the user's device. For example, the FIDO procedure may be based on the registered credentials of the end-user to prove that the current end-user is the same as when the FIDO credentials were used to register the service. However, it is to be understood that other end-user identification and authentication procedures may also be used to register and authenticate the end-user within the consent platform. In some examples, the consent profile ID may be, or be based on, a FIDO KeyID, an advertising ID such as a Google Advertising ID (GAID), an Android Advertising ID (AAID), etc., or some other ID derived during the end-user registration and authentication procedure.

In some examples, the consent profile (or one or more consent type(s) of the consent profile) may be associated with the device of the end-user (e.g., based on a device ID). Accordingly, in some examples the consent profile (or consent type(s)) may include a consent parameter associated with the end-user's device. However, it is to be understood that the consent platform discussed herein is not limited to a single end-user on a single device. Instead, the techniques described herein may be equally applicable to the end-user using multiple devices, where devices share consent type(s) and/or may use different consent type(s) of the consent profile. Moreover, the techniques described herein also support the end-user switching consent profiles to different devices. For example, a single end-user may create and register multiple consent profiles with different FIDO credentials. In this context, this may include DGC At 530, DGC 505 may generally provision the consent profile with DGS 510. For example, this may include DGC 505 transmitting or otherwise providing (and DGS 510 receiving or otherwise obtaining) a consent profile registration request. The request may carry or otherwise convey an indication of the user ID (e.g., consent profile ID and/or subscription ID). The request may carry or otherwise convey an indication of the consent profile. For example, the request may identify some or all of the consent parameters to be included in the consent profile. The consent type(s) may generally identify or otherwise configure the consent parameters for the consent profile of the user ID.

At 535, DGS 510 may generally provision the consent profile with (E)UDM 515. For example, this may include DGS 510 transmitting or otherwise providing (and (E)UDM 515 receiving or otherwise obtaining) the consent profile including the consent type(s). (E)UDM 515 may generally store, save, or otherwise maintain the consent profile for the end-user (e.g., for the user ID) to be used across the consent platform for consent management, consent enforcement, etc. For example, provisioning the consent profile at (E)UDM 515 may include DGS 510 transmitting or otherwise providing an indication of an identifier of the device of the end-user, the consent profile ID, and the like.

Figure 6:
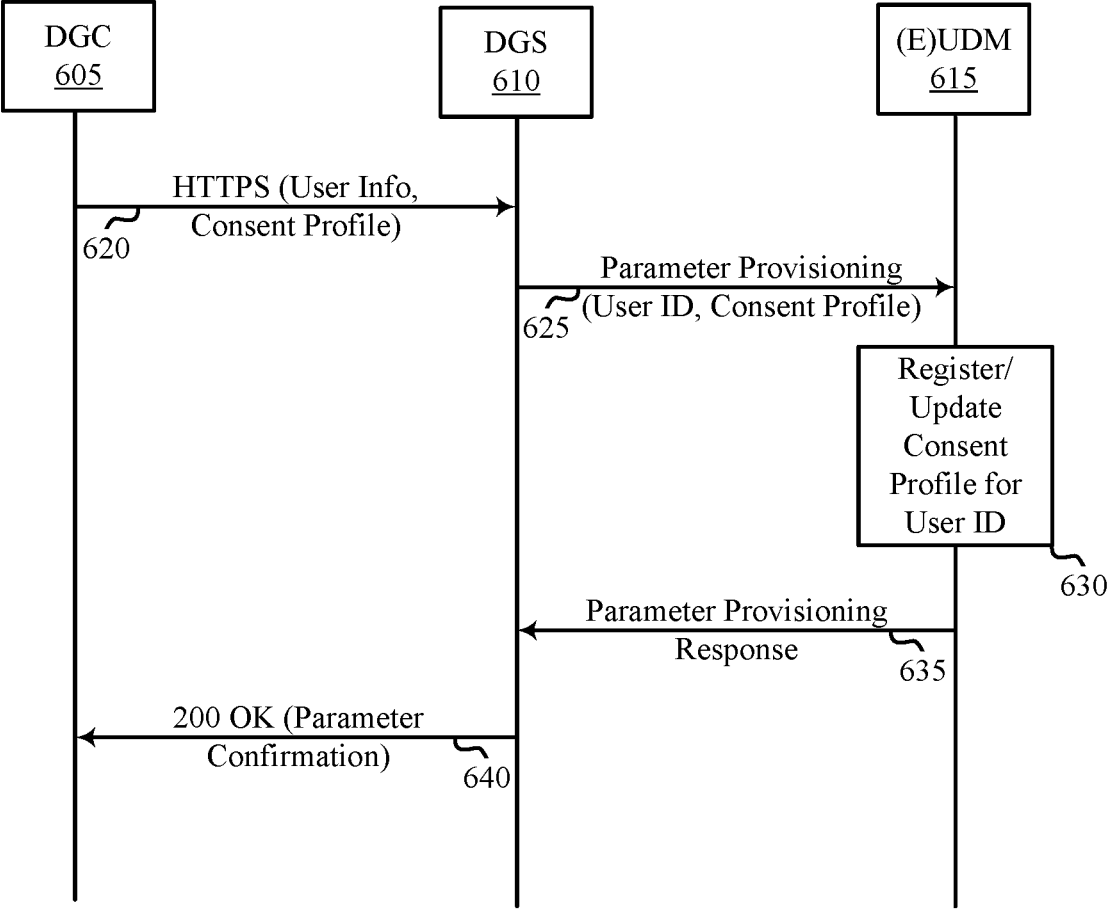
FIG. 6 illustrates an example of a method that supports consent management procedures in accordance with one or more aspects of the present disclosure.

FIG. 6 illustrates an example of a method 600 that supports consent management procedures in accordance with one or more aspects of the present disclosure. Method 600 may implement aspects of wireless communications systems 100 and/or 200, aspects of consent profile 300, aspects of provisioning configuration 400, and/or aspects of method 500. Aspects of method 600 may be implemented by or implemented at DGC 605, DGS 610, and (E)UDM 615, which may be examples of the corresponding devices described herein. For example, DGC 605 may refer to an application, feature, or other function operating at a device (e.g., a UE or some other device) of or otherwise associated with an end-user (e.g., operating at the application layer of the UE). DGC 605 may be a component or function within a consent platform that includes DGS 610 and/or (E)UDM 615 operating within a core network. Accordingly, references to a network entity may include DGS 610 and/or (E)UDM 615.

As discussed above, aspects of the techniques described herein provide for consent profile provisioning within a consent platform. Method 600 illustrates a non-limiting example of an overview of consent management by the end-user within the consent platform.

For example, at 620 DGC 605 may transmit or otherwise provide (and DGS 610 may receive or otherwise obtain) an HTTPS message (e.g., a consent profile registration request) that initiates the consent profile provisioning within the consent platform. In some examples, the HTTPS message (e.g., operating at the application layer of the UE or other user device implementing DGC 605) may carry or otherwise convey an indication of the user information (e.g., user ID, as well as other information of the end-user), an indication of the consent profile, and the like.

At 625, DGS 610 may transmit or otherwise provide (and (E)UDM 615 may receive or otherwise obtain) a parameter provisioning message that generally carries or otherwise conveys the user ID (e.g., based, at least to some degree on a FIDO registration and authentication process) and the consent profile. For example, the message may generally include the consent type(s) of the consent profile, with one, some, or all of the consent type(s) configuring consent parameter(s) for the consent profile of the user ID. As previously discussed, at 630 (E)UDM 615 may generally provision, store, or otherwise maintain the consent profile at a UDM within the consent platform or may store aspects of the consent profile (e.g., subscription ID) at the UDM and store other aspects of the consent profile at the EUDM.

At 635, (E)UDM 615 may transmit or otherwise provide (and DGS 610 may receive or otherwise obtain) a parameter provisioning response that generally confirms that the consent profile for the end-user has been provisioned at (E)UDM 615. At 640, DGS 610 may transmit or otherwise convey (and DGC 605 may receive or otherwise obtain) an OK message confirming provisioning of the consent profile at (E)UDM 615 for the end-user.

Accordingly, user consent is generally managed at the application layer within the consent platform between DGC 605 and DGS 610. This may include support for different elements (e.g., different consent types, different consent parameters within a consent type) of the consent profile being configured or otherwise provisioned. In some examples, support for special consent for minors may also be managed at the application layer within the consent platform.

Again, mapping user information to the user ID may be based on the subscription ID and the consent profile ID (e.g., the user ID consists of the subscription ID and the consent profile ID). The user ID uniquely identifies the subscription ID under which one or more consent profiles are provisioned or otherwise stored. The user ID may be used to associate the data subject (e.g., the end-user) to the user consent with the corresponding consent profile. The user ID may be defined as the subscription ID||consent profile ID. The user ID may be generated by the system (e.g., within the consent platform) and mapped to the corresponding {subscription ID, consent profile ID} pair. Again, examples of the subscription ID may include SUPI, GPSI, and the like.

The consent profile ID uniquely identifies a user at the DGS 610. The consent profile may be generated/assigned during the user registration and authentication process. The consent profile ID may be registered at DGS 610 and (E)UDM 615. The consent profile ID may be provided to the DGS 610 during a consent profile change (e.g., update) procedure.

It is to be understood that similar techniques may be applied to permit the end-user to update the consent parameter(s) of the consent type(s), the consent type(s) of the consent profile, and/or the consent profile itself. For example, DGC 605 may transmit or otherwise provide an update message to a network entity (e.g., DGS 610, in this example). The update message may generally identify updated parameter(s) (e.g., consent parameter(s) for one or more of the consent type(s) of the consent profile. DGS 610 may receive the update message and update the consent parameter(s) for the consent type(s) according to the update message. In other examples, one or more consent parameter(s) may be updated by the subscriber (e.g., the data provider(s) and/or data processor(s)/consumer(s)).

Figure 7:
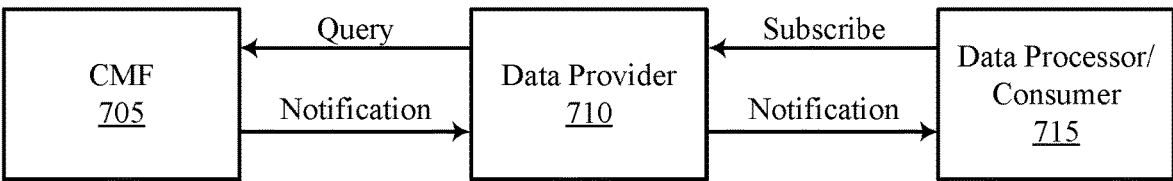
FIG. 7 illustrates an example of a consent management configuration that supports consent management procedures in accordance with one or more aspects of the present disclosure.

FIG. 7 illustrates an example of a consent management configuration 700 that supports consent management procedures in accordance with one or more aspects of the present disclosure. Consent management configuration 700 may implement aspects of wireless communications systems 100 and/or 200, aspects of consent profile 300, aspects of provisioning configuration 400, and/or aspects of methods 500 and/or 600. Aspects of consent management configuration 700 may be implemented by or implemented at CMF 705, data provider 710, and data processor/consumer 715, which may be examples of the corresponding devices described herein. For example, CMF 705 may refer to an application, feature, or other function operating within a consent platform. Accordingly, references to a network entity may include CMF 705.

As discussed above, aspects of the techniques described herein provide for consent profile provisioning within a consent platform. Consent management configuration 700 illustrates a non-limiting example of an overview of consent enforcement using the consent profile within the consent platform by CMF 705.

Data provider 710 generally includes a data provider service that provides access to data (e.g., the end-user's data) to one or more data processor(s)/consumer(s). Examples of the data provider 710 may include an AMF within the core network, but other component/functions of the core network that may monitor, obtain, or otherwise collect data or other information related to the end-user. Data provider 710 may generally provide a subscription service to the data processor/consumer (e.g., using one or more subscribe messages and responsive notification messages). Data processor/consumer 715 may generally refer to any entity or function that accesses, at least to some degree, the data or other information of the end-user. Data provider 710 and/or data processor/consumer 715 may generally be responsible for termination of the data collection procedure and/or retention or erasure of the end-user's data.

CMF 705 generally indicates the user consent for data access in real-time within the consent platform. For example, CMF 705 may subscribe to (E)UDM for notification services related to the consent profile of the user ID. CMF 705 may provide support for a query service to data provider 710 services to confirm consent to access a user's data (e.g., using one or more query/notification messages). CMF 705 may provide a notification service for data provider 710 services to allow a data provider to enforce consent for an end-user's data. CMF 705 may generally maintain a list of the network services that are currently access data for a user ID. For example, CMF 705 may support notifying the network services (e.g., data processor/consumer 715) when the consent profile has been changed.

Figure 8:
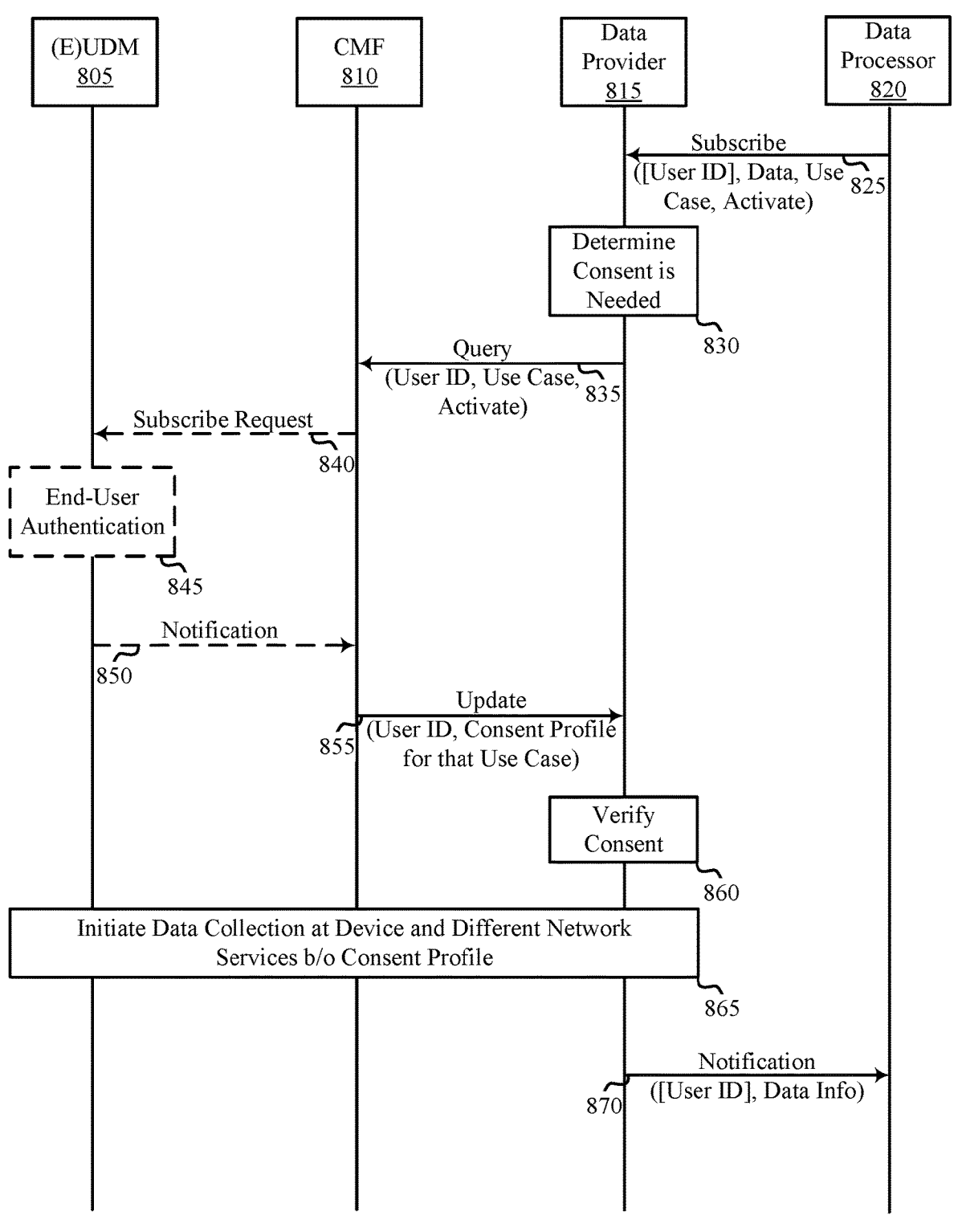
FIG. 8 illustrates an example of a method that supports consent management procedures in accordance with one or more aspects of the present disclosure.

FIG. 8 illustrates an example of a method 800 that supports consent management procedures in accordance with one or more aspects of the present disclosure. Method 800 may implement aspects of wireless communications systems 100 and/or 200, aspects of consent profile 300, aspects of provisioning configuration 400, aspects of methods 500 and/or 600, and/or aspects of consent management configuration 700. Aspects of method 800 may be implemented by or implemented at (E)UDM 805, CMF 810, data provider 815, and data processor 820 (e.g., a data processor/consumer), which may be examples of the corresponding devices described herein. For example, (E)UDM 805 and/or CMF 810 may refer to an application, feature, or other function operating within a consent platform. Accordingly, references to a network entity may include (E)UDM 805 and/or CMF 810.

As discussed above, aspects of the techniques described herein provide for consent profile provisioning within a consent platform. Consent management configuration 700 discussed above illustrates an example of an overview of consent enforcement using the consent profile within the consent platform by CMF 705. Method 800 illustrates a non-limiting example of an active request initiating consent enforcement within the consent platform. Broadly, data processor 820 may request data from data provider 815 and indicate the use case (e.g., data processor 820 may be an example of a third party accessing the end-user's data via a network exposure function (NEF)). That is, aspects of the consent profile provisioning and management within the consent platform may be defined at the NEF to expose the actual data, including the NEF's enforcement regarding whether the third party may access the end-user's data. Data provider 815 may generally determine if consent is required for the data requested for that use case. The consent profile related to the use case may be queried via CMF 810, which may also track the list of current data provider(s) for that user ID, such as to support revocation). Data provider 815 generally initiates the data collection at a device and across different network services based on the consent profile For example, data provider 815 may generally provides relevant information to the data processor 820 to retrieve the data.

For example, at 825, data processor 820 may transmit or otherwise provide (and data provider 815 may receive or otherwise obtain) a subscribe message. The subscribe message may carry or otherwise convey an indication of a user ID (e.g., if known), may identify the data that access is being requested, the use case (e.g., the subscription), as well as an activate indication. The activation indication may indicate that the data processor 820 is requesting access to the end-user's data. In some examples, the subscribe message may be transmitted or otherwise provided via or based at least in part on a NEF.

At 830, data provider 815 may identify or otherwise determine whether consent is needed. For example, the data that data processor 820 is requesting access to may be open or otherwise available for access without user consent (e.g., public or non-personable information). Other data, likely most of the data of or otherwise relating to the end-user, may require consent of the user before access is granted. If no consent is necessary, data provider 815 may simply respond to the subscribe message indicting that the data is available and/or providing the data.

Otherwise and when user consent is required for data access, at 835 data provider 815 may transmit or otherwise provide (and CMF 810 may receive or otherwise obtain) a query message (e.g., a first request). Broadly, the query message (e.g., a first request) may generally request access to data associated with a user ID. For example, the query message may carry or otherwise convey an indication of the user ID, the use case, and the activate indication. The activate indication may signal to CMF 810 that a new data access request is being initiated by data processor 820. Accordingly, CMF 810 may generally receive the first request (e.g., the query message) from the data provider 815 requesting access to end-user's data.

In response to the query message, at 840 CMF 810 may optionally transmit or otherwise provide (and (E)UDM 805 may optionally receive or otherwise obtain) a subscribe request message (e.g., a second request). The subscribe request message may carry or otherwise convey an indication of the user ID. The subscribe request message may generally request the access level for the data provider 815 and/or data processor 820. That is, the subscribe request message may generally request the access level for data provider 815 and/or data processor 820 to the end-user's data. Accordingly, CMF 810 may optionally transmit the second request (e.g., the subscribe request message) to a second network entity (e.g., (E)UDM 805, in this example) indicating the user ID and requesting the access level.

At 845, (E)UDM 805 may optionally perform or otherwise determine end-user authentication. For example, (E)UDM 805 may generally access the provisioned content profile of the user ID to determine what, if any, access level that data provider 815 and/or data processor 820 has to some or all of the end-user's data. This may include (E)UDM 805 accessing one or more consent types of the consent profile to determine the access level.

At 850, (E)UDM 805 may optionally transmit or otherwise provide (and CMF 810 may optionally receive or otherwise obtain) a notification message (e.g., a first response). That is, CMF 810 may receive or otherwise obtain a first response from the second network entity (e.g., (E)UDM 805, in this example) that carries or otherwise conveys an indication of the access level. For example, the notification message may carry or otherwise convey the consent profile of the user ID, one or more consent type(s) for that use case, and/or may simply use a bit or flag to indicate that the access level of data provider 815 and/or data processor 820 is granted to the end-user's data.

At 855, CMF 810 may transmit or otherwise provide (and data provider 815 may receive or otherwise obtain) an update message (e.g., a second response). That is, CMF 810 may transmit a second response (e.g., the update message) to data provider 815 that carries or otherwise conveys an indication of the user ID as well as the consent profile (or consent type(s) of the consent profile) for that use case. Accordingly, CMF 810 may transmit or otherwise provide a second response to the data provider (e.g., the update message) indicating the access level.

At 860, data provider 815 may identify, determine, or otherwise verify consent for the use case. For example, data provider 815 may use the consent profile (or consent type(s) of the consent profile) for that use case as well as the subscribe message received from data processor 820 to confirm or otherwise verify that the user has granted consent to the user's data for data provider 815 and/or data processor 820.

Accordingly and at 865, (E)UDM 805, CMF 810, and data provider 815 may initiate data collection at the end-user's device as well as with different network services (such as data processor 820) based on the consent profile (or consent type(s) of the consent profile). This may include CMF 810 transmitting or otherwise providing an indication to the data provider 815 to permit access to some or all of the end-user's data associated with the user ID (e.g., based on the access level).

At 870, data provider 815 may transmit or otherwise provide (and data processor 820 may receive or otherwise obtain) a notification message. The notification message may generally carry or otherwise convey an indication that data collection has been consented to. For example, the notification message may carry or convey an indication of the user ID as well as data information, such as the end-user's data, information used to collect the end-user's data from the end-user's device(s), and the like. Again, the access level of the data processor 820 may be based on the consent profile for the user ID. Accordingly, data processor 820 may collect the end-user's data from the end-user's device(s) as well as across different network services, where applicable.

Figure 9:
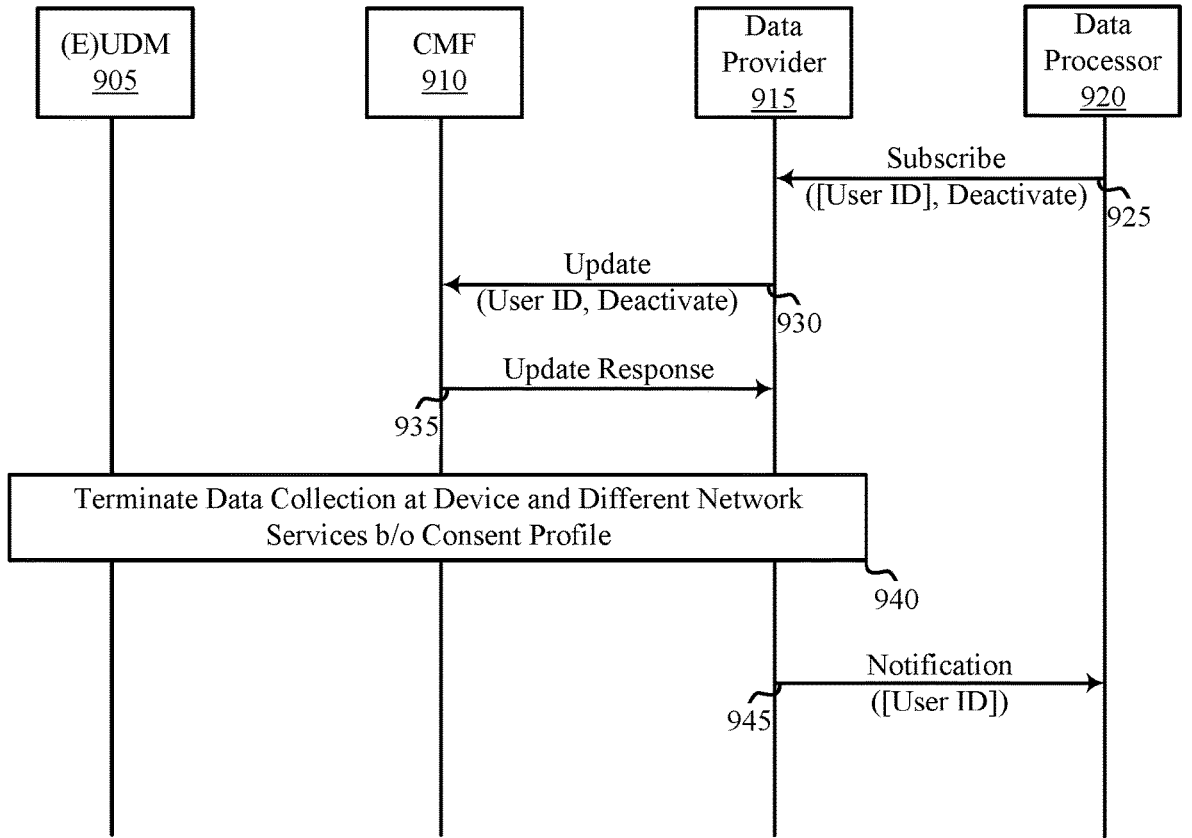
FIG. 9 illustrates an example of a method that supports consent management procedures in accordance with one or more aspects of the present disclosure.

FIG. 9 illustrates an example of a method 900 that supports consent management procedures in accordance with one or more aspects of the present disclosure. Method 900 may implement aspects of wireless communications systems 100 and/or 200, aspects of consent profile 300, aspects of provisioning configuration 400, aspects of methods 500, 600, and/or 800, and/or aspects of consent management configuration 700. Aspects of method 900 may be implemented by or implemented at (E)UDM 905, CMF 910, data provider 915, and data processor 920 (e.g., a data processor/consumer), which may be examples of the corresponding devices described herein. For example, (E)UDM 905 and/or CMF 910 may refer to an application, feature, or other function operating within a consent platform. Accordingly, references to a network entity may include (E)UDM 905 and/or CMF 910.

As discussed above, aspects of the techniques described herein provide for consent profile provisioning within a consent platform. Method 900 illustrates a non-limiting example of a deactivation request from data processor 920 deactivating consent within the consent platform. Broadly, this may include the data processor/consumer indicating to the data provider 915 (e.g., as a third party via the NEF) that the end-user's data no longer needs to be collected (e.g., for periodic reports). Data provider 915 generally updates the state of CMF 910 (e.g., CMF 910 tracks the list of current data providers for the user ID). Based on the deactivation request, data provider 915 generally terminates the data collection at the end-user's device(s) as well as across different network services, where applicable.

At 925, data processor 920 may transmit or otherwise provide (and data provider 915 may receive or otherwise obtain) a subscribe message. The subscribe message may generally carry or otherwise convey an indication of the user ID (e.g., the user ID for the ongoing or active data collection) as well as a deactivation indication (e.g., using one or more bits, fields, flags, parameters, etc.).

At 930, data provider 915 may transmit or otherwise provide (and CMF 910 may receive or otherwise obtain) an update message. The update message may generally carry or otherwise convey an indication of the user ID and the deactivate indication. This may signal to CMF 910 that data provider 915 and/or data processor 920 are deactivating collection of the end-user's data.

At 935, CMF 910 may transmit or otherwise provide (and data provider 915 may receive or otherwise obtain) an update response message. The update response message may carry or otherwise convey an indication confirming that the data provider 915 and/or the data processor 920 are no deactivating collection of the end-user's data.

At 940, (E)UDM 905, CMF 910, and/or data provider 915 may generally terminate data collection at the end-user's device(s) as well as across different network services based on the consent profile and/or the deactivation indication. For example, CMF 910 may generally identify, store, or otherwise determine the list of data consumer(s) accessing data associated with the user ID (e.g., based on the consent profile(s) associated with the user ID). CMF 910 may remove data provider 915 and/or data processor 920 from the list based on the deactivation procedure. In some examples, this may include updating the access level (e.g., the consent profile) for data provider 915 and/or for data processor 920 based on the deactivation procedure.

At 945, data provider 915 may transmit or otherwise provide (and data processor 920 may receive or otherwise obtain) a notification message. The notification message may generally carry or otherwise convey an indication confirming that collection of the end-user's data has ceased or otherwise been deactivated.

Figure 10:
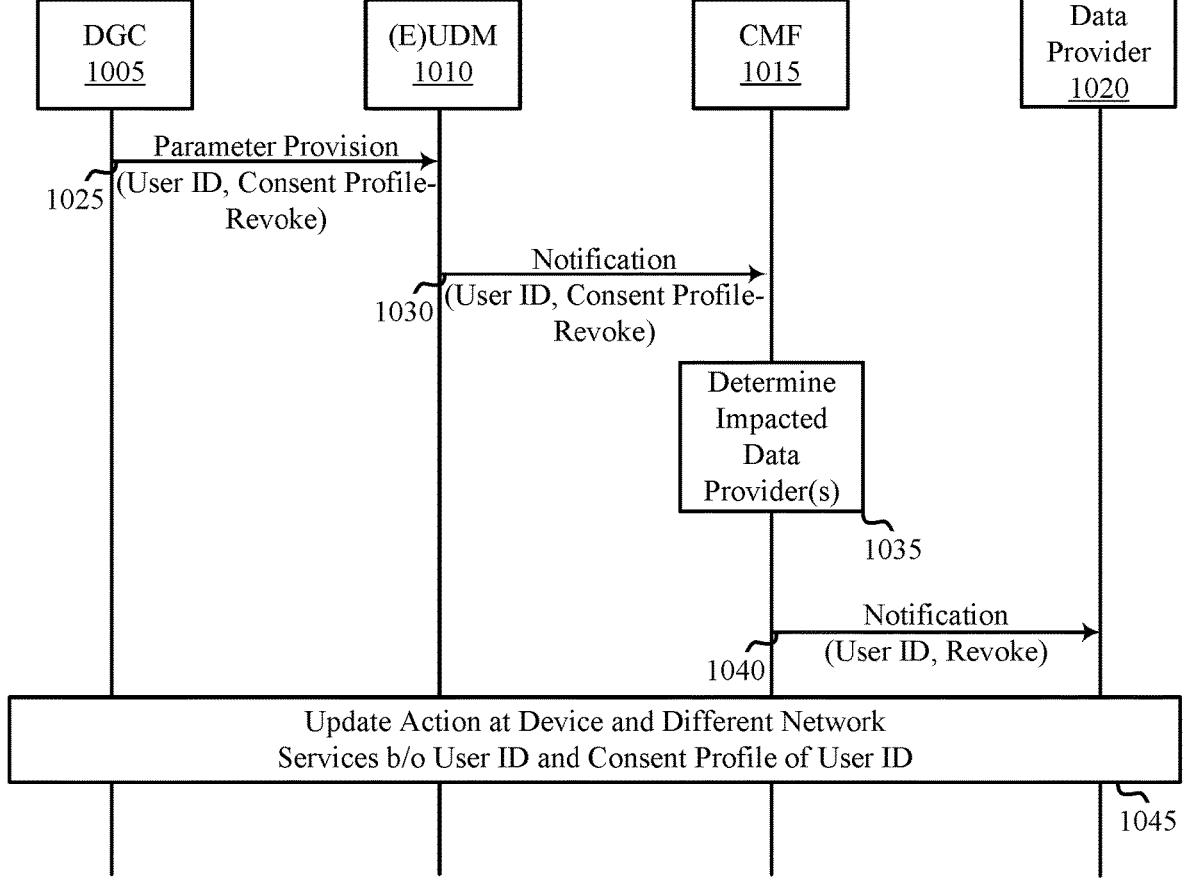
FIG. 10 illustrates an example of a method that supports consent management procedures in accordance with one or more aspects of the present disclosure.

FIG. 10 illustrates an example of a method 1000 that supports consent management procedures in accordance with one or more aspects of the present disclosure. Method 1000 may implement aspects of wireless communications systems 100 and/or 200, aspects of consent profile 300, aspects of provisioning configuration 400, aspects of methods 500, 600, 800, and/or 900, and/or aspects of consent management configuration 700. Aspects of method 1000 may be implemented by or implemented at DGC 1005, (E)UDM 1010, CMF 1015, and data provider 1020, which may be examples of the corresponding devices described herein. For example, DGC 1005, (E)UDM 1010 and/or CMF 10150 may refer to an application, feature, or other function operating within a consent platform. Accordingly, references to a network entity may include (E)UDM 1010 and/or CMF 1015.

As discussed above, aspects of the techniques described herein provide for consent profile provisioning within a consent platform. Method 1000 illustrates a non-limiting example of a revocation request from an end-user revoking consent within the consent platform. Broadly, this may include the (E)UDM 1010 notifying CMF 1015 that consent has been revoked by the user. CMF 1015 may generally notify data providers (such as data provider 1020) currently subscribed for that user ID if the consent profile has changed for their use case. The data provider(s) and/or data processor(s)/consumer(s) may take appropriate action, such as notifying the corresponding data processor/consumer, termination or modification of data processing (e.g. including potential termination of the data processing) based on the revocation. The data provider(s) and/or data processor(s)/consumer(s) may retain, rectify, or erase the user data based on the revocation request. For example and based on the revocation request, CMF 1015 generally terminates or updates the data collection at the end-user's device(s) as well as across different network services, where applicable.

At 1025, DGC 1005 may transmit or otherwise provide (and (E)UDM 1010 may receive or otherwise obtain) a parameter provision message. Broadly, the parameter provision message may carry or otherwise convey an indication that the end-user (e.g., using DGC 1005 on the end-user's device, such as a UE) has revoked, at least to some degree, consent for one or more use cases (e.g., for one or more data providers and/or data processors/consumers). For example, the parameter provision message may carry or otherwise convey an indication of the user ID as well as a revoke indication for the consent profile(s) of the user ID.

In response to the parameter provision message, at 1030, (E)UDM 1010 may transmit or otherwise provide (and CMF 1015 may receive or otherwise obtain) a notification message (e.g., a revocation request). The notification message may carry or otherwise convey an indication of the user ID as well as the revoke indication for the consent profile(s) of the user ID. Accordingly, CMF 1015 may receive a revocation request for a subset of consent type(s) and/or consent profile(s) of the user ID.

At 1035, CMF 1015 may identify or otherwise determine which data provider(s) and/or data consumer(s) are impacted by the revocation request. For example, CMF 1015 generally maintains a list of active processes in which data provider(s) and/or data processor(s)/consumer(s) are accessing data or other information of the end-user. Based on the user ID and revoke indication for the consent profile, CMF 1015 may access the list to determine which, if any, data provider(s) and/or data processor(s)/consumer(s) have their consent revoked or otherwise modified by the end-user. In the non-limiting example illustrated in FIG. 10, this may include CMF 1015 identifying or otherwise determining that data provider 1020 is impacted, although it is to be understood that multiple data providers and/or data processors/consumers are impacted.

Based on data provider 1020 being impacted by the revocation request, at 1040 CMF 1015 may transmit or otherwise provide (and data provider 1020 may receive or otherwise obtain) a notification message indicating the user ID and the revocation indication.

Accordingly, at 1045, DGC 1005, (E)UDM 1010, CMF 1015, and/or data provider 1020 may update the actions occurring at end-user device(s) as well as across different network services based on the user ID/consent profile. For example, this may include stopping or otherwise modifying data collection based on the revocation request from the end-user. In some examples, this may include CMF 1015 updating the access level associated with the consent type(s) to a revoked status based on the revocation request. In some examples, this may include data provider 1020 and/or data processor(s)/consumer(s) adopting the action to be taken upon revocation consent parameter in the consent type(s) of the consent profile(s) of the user ID in response to the revocation request.

Figure 11:
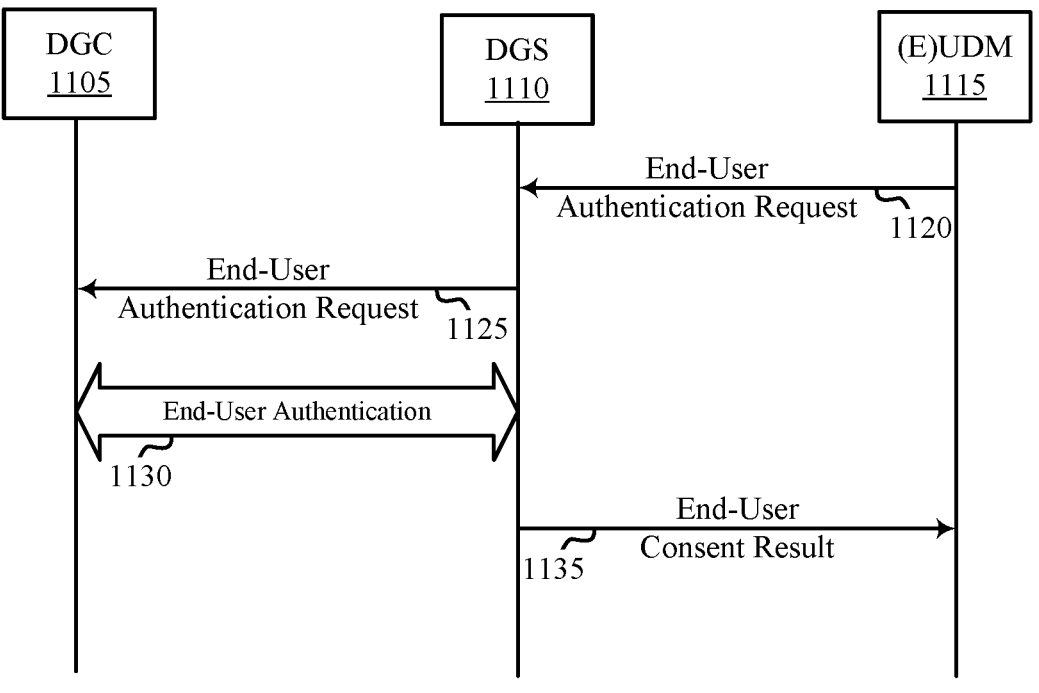
FIG. 11 illustrates an example of a method that supports consent management procedures in accordance with one or more aspects of the present disclosure.

FIG. 11 illustrates an example of a method 1100 that supports consent management procedures in accordance with one or more aspects of the present disclosure. Method 1100 may implement aspects of wireless communications systems 100 and/or 200, aspects of consent profile 300, aspects of provisioning configuration 400, aspects of methods 500, 600, 800, 900, and/or 1000, and/or aspects of consent management configuration 700. Aspects of method 1100 may be implemented by or implemented at DGC 1105, DGS 1110, and/or (E)UDM 1115, which may be examples of the corresponding devices described herein. For example, DGC 1105, DGS 1110, and/or (E)UDM 1115 may refer to an application, feature, or other function operating within a consent platform. Accordingly, references to a network entity may include (E)UDM 1115 and/or DGS 1110. References to a UE may include DGC 1105.

As discussed above, aspects of the techniques described herein provide for consent profile provisioning within a consent platform. Method 1100 illustrates a non-limiting example of dynamic user authentication applied during consent enforcement within the consent platform. This may include consent enforcement activation at or by (E)UDM 1115.

For example and at 1120, (E)UDM 1115 may transmit or otherwise provide (and DGS 1110 may receive or otherwise obtain) an end-user authentication request (e.g., a dynamic access request). Broadly, the end-user authentication request may carry or otherwise convey an indication of a request for access to some or all (e.g., a portion) of the data/information associated with the user ID. For example, (E)UDM 1115 may receive an indication for dynamic end-user authentication from CMF within the consent platform and provide the dynamic access request in response. The indication may carry or otherwise convey that end-user authentication is required for consent enforcement. For example, the CMF may receive a dynamic access request message from a data provider requesting access to the data associated with the user ID. In response, the CMF may transmit or otherwise provide the dynamic access request to a second network entity (e.g., (E)UDM 1115 in this example). This message may carry or otherwise convey an indication of the user ID, the data of the end-user for which access is being requested, and/or the consent type(s) associated with the use case.

At 1125, DGS 1110 may transmit or otherwise provide (and DGC 1105 may receive or otherwise obtain) an end-user authentication request. The request may carry or otherwise convey an indication of the user ID, the data of the end-user for which access is being requested, and/or the consent type(s) associated with the use case.

In response to the dynamic user authentication request, at 1130 DGC 1105 and DGS 1110 may perform an end-user authentication procedure, such as a FIDO procedure. This may be used to confirm that the user of the device is in fact the end-user associated with the user ID for which access is being requested.

At 1135, DGS 1110 may transmit or otherwise provide (and (E)UDM 1115 may receive or otherwise obtain) an end-user consent result message (e.g., a dynamic access response). Generally, the end-user consent result message may carry or otherwise convey an indication of whether the end-user has approved the access request or has rejected the access request.

In some aspects and based on (E)UDM 1115 receiving the end-user consent result, (E)UDM 1115 may transmit or otherwise provide a dynamic access response to CMF that authorizes or rejects access to some or all of the end-user's data. The CMF within the consent platform may forward, transmit, or otherwise provide the dynamic access response to data provider(s) requesting access to the end-user's data.

Figure 12:
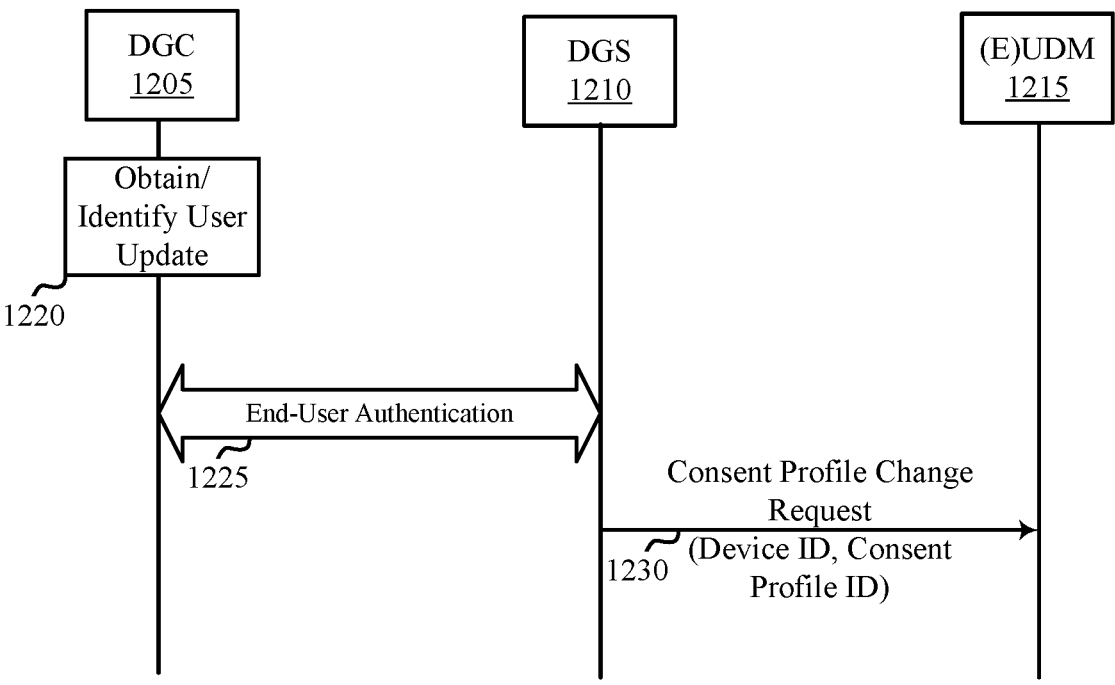
FIG. 12 illustrates an example of a method that supports consent management procedures in accordance with one or more aspects of the present disclosure.

FIG. 12 illustrates an example of a method 1200 that supports consent management procedures in accordance with one or more aspects of the present disclosure. Method 1200 may implement aspects of wireless communications systems 100 and/or 200, aspects of consent profile 300, aspects of provisioning configuration 400, aspects of methods 500, 600, 800, 900, 1000 and/or 1100, and/or aspects of consent management configuration 700. Aspects of method 1200 may be implemented by or implemented at DGC 1205, DGS 1210, and/or (E)UDM 1215, which may be examples of the corresponding devices described herein. For example, DGC 1205, DGS 1210, and/or (E)UDM 1215 may refer to an application, feature, or other function operating within a consent platform. Accordingly, references to a network entity may include (E)UDM 1215 and/or DGS 1210. References to a UE may include DGC 1205.

As discussed above, aspects of the techniques described herein provide for consent profile provisioning within a consent platform. Method 1200 illustrates a non-limiting example of switching the end-user of a device (e.g., switching an end-user from one device to another device and/or adding another end-user to a device). In some aspects, this may include updating the end-user information at (E)UDM 1215.

At 1220, this may include DGC 1205 (which may be a DGC operating on a new or different device) obtaining or otherwise identifying a user update. For example, the user update may include DGC 1205 receiving or otherwise information from the end-user updating its associated device(s), such as the end-user initiating an initial or update consent profile procedure using the DGC on the new device. In some examples, this may include DGC 1205 identifying or otherwise determining an identifier of the device that DGC 1205 is operating on, the consent profile associated with the user ID, etc.

At 1225, DGC 1205 and DGS 1210 may perform an end-user authentication procedure (e.g., a FIDO procedure) to confirm the identity of the end-user. This procedure may be used to confirm that the end-user previously provisioning the consent profile using a first device is the same end-user submitting the end-user device update procedure within the consent platform.

At 1230, DGS 1210 may transmit or otherwise provide (and (E)UDM 1215 may receive or otherwise obtain) a consent profile change request that identifies the device ID of the new device that the end-user is switching to or otherwise registering with as well as the consent profile ID associated with the user ID of the end-user. For example, (E)UDM 1215 may receive an update message from a second network entity (DGS 1210 in this example) that identifies an updated end-user device associated with the user ID. In response, (E)UDM 1215 may update the consent parameter(s) of the consent type(s) of the consent profile(s) of the user ID, to include the updated end-user device.

Figure 13:
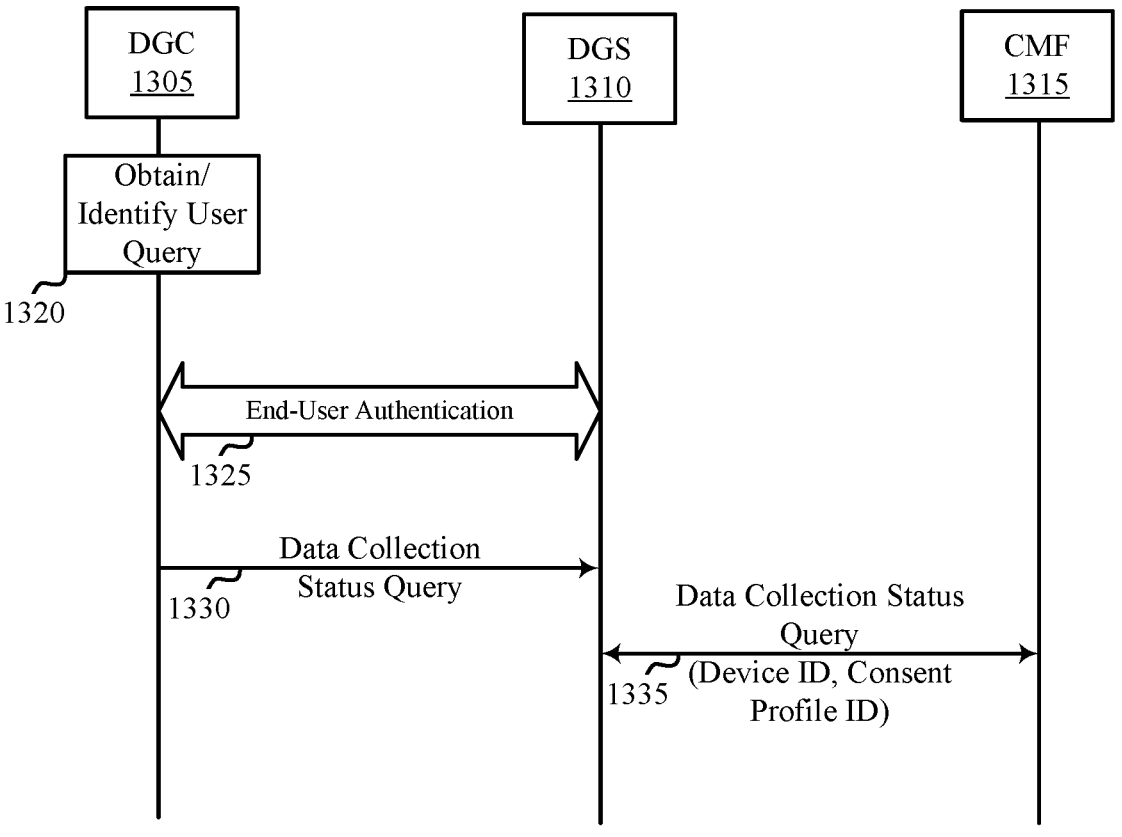
FIG. 13 illustrates an example of a method that supports consent management procedures in accordance with one or more aspects of the present disclosure.

FIG. 13 illustrates an example of a method 1300 that supports consent management procedures in accordance with one or more aspects of the present disclosure. Method 1300 may implement aspects of wireless communications systems 100 and/or 200, aspects of consent profile 300, aspects of provisioning configuration 400, aspects of methods 500, 600, 800, 900, 1000, 1100 and/or 1200, and/or aspects of consent management configuration 700. Aspects of method 1300 may be implemented by or implemented at DGC 1305, DGS 1310, and/or CMF 1315, which may be examples of the corresponding devices described herein. For example, DGC 1305, DGS 1310, and/or CMF 1315 may refer to an application, feature, or other function operating within a consent platform. Accordingly, references to a network entity may include DGS 1310 and/or CMF 1315. References to a UE may include DGC 1305.

As discussed above, aspects of the techniques described herein provide for consent profile provisioning within a consent platform. Method 1300 illustrates, at a high level, a non-limiting example of a data processing query initiated by the end-user (e.g., by the end user using DGC 1305 on the end-user's device). The techniques outlined in method 1300 may provide a mechanism for an end-user to identify or otherwise determine which data providers and/or data processors/consumers are currently access the end-user's data. As discussed above, CMF 1315 may generally maintain a list of data provider(s) and/or data processor(s)/consumer(s) that are accessing, or have access to, some or all of the data of the end-user.

At 1320, DGC 1305 may identify or otherwise obtain a user query. For example, the end-user may use DGC 1305 running at the application layer within the consent platform to submit the data processing query.

In response, at 1325 DGC 1305 and DGS 1310 may perform an end-user authentication procedure (e.g., a FIDO procedure). This may enable confirmation of the end-user submitting the data processing query.

At 1330, DGC 1305 may transmit or otherwise provide (and DGS 1310 may receive or otherwise obtain, e.g., from the UE) a data collection status query (e.g., a data collection query). In some aspects, the query may carry or otherwise convey a request for the data access status associated with the user associated with the consent profile ID of the consent profile. That data access status may generally refer to the list of data provider(s) and/or data processor(s)/consumer(s) currently accessing or having access to the data of the end-user.

At 1335, DGS 1310 and CMF 1315 may generally exchange one or more messages for the data collection status query. For example, DGS 1310 may transmit or otherwise provide the data collection query and the user ID to a third network entity (e.g., CMF 1315 in this example). CMF 1315 may transmit or otherwise provide a data collection response that identifies data provider(s) and/or data processor(s)/consumer(s) that are accessing data associated with the consent profile. In response, DGS 1310 may transmit (e.g., to the UE implementing DGC 1305) the data collection response that identifies the data provider(s) and/or data processor(s)/consumer(s) accessing the data of the end-user.

Figure 14:
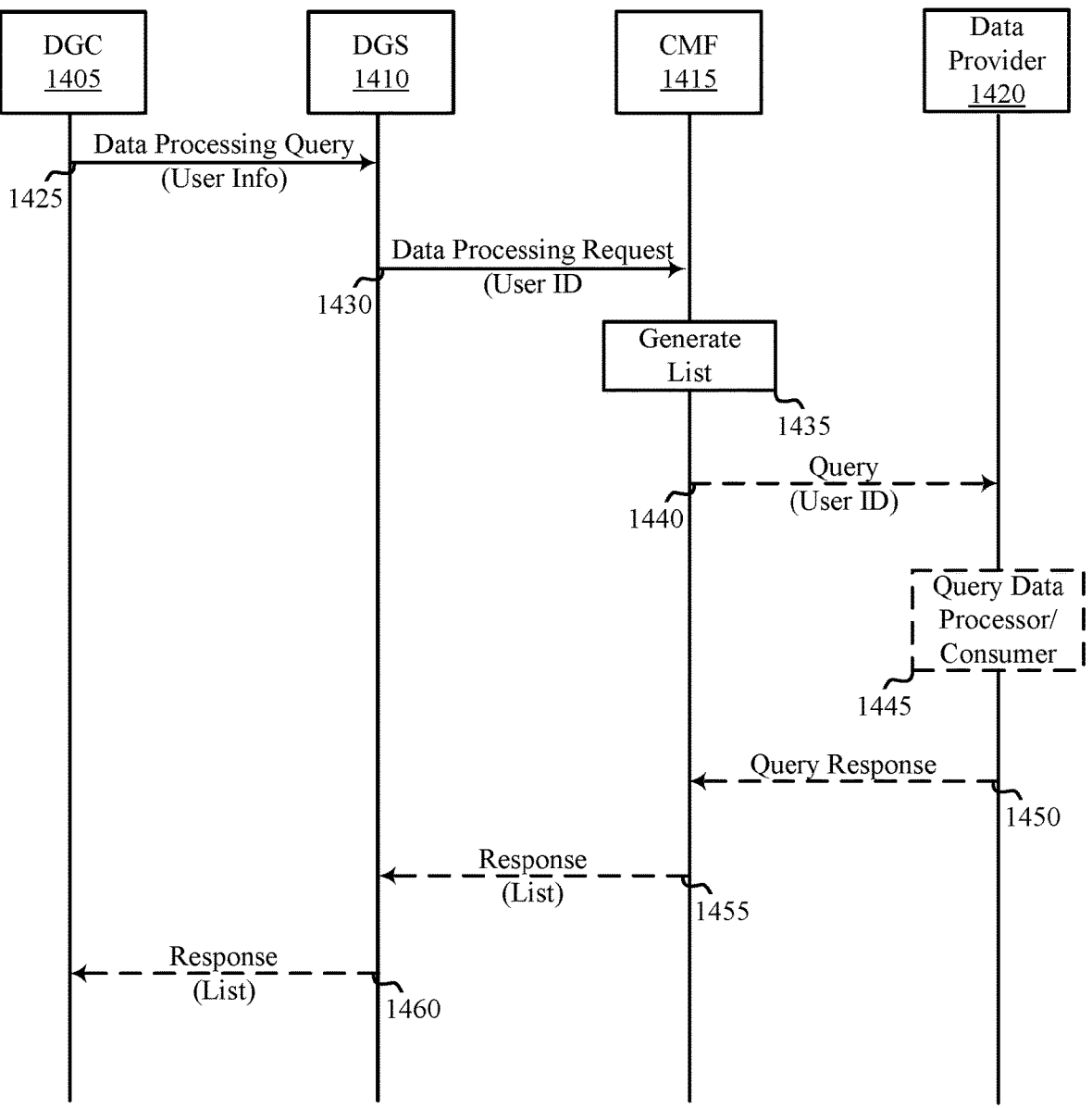
FIG. 14 illustrates an example of a method that supports consent management procedures in accordance with one or more aspects of the present disclosure.

FIG. 14 illustrates an example of a method 1400 that supports consent management procedures in accordance with one or more aspects of the present disclosure. Method 1400 may implement aspects of wireless communications systems 100 and/or 200, aspects of consent profile 300, aspects of provisioning configuration 400, aspects of methods 500, 600, 800, 900, 1000, 1100, 1200 and/or 1300, and/or aspects of consent management configuration 700. Aspects of method 1400 may be implemented by or implemented at DGC 1405, DGS 1410, CMF 1415, and/or data provider 1420, which may be examples of the corresponding devices described herein. For example, DGC 1405, DGS 1410, and/or CMF 1415 may refer to an application, feature, or other function operating within a consent platform. Accordingly, references to a network entity may include DGS 1410 and/or CMF 1415. References to a UE may include DGC 1405.

As discussed above, aspects of the techniques described herein provide for consent profile provisioning within a consent platform. Method 1400 illustrates, at a more detailed level, a non-limiting example of a data processing query initiated by the end-user (e.g., by the end user using DGC 1405 on the end-user's device). The techniques outlined in method 1400 may provide a mechanism for an end-user to identify or otherwise determine which data providers and/or data processors/consumers are currently access the end-user's data. As discussed above, CMF 1415 may generally maintain a list of data provider(s) and/or data processor(s)/consumer(s) that are accessing, or have access to, some or all of the data of the end-user.

Broadly, the data processing query may include DGS 1410 querying the CMF 1415 to see which services are currently collecting/processing data for the user. CMF 1415 generates a list in response which includes the identifiers of the data provider(s) and/or data processor(s)/consumer(s) currently accessing the data of the end-user. In some examples, CMF 1415 maintains the list of active data provider(s) and/or data processor(s)/consumer(s) and generates the list of active users in response to the end-user query. In some examples, CMF 1415 queries the data provider(s) and/or data processor(s)/consumer(s) to see which are processing or otherwise accessing the data of the end-user.

At 1425, DGC 1405 may transmit or otherwise provide (and (DGS 1410 may receive or otherwise obtain) a data processing status query. For example, the end-user may use DGC 1405 on the end-user's device operating at the application layer within the consent platform to initiate a data processing status query. In some examples, the data processing status query may carry or otherwise convey user information, such as the user ID, consent profile ID, and the like.

At 1430, DGS 1410 may transmit or otherwise provide (and CMF 1415 may receive or otherwise obtain) a data processing request. The data processing request may carry or otherwise convey an indication of the user ID and may trigger the CMF to provide a list of data provider(s) and/or data processor(s)/consumer(s) accessing the data of the end-user.

At 1435, CMF 1415 may generate the list of data provider(s) and/or data processor(s)/consumer(s) accessing the end-user's data. As discussed above, in some examples CMF 1415 may generally store or otherwise maintain a list of which data provider(s) and/or data processor(s)/consumer(s) that are accessing, processing, or otherwise have access to the data of the end-user.

Additionally, or alternatively, at 1440 CMF 1415 may optionally transmit or otherwise provide (and data provider 1420 may receive or otherwise obtain) a query. The query may generally indicate the user ID and request an indication of whether or not data provider 1420 is accessing or otherwise processing the data of the end-user.

At 1445, data provider 1420 may optionally query data processor(s)/consumer(s) to determine which, if any, are accessing the data of the end-user. For example, data provider 1420 may determine which, if any, data processor(s)/consumer(s) are utilizing the end-user's data based on previous activation request(s).

At 1450, data provider 1420 may optionally transmit or otherwise provide (and CMF 1415 may receive or otherwise obtain) a query response. The query response may generally identify whether data provider 1420, as well as any associated data processor(s)/consumer(s), are accessing the data of the end-user.

At 1455, CMF 1415 may transmit or otherwise provide (and DGS 1410 may receive or otherwise obtain) a response that carries or otherwise conveys an indication of the list of data provider(s) and/or data processor(s)/consumer(s) that are accessing the data of the end-user (e.g., based on the user ID of the consent profile(s)).

At 1460, DGS 1410 may transmit or otherwise provide (and DGC 1405 may receive or otherwise obtain) a response that carries or otherwise conveys the indication of the list of data provide(s) and/or data processor(s)/consumer(s) that are accessing the data of the end-user. Accordingly, method 1400 illustrates a mechanism within the consent platform for the end-user to dynamically request the data access status of data provider(s) and/or data processor(s)/consumer(s) accessing the data associated with the user ID of the end-user (e.g., according to the consent profile).

Figure 15:
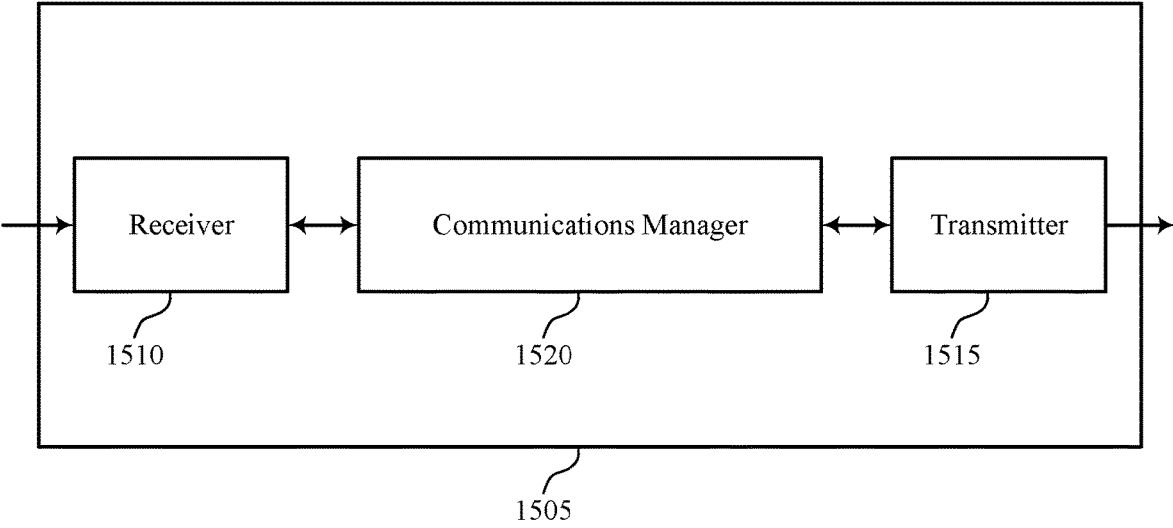
FIGS. 15 and 16 show block diagrams of devices that support consent management procedures in accordance with one or more aspects of the present disclosure.

FIG. 15 shows a block diagram 1500 of a device 1505 that supports consent management procedures in accordance with one or more aspects of the present disclosure. The device 1505 may be an example of aspects of a network entity 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1505. In some examples, the receiver 1510 may support obtaining information by receiving signals via one or more antennas. Additionally, or alternatively, the receiver 1510 may support obtaining information by receiving signals via one or more wired (e.g., electrical, fiber optic) interfaces, wireless interfaces, or any combination thereof.

The transmitter 1515 may provide a means for outputting (e.g., transmitting, providing, conveying, sending) information generated by other components of the device 1505. For example, the transmitter 1515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1515 may support outputting information by transmitting signals via one or more antennas. Additionally, or alternatively, the transmitter 1515 may support outputting information by transmitting signals via one or more wired (e.g., electrical, fiber optic) interfaces, wireless interfaces, or any combination thereof. In some examples, the transmitter 1515 and the receiver 1510 may be co-located in a transceiver, which may include or be coupled with a modem.

The communications manager 1520, the receiver 1510, the transmitter 1515, or various combinations thereof or various components thereof may be examples of means for performing various aspects of consent management procedures as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a first network entity in accordance with examples as disclosed herein. For example, the communications manager 1520 may be configured as or otherwise support a means for identifying a consent profile for a user identifier, the consent profile including one or more consent types for the user identifier that configure one or more consent parameters for the user identifier on at least a per-user basis. The communications manager 1520 may be configured as or otherwise support a means for receiving, from a second network entity, a request indicating the user identifier and requesting an access level for a data provider corresponding to at least one consent type of the one or more consent types. The communications manager 1520 may be configured as or otherwise support a means for transmitting, to the second network entity, a response indicating the access level based on the request and the one or more consent parameters for the at least one consent type.

Additionally, or alternatively, the communications manager 1520 may support wireless communication at a first network entity in accordance with examples as disclosed herein. For example, the communications manager 1520 may be configured as or otherwise support a means for receiving, from a UE, a consent profile registration request identifying a user identifier. The communications manager 1520 may be configured as or otherwise support a means for receiving, from the UE, a consent profile based on the consent profile registration request, the consent profile including one or more consent types for the user identifier that configure one or more consent parameters for the user identifier on a least a per-user basis. The communications manager 1520 may be configured as or otherwise support a means for transmitting, to a second network entity, the consent profile.

Additionally, or alternatively, the communications manager 1520 may support wireless communication at a first network entity in accordance with examples as disclosed herein. For example, the communications manager 1520 may be configured as or otherwise support a means for receiving, from a data provider, a first request requesting access to data associated with a user identifier, the data provider corresponding to at least one consent type of one or more consent types for the user identifier. The communications manager 1520 may be configured as or otherwise support a means for transmitting, to a second network entity, a second request indicating the user identifier and requesting an access level for the data provider. The communications manager 1520 may be configured as or otherwise support a means for receiving, from the second network entity, a first response indicating the access level. The communications manager 1520 may be configured as or otherwise support a means for transmitting, to the data provider, a second response indicating the access level.

By including or configuring the communications manager 1520 in accordance with examples as described herein, the device 1505 (e.g., a processor controlling or otherwise coupled with the receiver 1510, the transmitter 1515, the communications manager 1520, or a combination thereof) may support techniques for a consent platform implemented within a wireless communications system that provides or otherwise support granular end-user configuration of consent profile(s) for the end-user on at least an end-user basis, e.g., rather than solely on a per-subscription basis.

Figure 16:
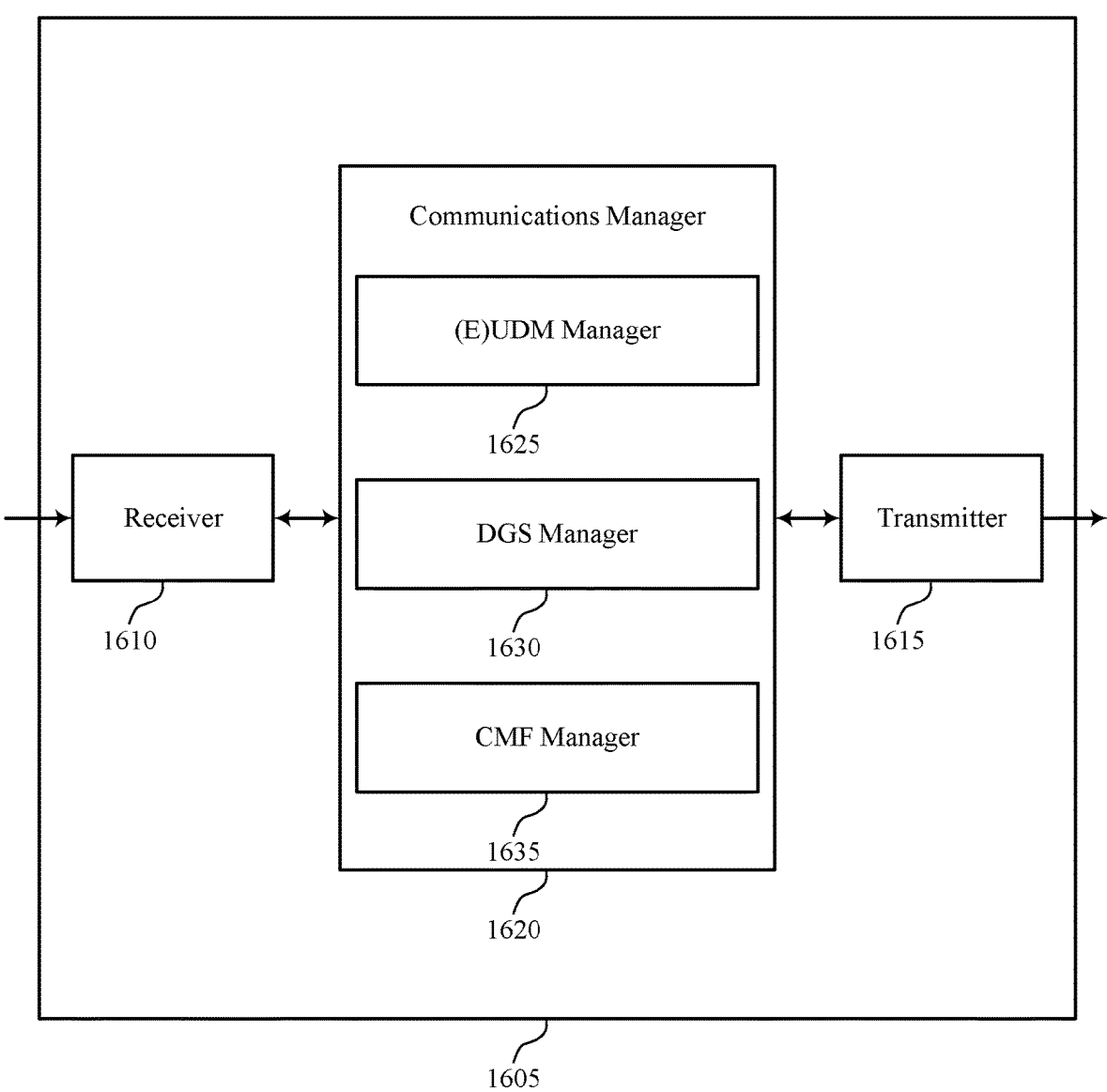

FIG. 16 shows a block diagram 1600 of a device 1605 that supports consent management procedures in accordance with one or more aspects of the present disclosure. The device 1605 may be an example of aspects of a device 1505 or a network entity 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1605. In some examples, the receiver 1610 may support obtaining information by receiving signals via one or more antennas.

Additionally, or alternatively, the receiver 1610 may support obtaining information by receiving signals via one or more wired (e.g., electrical, fiber optic) interfaces, wireless interfaces, or any combination thereof.

The transmitter 1615 may provide a means for outputting (e.g., transmitting, providing, conveying, sending) information generated by other components of the device 1605. For example, the transmitter 1615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1615 may support outputting information by transmitting signals via one or more antennas. Additionally, or alternatively, the transmitter 1615 may support outputting information by transmitting signals via one or more wired (e.g., electrical, fiber optic) interfaces, wireless interfaces, or any combination thereof. In some examples, the transmitter 1615 and the receiver 1610 may be co-located in a transceiver, which may include or be coupled with a modem.

The device 1605, or various components thereof, may be an example of means for performing various aspects of consent management procedures as described herein. For example, the communications manager 1620 may include a (E)UDM manager 1625, a DGS manager 1630, an CMF manager 1635, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication at a first network entity in accordance with examples as disclosed herein. The (E)UDM manager 1625 may be configured as or otherwise support a means for identifying a consent profile for a user identifier, the consent profile including one or more consent types for the user identifier that configure one or more consent parameters for the user identifier on at least a per-user basis. The (E)UDM manager 1625 may be configured as or otherwise support a means for receiving, from a second network entity, a request indicating the user identifier and requesting an access level for a data provider corresponding to at least one consent type of the one or more consent types. The (E)UDM manager 1625 may be configured as or otherwise support a means for transmitting, to the second network entity, a response indicating the access level based on the request and the one or more consent parameters for the at least one consent type.

Additionally, or alternatively, the communications manager 1620 may support wireless communication at a first network entity in accordance with examples as disclosed herein. The DGS manager 1630 may be configured as or otherwise support a means for receiving, from a UE, a consent profile registration request identifying a user identifier. The DGS manager 1630 may be configured as or otherwise support a means for receiving, from the UE, a consent profile based on the consent profile registration request, the consent profile including one or more consent types for the user identifier that configure one or more consent parameters for the user identifier on a least a per-user basis. The DGS manager 1630 may be configured as or otherwise support a means for transmitting, to a second network entity, the consent profile.

Additionally, or alternatively, the communications manager 1620 may support wireless communication at a first network entity in accordance with examples as disclosed herein. The CMF manager 1635 may be configured as or otherwise support a means for receiving, from a data provider, a first request requesting access to data associated with a user identifier, the data provider corresponding to at least one consent type of one or more consent types for the user identifier. The CMF manager 1635 may be configured as or otherwise support a means for transmitting, to a second network entity, a second request indicating the user identifier and requesting an access level for the data provider. The CMF manager 1635 may be configured as or otherwise support a means for receiving, from the second network entity, a first response indicating the access level. The CMF manager 1635 may be configured as or otherwise support a means for transmitting, to the data provider, a second response indicating the access level.

Figure 17:
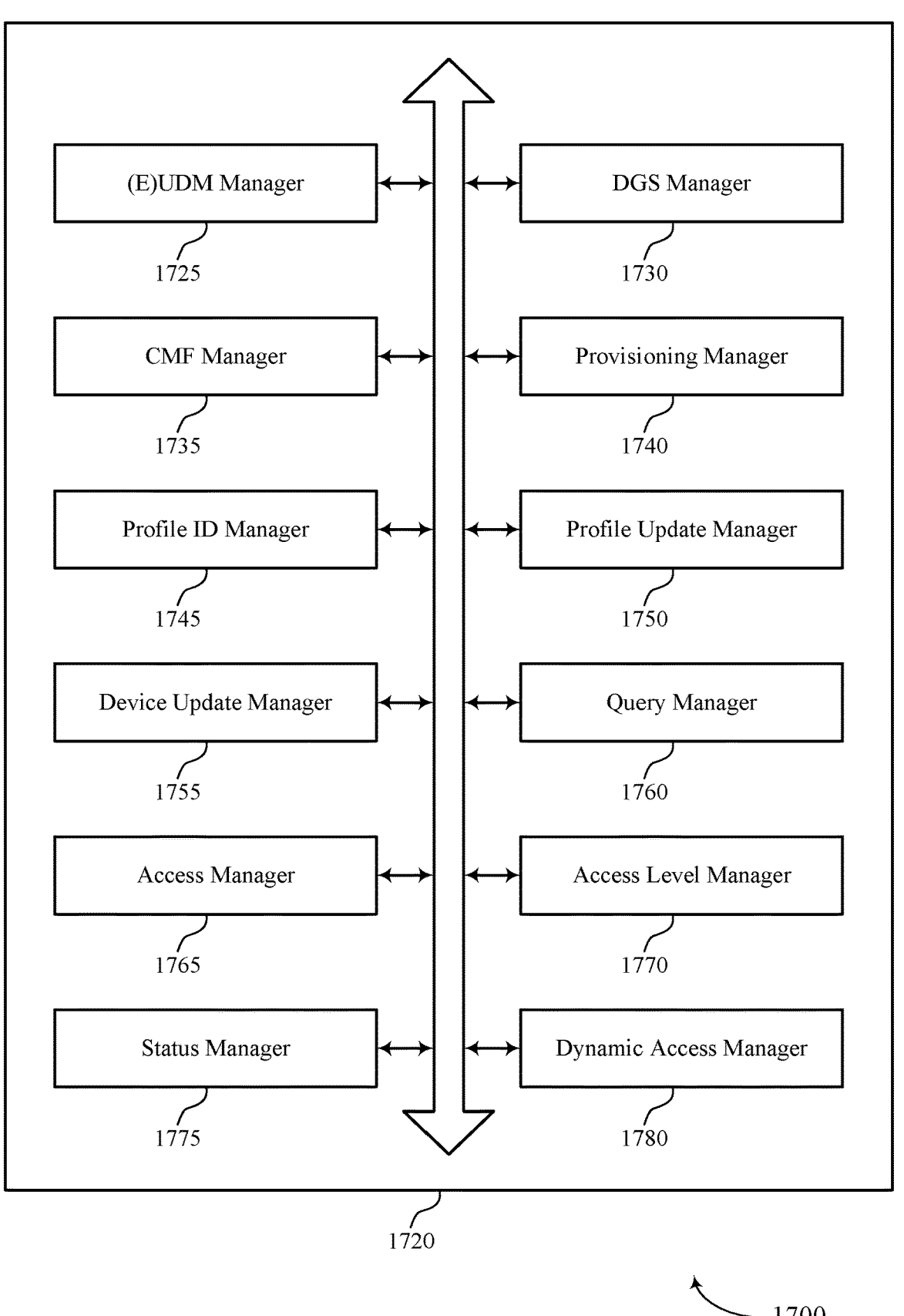
FIG. 17 shows a block diagram of a communications manager that supports consent management procedures in accordance with one or more aspects of the present disclosure.

FIG. 17 shows a block diagram 1700 of a communications manager 1720 that supports consent management procedures in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of consent management procedures as described herein. For example, the communications manager 1720 may include a (E)UDM manager 1725, a DGS manager 1730, an CMF manager 1735, a provisioning manager 1740, a profile ID manager 1745, a profile update manager 1750, a device update manager 1755, a query manager 1760, an access manager 1765, an access level manager 1770, a status manager 1775, a dynamic access manager 1780, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1720 may support wireless communication at a first network entity in accordance with examples as disclosed herein. The (E)UDM manager 1725 may be configured as or otherwise support a means for identifying a consent profile for a user identifier, the consent profile including one or more consent types for the user identifier that configure one or more consent parameters for the user identifier on at least a per-user basis.

In some examples, the (E)UDM manager 1725 may be configured as or otherwise support a means for receiving, from a second network entity, a request indicating the user identifier and requesting an access level for a data provider corresponding to at least one consent type of the one or more consent types. In some examples, the (E)UDM manager 1725 may be configured as or otherwise support a means for transmitting, to the second network entity, a response indicating the access level based on the request and the one or more consent parameters for the at least one consent type.

In some examples, the provisioning manager 1740 may be configured as or otherwise support a means for storing the consent profile and a subscription identifier for the user identifier in a unified data management entity, where the first network entity includes the unified data management entity.

In some examples, the provisioning manager 1740 may be configured as or otherwise support a means for storing a subscription identifier for the user identifier in a unified data management entity and the consent profile for the user identifier in an end-user unified data management entity, where the first network entity includes the end-user unified data management entity.

In some examples, the profile ID manager 1745 may be configured as or otherwise support a means for receiving a consent profile identifier from a third network entity associated with the first network entity, where identifying the consent profile for the user identifier is based on receiving the consent profile identifier. In some examples, the consent profile identifier maps the consent profile to a user associated with the user identifier at a UE.

In some examples, the profile update manager 1750 may be configured as or otherwise support a means for receiving an update message identifying updated parameters for at least one consent type of the one or more consent types. In some examples, the profile update manager 1750 may be configured as or otherwise support a means for updating the one or more consent parameters for at least one consent type of the consent profile based on the update message. In some examples, the update message is received from a third network entity or a UE associated with a consent profile identifier of the consent profile.

In some examples, the device update manager 1755 may be configured as or otherwise support a means for receiving, from the second network entity, an update message identifying an updated end-user device associated with the user identifier. In some examples, the device update manager 1755 may be configured as or otherwise support a means for updating the one or more consent parameters for the user identifier to include the updated end-user device based on the update message. In some examples, a subscription identifier associated with the user identifier includes a fifth generation subscription permanent identifier. In some examples, a subscription identifier associated with the user identifier includes a generic public subscription identifier. In some examples, the user identifier is associated with a subscription identifier, a consent profile identifier, or both. In some examples, the consent profile and a consent profile identifier of the consent profile are determined based on a result of a FIDO authentication procedure for a user associated with the user identifier.

Additionally, or alternatively, the communications manager 1720 may support wireless communication at a first network entity in accordance with examples as disclosed herein. The DGS manager 1730 may be configured as or otherwise support a means for receiving, from a UE, a consent profile registration request identifying a user identifier. In some examples, the DGS manager 1730 may be configured as or otherwise support a means for receiving, from the UE, a consent profile based on the consent profile registration request, the consent profile including one or more consent types for the user identifier that configure one or more consent parameters for the user identifier on a least a per-user basis. In some examples, the DGS manager 1730 may be configured as or otherwise support a means for transmitting, to a second network entity, the consent profile.

In some examples, the query manager 1760 may be configured as or otherwise support a means for receiving, from the UE, a data collection query requesting a data access status associated with a user associated with a consent profile identifier of the consent profile. In some examples, the query manager 1760 may be configured as or otherwise support a means for transmitting, to a third network entity, the data collection query and the user identifier. In some examples, the query manager 1760 may be configured as or otherwise support a means for receiving, from the third network entity, a data collection response based on the data collection query and the user identifier, the data collection response identifying a data provider accessing data associated with the consent profile. In some examples, the query manager 1760 may be configured as or otherwise support a means for transmitting, to the UE, the data collection response based on the data collection query.

Additionally, or alternatively, the communications manager 1720 may support wireless communication at a first network entity in accordance with examples as disclosed herein. The CMF manager 1735 may be configured as or otherwise support a means for receiving, from a data provider, a first request requesting access to data associated with a user identifier, the data provider corresponding to at least one consent type of one or more consent types for the user identifier. In some examples, the CMF manager 1735 may be configured as or otherwise support a means for transmitting, to a second network entity, a second request indicating the user identifier and requesting an access level for the data provider. In some examples, the CMF manager 1735 may be configured as or otherwise support a means for receiving, from the second network entity, a first response indicating the access level. In some examples, the CMF manager 1735 may be configured as or otherwise support a means for transmitting, to the data provider, a second response indicating the access level.

In some examples, the access manager 1765 may be configured as or otherwise support a means for transmitting, to the data provider, an indication to permit access to at least a portion of data associated with the user identifier based on the second response, where at least the portion of the data is based on the access level.

In some examples, the access level manager 1770 may be configured as or otherwise support a means for receiving, from a second data provider, an access level request for data associated with at least one consent type for the user identifier. In some examples, the access level manager 1770 may be configured as or otherwise support a means for transmitting, to the second data provider, an access level response indicating a second access level of the second data provider.

In some examples, the access manager 1765 may be configured as or otherwise support a means for identifying a set of one or more data consumers accessing data associated with the user identifier according to the one or more consent types for the user identifier.

In some examples, the status manager 1775 may be configured as or otherwise support a means for receiving, from the data provider, a deactivate request for a subset of the one or more consent types for the user identifier. In some examples, the status manager 1775 may be configured as or otherwise support a means for updating the access level for the data provider to a deactivated status based at lest in part on the deactivate request.

In some examples, the status manager 1775 may be configured as or otherwise support a means for receiving, from the second network entity, a revocation request for a subset of the one or more consent types for the user identifier. In some examples, the status manager 1775 may be configured as or otherwise support a means for updating the access level associated with the subset of the one or more consent types to a revoked status based on the revocation request.

In some examples, the dynamic access manager 1780 may be configured as or otherwise support a means for receiving, from the data provider, a dynamic access request message requesting access to a portion of data associated with the user identifier. In some examples, the dynamic access manager 1780 may be configured as or otherwise support a means for transmitting, to the second network entity, the dynamic access request message that identifies the portion of the data associated with the user identifier and the at least one consent type of the one or more consent types. In some examples, the dynamic access manager 1780 may be configured as or otherwise support a means for receiving, from the second network entity, a dynamic access response that authorizes or rejects access to the portion of the data associated with the user identifier. In some examples, the dynamic access manager 1780 may be configured as or otherwise support a means for transmitting, to the data provider, the dynamic access response.

Figure 18:
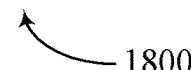
FIG. 18 shows a diagram of a system including a device that supports consent management procedures in accordance with one or more aspects of the present disclosure.

FIG. 18 shows a diagram of a system 1800 including a device 1805 that supports consent management procedures in accordance with one or more aspects of the present disclosure. The device 1805 may be an example of or include the components of a device 1505, a device 1605, or a network entity 105 as described herein. The device 1805 may communicate with one or more network entities 105, one or more UEs 115, or any combination thereof, which may include communications over one or more wired interfaces, over one or more wireless interfaces, or any combination thereof. The device 1805 may include components that support outputting and obtaining communications, such as a communications manager 1820, a transceiver 1810, an antenna 1815, a memory 1825, code 1830, and a processor 1835. These components may be in electronic communication or otherwise coupled (e.g., operatively, communicatively, functionally, electronically, electrically) via one or more buses (e.g., a bus 1840).

The transceiver 1810 may support bi-directional communications via wired links, wireless links, or both as described herein. In some examples, the transceiver 1810 may include a wired transceiver and may communicate bi-directionally with another wired transceiver. Additionally, or alternatively, in some examples, the transceiver 1810 may include a wireless transceiver and may communicate bi-directionally with another wireless transceiver. In some examples, the device 1805 may include one or more antennas 1815, which may be capable of transmitting or receiving wireless transmissions (e.g., concurrently). The transceiver 1810 may also include a modem to modulate signals, to provide the modulated signals for transmission (e.g., by one or more antennas 1815, by a wired transmitter), to receive modulated signals (e.g., from one or more antennas 1815, from a wired receiver), and to demodulate signals. The transceiver 1810, or the transceiver 1810 and one or more antennas 1815 or wired interfaces, where applicable, may be an example of a transmitter 1515, a transmitter 1615, a receiver 1510, a receiver 1610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1825 may include RAM and ROM. The memory 1825 may store computer-readable, computer-executable code 1830 including instructions that, when executed by the processor 1835, cause the device 1805 to perform various functions described herein. The code 1830 may be stored in a non-transitory computer-readable medium such as system memory or another type of memory. In some cases, the code 1830 may not be directly executable by the processor 1835 but may cause a computer (e.g., when compiled and executed) to perform functions described herein. In some cases, the memory 1825 may contain, among other things, a BIOS which may control basic hardware or software operation such as the interaction with peripheral components or devices.

The processor 1835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1835 may be configured to operate a memory array using a memory controller. In some other cases, a memory controller may be integrated into the processor 1835. The processor 1835 may be configured to execute computer-readable instructions stored in a memory (e.g., the memory 1825) to cause the device 1805 to perform various functions (e.g., functions or tasks supporting consent management procedures). For example, the device 1805 or a component of the device 1805 may include a processor 1835 and memory 1825 coupled with the processor 1835, the processor 1835 and memory 1825 configured to perform various functions described herein. The processor 1835 may be an example of a cloud-computing platform (e.g., one or more physical nodes and supporting software such as operating systems, virtual machines, or container instances) that may host the functions (e.g., by executing code 1830) to perform the functions of the device 1805.

In some examples, a bus 1840 may support communications of (e.g., within) a protocol layer of a protocol stack. In some examples, a bus 1840 may support communications associated with a logical channel of a protocol stack (e.g., between protocol layers of a protocol stack), which may include communications performed within a component of the device 1805, or between different components of the device 1805 that may be co-located or located in different locations (e.g., where the device 1805 may refer to a system in which one or more of the communications manager 1820, the transceiver 1810, the memory 1825, the code 1830, and the processor 1835 may be located in one of the different components or divided between different components).

In some examples, the communications manager 1820 may manage aspects of communications with a core network 130 (e.g., via one or more wired or wireless backhaul links). For example, the communications manager 1820 may manage the transfer of data communications for client devices, such as one or more UEs 115. In some examples, the communications manager 1820 may manage communications with other network entities 105, and may include a controller or scheduler for controlling communications with UEs 115 in cooperation with other network entities 105. In some examples, the communications manager 1820 may support an X2 interface within an LTE/LTE-A wireless communications network technology to provide communication between network entities 105.

The communications manager 1820 may support wireless communication at a first network entity in accordance with examples as disclosed herein. For example, the communications manager 1820 may be configured as or otherwise support a means for identifying a consent profile for a user identifier, the consent profile including one or more consent types for the user identifier that configure one or more consent parameters for the user identifier on at least a per-user basis. The communications manager 1820 may be configured as or otherwise support a means for receiving, from a second network entity, a request indicating the user identifier and requesting an access level for a data provider corresponding to at least one consent type of the one or more consent types. The communications manager 1820 may be configured as or otherwise support a means for transmitting, to the second network entity, a response indicating the access level based on the request and the one or more consent parameters for the at least one consent type.

Additionally, or alternatively, the communications manager 1820 may support wireless communication at a first network entity in accordance with examples as disclosed herein. For example, the communications manager 1820 may be configured as or otherwise support a means for receiving, from a UE, a consent profile registration request identifying a user identifier. The communications manager 1820 may be configured as or otherwise support a means for receiving, from the UE, a consent profile based on the consent profile registration request, the consent profile including one or more consent types for the user identifier that configure one or more consent parameters for the user identifier on a least a per-user basis. The communications manager 1820 may be configured as or otherwise support a means for transmitting, to a second network entity, the consent profile.

Additionally, or alternatively, the communications manager 1820 may support wireless communication at a first network entity in accordance with examples as disclosed herein. For example, the communications manager 1820 may be configured as or otherwise support a means for receiving, from a data provider, a first request requesting access to data associated with a user identifier, the data provider corresponding to at least one consent type of one or more consent types for the user identifier. The communications manager 1820 may be configured as or otherwise support a means for transmitting, to a second network entity, a second request indicating the user identifier and requesting an access level for the data provider. The communications manager 1820 may be configured as or otherwise support a means for receiving, from the second network entity, a first response indicating the access level. The communications manager 1820 may be configured as or otherwise support a means for transmitting, to the data provider, a second response indicating the access level.

By including or configuring the communications manager 1820 in accordance with examples as described herein, the device 1805 may support techniques for a consent platform implemented within a wireless communications system that provides or otherwise support granular end-user configuration of consent profile(s) for the end-user on at least an end-user basis, e.g., rather than solely on a per-subscription basis.

In some examples, the communications manager 1820 may be configured to perform various operations (e.g., receiving, obtaining, monitoring, outputting, transmitting) using or otherwise in cooperation with the transceiver 1810, the one or more antennas 1815 (e.g., where applicable), or any combination thereof. Although the communications manager 1820 is illustrated as a separate component, in some examples, one or more functions described with reference to the communications manager 1820 may be supported by or performed by the processor 1835, the memory 1825, the code 1830, the transceiver 1810, or any combination thereof. For example, the code 1830 may include instructions executable by the processor 1835 to cause the device 1805 to perform various aspects of consent management procedures as described herein, or the processor 1835 and the memory 1825 may be otherwise configured to perform or support such operations.

Figure 19:
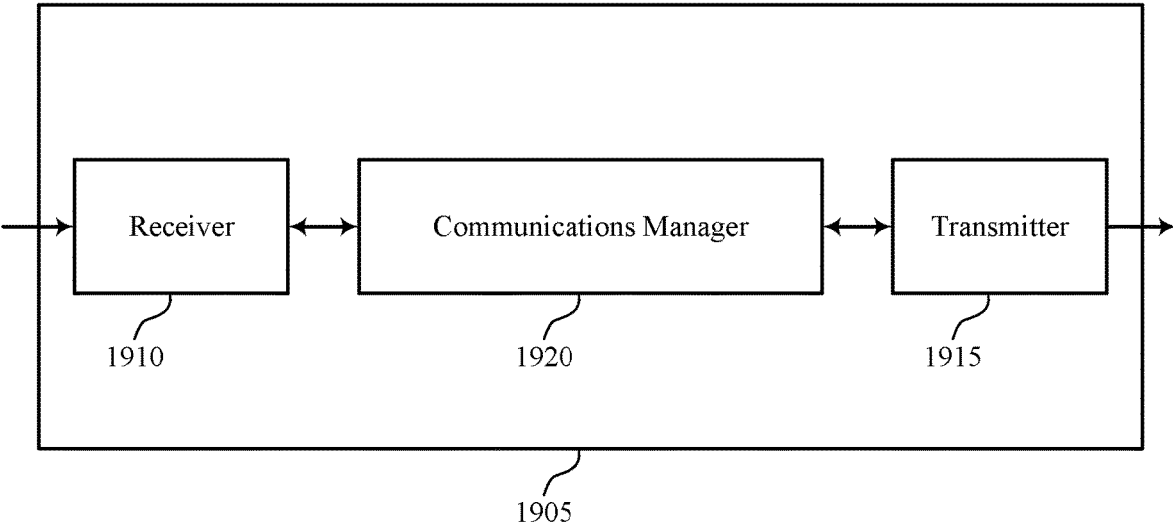
FIGS. 19 and 20 show block diagrams of devices that support consent management procedures in accordance with one or more aspects of the present disclosure.

FIG. 19 shows a block diagram 1900 of a device 1905 that supports consent management procedures in accordance with one or more aspects of the present disclosure. The device 1905 may be an example of aspects of a UE 115 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to consent management procedures). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to consent management procedures). In some examples, the transmitter 1915 may be co-located with a receiver 1910 in a transceiver module. The transmitter 1915 may utilize a single antenna or a set of multiple antennas.

The communications manager 1920, the receiver 1910, the transmitter 1915, or various combinations thereof or various components thereof may be examples of means for performing various aspects of consent management procedures as described herein. For example, the communications manager 1920, the receiver 1910, the transmitter 1915, or various combinations or components thereof may support a method for performing one or more of the functions described herein.

In some examples, the communications manager 1920, the receiver 1910, the transmitter 1915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1920, the receiver 1910, the transmitter 1915, or various combinations or components thereof may be implemented in code (e.g., as communications management software or firmware) executed by a processor. If implemented in code executed by a processor, the functions of the communications manager 1920, the receiver 1910, the transmitter 1915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1920 may be configured to perform various operations (e.g., receiving, obtaining, monitoring, outputting, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to obtain information, output information, or perform various other operations as described herein.

The communications manager 1920 may support wireless communication at a UE in accordance with examples as disclosed herein. For example, the communications manager 1920 may be configured as or otherwise support a means for transmitting, to a network entity, a consent profile registration request, the consent profile registration request identifying a user identifier. The communications manager 1920 may be configured as or otherwise support a means for transmitting, to the network entity, a consent profile based on the consent profile registration request, the consent profile including one or more consent types for the user identifier that configure one or more consent parameters for the user identifier on a least a per-user basis.

By including or configuring the communications manager 1920 in accordance with examples as described herein, the device 1905 (e.g., a processor controlling or otherwise coupled with the receiver 1910, the transmitter 1915, the communications manager 1920, or a combination thereof) may support techniques for a consent platform implemented within a wireless communications system that provides or otherwise support granular end-user configuration of consent profile(s) for the end-user on at least an end-user basis, e.g., rather than solely on a per-subscription basis.

Figure 20:
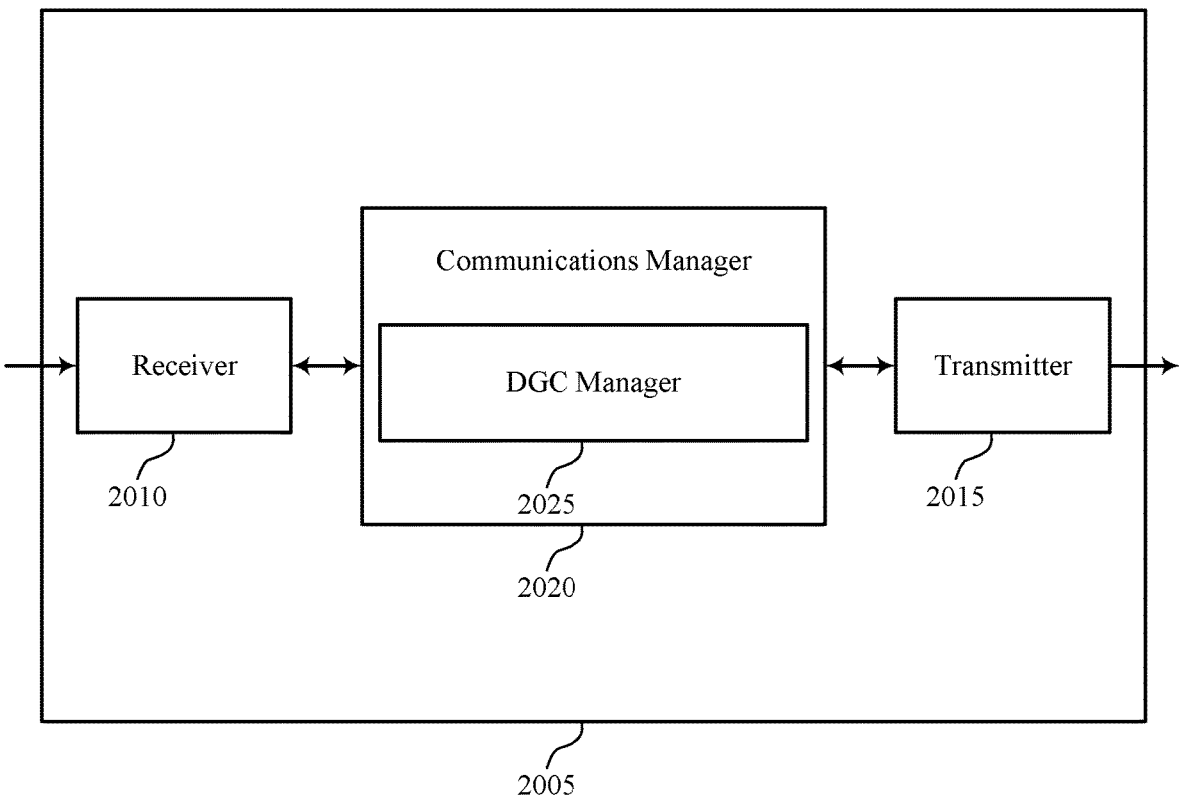

FIG. 20 shows a block diagram 2000 of a device 2005 that supports consent management procedures in accordance with one or more aspects of the present disclosure. The device 2005 may be an example of aspects of a device 1905 or a UE 115 as described herein. The device 2005 may include a receiver 2010, a transmitter 2015, and a communications manager 2020. The device 2005 may also include a processor. Each of these components may be in communication with one another (e.g., via one or more buses).

The receiver 2010 may provide a means for receiving information such as packets, user data, control information, or any combination thereof associated with various information channels (e.g., control channels, data channels, information channels related to consent management procedures). Information may be passed on to other components of the device 2005. The receiver 2010 may utilize a single antenna or a set of multiple antennas.

The transmitter 2015 may provide a means for transmitting signals generated by other components of the device 2005. For example, the transmitter 2015 may transmit information such as packets, user data, control information, or any combination thereof associated with various information channels (e.g., control channels, data channels, information channels related to consent management procedures). In some examples, the transmitter 2015 may be co-located with a receiver 2010 in a transceiver module. The transmitter 2015 may utilize a single antenna or a set of multiple antennas.

The device 2005, or various components thereof, may be an example of means for performing various aspects of consent management procedures as described herein. For example, the communications manager 2020 may include a DGC manager 2025, or any combination thereof. The communications manager 2020 may be an example of aspects of a communications manager 1920 as described herein. In some examples, the communications manager 2020, or various components thereof, may be configured to perform various operations (e.g., receiving, obtaining, monitoring, outputting, transmitting) using or otherwise in cooperation with the receiver 2010, the transmitter 2015, or both. For example, the communications manager 2020 may receive information from the receiver 2010, send information to the transmitter 2015, or be integrated in combination with the receiver 2010, the transmitter 2015, or both to obtain information, output information, or perform various other operations as described herein.

The communications manager 2020 may support wireless communication at a UE in accordance with examples as disclosed herein. The DGC manager 2025 may be configured as or otherwise support a means for transmitting, to a network entity, a consent profile registration request, the consent profile registration request identifying a user identifier. The DGC manager 2025 may be configured as or otherwise support a means for transmitting, to the network entity, a consent profile based on the consent profile registration request, the consent profile including one or more consent types for the user identifier that configure one or more consent parameters for the user identifier on a least a per-user basis.

Figure 21:
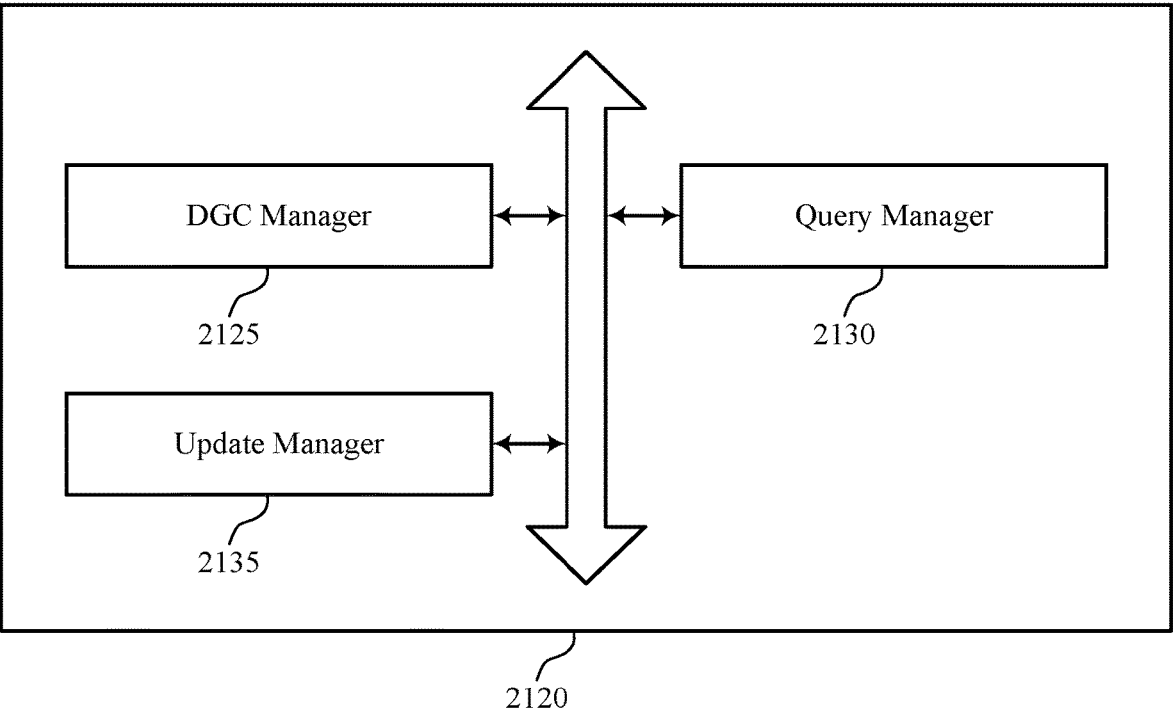
FIG. 21 shows a block diagram of a communications manager that supports consent management procedures in accordance with one or more aspects of the present disclosure.
Figure 21:

FIG. 21 shows a block diagram 2100 of a communications manager 2120 that supports consent management procedures in accordance with one or more aspects of the present disclosure. The communications manager 2120 may be an example of aspects of a communications manager 1920, a communications manager 2020, or both, as described herein. The communications manager 2120, or various components thereof, may be an example of means for performing various aspects of consent management procedures as described herein. For example, the communications manager 2120 may include a DGC manager 2125, a query manager 2130, an update manager 2135, or any combination thereof. Each of these components may communicate, directly or indirectly, with one another (e.g., via one or more buses).

The communications manager 2120 may support wireless communication at a UE in accordance with examples as disclosed herein. The DGC manager 2125 may be configured as or otherwise support a means for transmitting, to a network entity, a consent profile registration request, the consent profile registration request identifying a user identifier. In some examples, the DGC manager 2125 may be configured as or otherwise support a means for transmitting, to the network entity, a consent profile based on the consent profile registration request, the consent profile including one or more consent types for the user identifier that configure one or more consent parameters for the user identifier on a least a per-user basis.

In some examples, the query manager 2130 may be configured as or otherwise support a means for transmitting, to the network entity, a data collection query requesting a data access status associated with the consent profile. In some examples, the query manager 2130 may be configured as or otherwise support a means for receiving, from the network entity and based on the data collection query, a data collection response identifying a data provider accessing data associated with the consent profile.

In some examples, the update manager 2135 may be configured as or otherwise support a means for transmitting, to the network entity, an update message identifying updated parameters for at least one consent type of the one or more consent types. In some examples, the update manager 2135 may be configured as or otherwise support a means for receiving, from the network entity and based on the update message, an updated confirmation message confirming the updated parameters for the at least one consent type.

Figure 22:
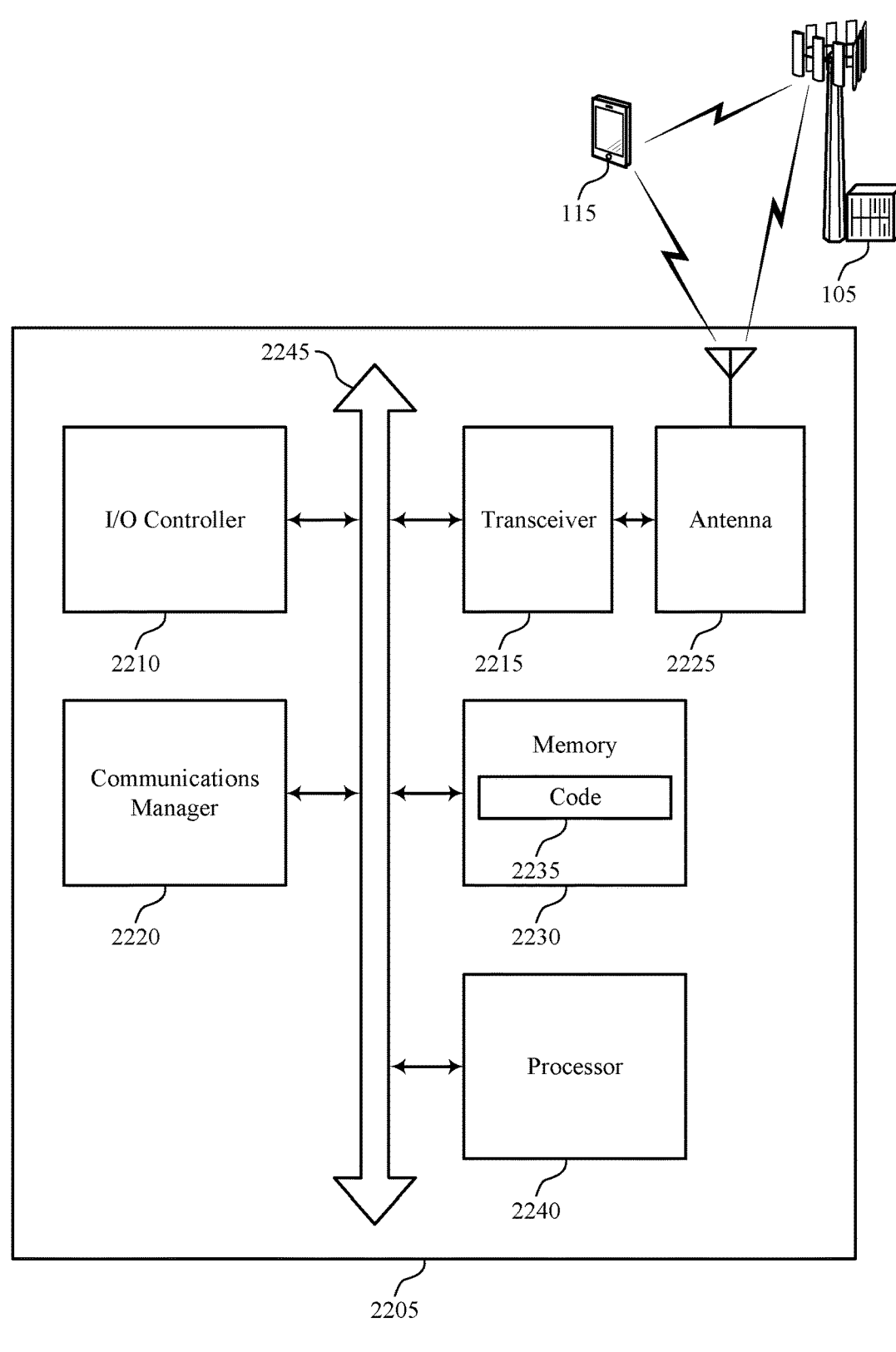
FIG. 22 shows a diagram of a system including a device that supports consent management procedures in accordance with one or more aspects of the present disclosure.

FIG. 22 shows a diagram of a system 2200 including a device 2205 that supports consent management procedures in accordance with one or more aspects of the present disclosure. The device 2205 may be an example of or include the components of a device 1905, a device 2005, or a UE 115 as described herein. The device 2205 may communicate (e.g., wirelessly) with one or more network entities 105, one or more UEs 115, or any combination thereof. The device 2205 may include components for bi-directional voice and data communications including components for transmitting and receiving communications, such as a communications manager 2220, an input/output (I/O) controller 2210, a transceiver 2215, an antenna 2225, a memory 2230, code 2235, and a processor 2240. These components may be in electronic communication or otherwise coupled (e.g., operatively, communicatively, functionally, electronically, electrically) via one or more buses (e.g., a bus 2245).

The I/O controller 2210 may manage input and output signals for the device 2205. The I/O controller 2210 may also manage peripherals not integrated into the device 2205. In some cases, the I/O controller 2210 may represent a physical connection or port to an external peripheral. In some cases, the I/O controller 2210 may utilize an operating system such as iOS®, ANDROID®, MS-DOS®, MS-WINDOWS®, OS/2®, UNIX®, LINUX®, or another known operating system. Additionally or alternatively, the I/O controller 2210 may represent or interact with a modem, a keyboard, a mouse, a touchscreen, or a similar device. In some cases, the I/O controller 2210 may be implemented as part of a processor, such as the processor 2240. In some cases, a user may interact with the device 2205 via the I/O controller 2210 or via hardware components controlled by the I/O controller 2210.

In some cases, the device 2205 may include a single antenna 2225. However, in some other cases, the device 2205 may have more than one antenna 2225, which may be capable of concurrently transmitting or receiving multiple wireless transmissions. The transceiver 2215 may communicate bi-directionally, via the one or more antennas 2225, wired, or wireless links as described herein. For example, the transceiver 2215 may represent a wireless transceiver and may communicate bi-directionally with another wireless transceiver. The transceiver 2215 may also include a modem to modulate the packets, to provide the modulated packets to one or more antennas 2225 for transmission, and to demodulate packets received from the one or more antennas 2225. The transceiver 2215, or the transceiver 2215 and one or more antennas 2225, may be an example of a transmitter 1915, a transmitter 2015, a receiver 1910, a receiver 2010, or any combination thereof or component thereof, as described herein.

The memory 2230 may include random access memory (RAM) and read-only memory (ROM). The memory 2230 may store computer-readable, computer-executable code 2235 including instructions that, when executed by the processor 2240, cause the device 2205 to perform various functions described herein. The code 2235 may be stored in a non-transitory computer-readable medium such as system memory or another type of memory. In some cases, the code 2235 may not be directly executable by the processor 2240 but may cause a computer (e.g., when compiled and executed) to perform functions described herein. In some cases, the memory 2230 may contain, among other things, a basic I/O system (BIOS) which may control basic hardware or software operation such as the interaction with peripheral components or devices.

The processor 2240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2240 may be configured to operate a memory array using a memory controller. In some other cases, a memory controller may be integrated into the processor 2240. The processor 2240 may be configured to execute computer-readable instructions stored in a memory (e.g., the memory 2230) to cause the device 2205 to perform various functions (e.g., functions or tasks supporting consent management procedures). For example, the device 2205 or a component of the device 2205 may include a processor 2240 and memory 2230 coupled with or to the processor 2240, the processor 2240 and memory 2230 configured to perform various functions described herein.

The communications manager 2220 may support wireless communication at a UE in accordance with examples as disclosed herein. For example, the communications manager 2220 may be configured as or otherwise support a means for transmitting, to a network entity, a consent profile registration request, the consent profile registration request identifying a user identifier. The communications manager 2220 may be configured as or otherwise support a means for transmitting, to the network entity, a consent profile based on the consent profile registration request, the consent profile including one or more consent types for the user identifier that configure one or more consent parameters for the user identifier on a least a per-user basis.

By including or configuring the communications manager 2220 in accordance with examples as described herein, the device 2205 may support techniques for a consent platform implemented within a wireless communications system that provides or otherwise support granular end-user configuration of consent profile(s) for the end-user on at least an end-user basis, e.g., rather than solely on a per-subscription basis.

In some examples, the communications manager 2220 may be configured to perform various operations (e.g., receiving, monitoring, transmitting) using or otherwise in cooperation with the transceiver 2215, the one or more antennas 2225, or any combination thereof. Although the communications manager 2220 is illustrated as a separate component, in some examples, one or more functions described with reference to the communications manager 2220 may be supported by or performed by the processor 2240, the memory 2230, the code 2235, or any combination thereof. For example, the code 2235 may include instructions executable by the processor 2240 to cause the device 2205 to perform various aspects of consent management procedures as described herein, or the processor 2240 and the memory 2230 may be otherwise configured to perform or support such operations.

FIG. 23 shows a flowchart illustrating a method 2300 that supports consent management procedures in accordance with one or more aspects of the present disclosure. The operations of the method 2300 may be implemented by a network entity or its components as described herein. For example, the operations of the method 2300 may be performed by a network entity as described with reference to FIGS. 1 through 18. In some examples, a network entity may execute a set of instructions to control the functional elements of the network entity to perform the described functions. Additionally, or alternatively, the network entity may perform aspects of the described functions using special-purpose hardware.

At 2305, the method may include identifying a consent profile for a user identifier, the consent profile including one or more consent types for the user identifier that configure one or more consent parameters for the user identifier on at least a per-user basis. The operations of 2305 may be performed in accordance with examples as disclosed herein. In some examples, aspects of the operations of 2305 may be performed by a (E)UDM manager 1725 as described with reference to FIG. 17.

At 2310, the method may include receiving, from a second network entity, a request indicating the user identifier and requesting an access level for a data provider corresponding to at least one consent type of the one or more consent types. The operations of 2310 may be performed in accordance with examples as disclosed herein. In some examples, aspects of the operations of 2310 may be performed by a (E)UDM manager 1725 as described with reference to FIG. 17.

At 2315, the method may include transmitting, to the second network entity, a response indicating the access level based on the request and the one or more consent parameters for the at least one consent type. The operations of 2315 may be performed in accordance with examples as disclosed herein. In some examples, aspects of the operations of 2315 may be performed by a (E)UDM manager 1725 as described with reference to FIG. 17.

FIG. 24 shows a flowchart illustrating a method 2400 that supports consent management procedures in accordance with one or more aspects of the present disclosure. The operations of the method 2400 may be implemented by a network entity or its components as described herein. For example, the operations of the method 2400 may be performed by a network entity as described with reference to FIGS. 1 through 18. In some examples, a network entity may execute a set of instructions to control the functional elements of the network entity to perform the described functions. Additionally, or alternatively, the network entity may perform aspects of the described functions using special-purpose hardware.

At 2405, the method may include receiving, from a UE, a consent profile registration request identifying a user identifier. The operations of 2405 may be performed in accordance with examples as disclosed herein. In some examples, aspects of the operations of 2405 may be performed by a DGS manager 1730 as described with reference to FIG. 17.

At 2410, the method may include receiving, from the UE, a consent profile based on the consent profile registration request, the consent profile including one or more consent types for the user identifier that configure one or more consent parameters for the user identifier on a least a per-user basis. The operations of 2410 may be performed in accordance with examples as disclosed herein. In some examples, aspects of the operations of 2410 may be performed by a DGS manager 1730 as described with reference to FIG. 17.

At 2415, the method may include transmitting, to a second network entity, the consent profile. The operations of 2415 may be performed in accordance with examples as disclosed herein. In some examples, aspects of the operations of 2415 may be performed by a DGS manager 1730 as described with reference to FIG. 17.

FIG. 25 shows a flowchart illustrating a method 2500 that supports consent management procedures in accordance with one or more aspects of the present disclosure. The operations of the method 2500 may be implemented by a UE or its components as described herein. For example, the operations of the method 2500 may be performed by a UE 115 as described with reference to FIGS. 1 through 14 and 19 through 22. In some examples, a UE may execute a set of instructions to control the functional elements of the UE to perform the described functions. Additionally, or alternatively, the UE may perform aspects of the described functions using special-purpose hardware.

At 2505, the method may include transmitting, to a network entity, a consent profile registration request, the consent profile registration request identifying a user identifier. The operations of 2505 may be performed in accordance with examples as disclosed herein. In some examples, aspects of the operations of 2505 may be performed by a DGC manager 2125 as described with reference to FIG. 21.

At 2510, the method may include transmitting, to the network entity, a consent profile based on the consent profile registration request, the consent profile including one or more consent types for the user identifier that configure one or more consent parameters for the user identifier on a least a per-user basis. The operations of 2510 may be performed in accordance with examples as disclosed herein. In some examples, aspects of the operations of 2510 may be performed by a DGC manager 2125 as described with reference to FIG. 21.

FIG. 26 shows a flowchart illustrating a method 2600 that supports consent management procedures in accordance with one or more aspects of the present disclosure. The operations of the method 2600 may be implemented by a network entity or its components as described herein. For example, the operations of the method 2600 may be performed by a network entity as described with reference to FIGS. 1 through 18. In some examples, a network entity may execute a set of instructions to control the functional elements of the network entity to perform the described functions. Additionally, or alternatively, the network entity may perform aspects of the described functions using special-purpose hardware.

At 2605, the method may include receiving, from a data provider, a first request requesting access to data associated with a user identifier, the data provider corresponding to at least one consent type of one or more consent types for the user identifier. The operations of 2605 may be performed in accordance with examples as disclosed herein. In some examples, aspects of the operations of 2605 may be performed by an CMF manager 1735 as described with reference to FIG. 17.

At 2610, the method may include transmitting, to a second network entity, a second request indicating the user identifier and requesting an access level for the data provider. The operations of 2610 may be performed in accordance with examples as disclosed herein. In some examples, aspects of the operations of 2610 may be performed by an CMF manager 1735 as described with reference to FIG. 17.

At 2615, the method may include receiving, from the second network entity, a first response indicating the access level. The operations of 2615 may be performed in accordance with examples as disclosed herein. In some examples, aspects of the operations of 2615 may be performed by an CMF manager 1735 as described with reference to FIG. 17.

At 2620, the method may include transmitting, to the data provider, a second response indicating the access level. The operations of 2620 may be performed in accordance with examples as disclosed herein. In some examples, aspects of the operations of 2620 may be performed by an CMF manager 1735 as described with reference to FIG. 17.

The following provides an overview of aspects of the present disclosure:

Aspect 1: A method for wireless communication at a first network entity, comprising: identifying a consent profile for a user ID, the consent profile comprising one or more consent types for the user ID that configure one or more consent parameters for the user ID on at least a per-user basis; receiving, from a second network entity, a request indicating the user ID and requesting an access level for a data provider corresponding to at least one consent type of the one or more consent types; and transmitting, to the second network entity, a response indicating the access level based at least in part on the request and the one or more consent parameters for the at least one consent type.

Aspect 2: The method of aspect 1, further comprising: storing the consent profile and a subscription ID for the user ID in a UDM entity, wherein the first network entity comprises the UDM entity.

Aspect 3: The method of any of aspects 1 through 2, further comprising: storing a subscription ID for the user ID in a UDM entity and the consent profile for the user ID in an end-user UDM entity, wherein the first network entity comprises the end-user UDM entity.

Aspect 4: The method of any of aspects 1 through 3, further comprising: receiving a consent profile ID from a third network entity associated with the first network entity, wherein identifying the consent profile for the user ID is based at least in part on receiving the consent profile ID.

Aspect 5: The method of aspect 4, wherein the consent profile ID maps the consent profile to a user associated with the user ID at a UE.

Aspect 6: The method of any of aspects 1 through 5, further comprising: receiving an update message identifying updated parameters for at least one consent type of the one or more consent types; and updating the one or more consent parameters for at least one consent type of the consent profile based at least in part on the update message.

Aspect 7: The method of aspect 6, wherein the update message is received from a third network entity or a UE associated with a consent profile ID of the consent profile.

Aspect 8: The method of any of aspects 1 through 7, further comprising: receiving, from the second network entity, an update message identifying an updated end-user device associated with the user ID; and updating the one or more consent parameters for the user ID to include the updated end-user device based at least in part on the update message.

Aspect 9: The method of any of aspects 1 through 8, wherein a subscription ID associated with the user ID comprises a fifth generation subscription permanent ID.

Aspect 10: The method of any of aspects 1 through 9, wherein a subscription ID associated with the user ID comprises a generic public subscription ID.

Aspect 11: The method of any of aspects 1 through 10, wherein the user ID is associated with a subscription ID, a consent profile ID, or both.

Aspect 12: The method of any of aspects 1 through 11, wherein the consent profile and a consent profile ID of the consent profile are determined based at least in part on a result of a FIDO authentication procedure for a user associated with the user ID.

Aspect 13: A method for wireless communication at a first network entity, comprising: receiving, from a UE, a consent profile registration request identifying a user ID; receiving, from the UE, a consent profile based at least in part on the consent profile registration request, the consent profile comprising one or more consent types for the user ID that configure one or more consent parameters for the user ID on a least a per-user basis; and transmitting, to a second network entity, the consent profile.

Aspect 14: The method of aspect 13, further comprising: receiving, from the UE, a data collection query requesting a data access status associated with a user associated with a consent profile ID of the consent profile; transmitting, to a third network entity, the data collection query and the user ID; receiving, from the third network entity, a data collection response based at least in part on the data collection query and the user ID, the data collection response identifying a data provider accessing data associated with the consent profile; and transmitting, to the UE, the data collection response based at least in part on the data collection query.

Aspect 15: A method for wireless communication at a UE, comprising: transmitting, to a network entity, a consent profile registration request, the consent profile registration request identifying a user ID; and transmitting, to the network entity, a consent profile based at least in part on the consent profile registration request, the consent profile comprising one or more consent types for the user ID that configure one or more consent parameters for the user ID on a least a per-user basis.

Aspect 16: The method of aspect 15, further comprising: transmitting, to the network entity, a data collection query requesting a data access status associated with the consent profile; and receiving, from the network entity and based at least in part on the data collection query, a data collection response identifying a data provider accessing data associated with the consent profile.

Aspect 17: The method of any of aspects 15 through 16, further comprising: transmitting, to the network entity, an update message identifying updated parameters for at least one consent type of the one or more consent types; and receiving, from the network entity and based at least in part on the update message, an updated confirmation message confirming the updated parameters for the at least one consent type.

Aspect 18: A method for wireless communication at a first network entity, comprising: receiving, from a data provider, a first request requesting access to data associated with a user ID, the data provider corresponding to at least one consent type of one or more consent types for the user ID; transmitting, to a second network entity, a second request indicating the user ID and requesting an access level for the data provider; receiving, from the second network entity, a first response indicating the access level; and transmitting, to the data provider, a second response indicating the access level.

Aspect 19: The method of aspect 18, further comprising: transmitting, to the data provider, an indication to permit access to at least a portion of data associated with the user ID based at least in part on the second response, wherein at least the portion of the data is based at least in part on the access level.

Aspect 20: The method of any of aspects 18 through 19, further comprising: receiving, from a second data provider, an access level request for data associated with at least one consent type for the user ID; and transmitting, to the second data provider, an access level response indicating a second access level of the second data provider.

Aspect 21: The method of any of aspects 18 through 20, further comprising: identifying a set of one or more data consumers accessing data associated with the user ID according to the one or more consent types for the user ID.

Aspect 22: The method of any of aspects 18 through 21, further comprising: receiving, from the data provider, a deactivate request for a subset of the one or more consent types for the user ID; and updating the access level for the data provider to a deactivated status based at lest in part on the deactivate request.

Aspect 23: The method of any of aspects 18 through 22, further comprising: receiving, from the second network entity, a revocation request for a subset of the one or more consent types for the user ID; and updating the access level associated with the subset of the one or more consent types to a revoked status based at least in part on the revocation request.

Aspect 24: The method of any of aspects 18 through 23, further comprising: receiving, from the data provider, a dynamic access request message requesting access to a portion of data associated with the user ID; transmitting, to the second network entity, the dynamic access request message that identifies the portion of the data associated with the user ID and the at least one consent type of the one or more consent types; receiving, from the second network entity, a dynamic access response that authorizes or rejects access to the portion of the data associated with the user ID; and transmitting, to the data provider, the dynamic access response.

Aspect 25: An apparatus for wireless communication at a first network entity, comprising a processor; memory coupled with the processor; and instructions stored in the memory and executable by the processor to cause the apparatus to perform a method of any of aspects 1 through 12.

Aspect 26: An apparatus for wireless communication at a first network entity, comprising at least one means for performing a method of any of aspects 1 through 12.

Aspect 27: A non-transitory computer-readable medium storing code for wireless communication at a first network entity, the code comprising instructions executable by a processor to perform a method of any of aspects 1 through 12.

Aspect 28: An apparatus for wireless communication at a first network entity, comprising a processor; memory coupled with the processor; and instructions stored in the memory and executable by the processor to cause the apparatus to perform a method of any of aspects 13 through 14.

Aspect 29: An apparatus for wireless communication at a first network entity, comprising at least one means for performing a method of any of aspects 13 through 14.

Aspect 30: A non-transitory computer-readable medium storing code for wireless communication at a first network entity, the code comprising instructions executable by a processor to perform a method of any of aspects 13 through 14.

Aspect 31: An apparatus for wireless communication at a UE, comprising a processor; memory coupled with the processor; and instructions stored in the memory and executable by the processor to cause the apparatus to perform a method of any of aspects 15 through 17.

Aspect 32: An apparatus for wireless communication at a UE, comprising at least one means for performing a method of any of aspects 15 through 17.

Aspect 33: A non-transitory computer-readable medium storing code for wireless communication at a UE, the code comprising instructions executable by a processor to perform a method of any of aspects 15 through 17.

Aspect 34: An apparatus for wireless communication at a first network entity, comprising a processor; memory coupled with the processor; and instructions stored in the memory and executable by the processor to cause the apparatus to perform a method of any of aspects 18 through 24.

Aspect 35: An apparatus for wireless communication at a first network entity, comprising at least one means for performing a method of any of aspects 18 through 24.

Aspect 36: A non-transitory computer-readable medium storing code for wireless communication at a first network entity, the code comprising instructions executable by a processor to perform a method of any of aspects 18 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first network entity, comprising:

identifying a consent profile for a user identifier associated with an end-user, the consent profile comprising one or more consent types for the user identifier that configure one or more consent parameters for the user identifier on at least a per-user basis, wherein the one or more consent parameters configured on at least the per-user basis are for application across one or more end-user devices associated with the consent profile of the end-user;

receiving, from a second network entity, a request indicating the user identifier and requesting an access level for a data provider corresponding to at least one consent type of the one or more consent types;

transmitting, to the second network entity, a response indicating the access level based at least in part on the request and the one or more consent parameters for the at least one consent type;

receiving an update message identifying updated parameters for at least one consent type of the one or more consent types, wherein the update message is received from a third network entity associated with a consent profile identifier of the consent profile; and updating the one or more consent parameters for at least one consent type of the consent profile based at least in part on the update message.

2. The method of claim 1, further comprising:

storing the consent profile and a subscription identifier for the user identifier in a unified data management entity, wherein the first network entity comprises the unified data management entity.

3. The method of claim 1, further comprising:

storing a subscription identifier for the user identifier in a unified data management entity and the consent profile for the user identifier in an end-user unified data management entity, wherein the first network entity comprises the end-user unified data management entity.

4. The method of claim 1, further comprising:

receiving the consent profile identifier from the third network entity associated with the first network entity, wherein identifying the consent profile for the user identifier is based at least in part on receiving the consent profile identifier.

5. The method of claim 4, wherein the consent profile identifier maps the consent profile to the end-user associated with the user identifier at a user equipment (UE).

6. The method of claim 1, further comprising:

receiving, from the second network entity, an update message identifying an updated end-user device associated with the user identifier; and updating the one or more consent parameters for the user identifier to include the updated end-user device based at least in part on the update message.

7. The method of claim 1, wherein a subscription identifier associated with the user identifier comprises a fifth generation subscription permanent identifier.

8. The method of claim 1, wherein a subscription identifier associated with the user identifier comprises a generic public subscription identifier.

9. The method of claim 1, wherein the user identifier is associated with a subscription identifier, the consent profile identifier, or both.

10. The method of claim 1, wherein the consent profile and the consent profile identifier of the consent profile are determined based at least in part on a result of a Fast Identity Online (FIDO) authentication procedure for the end-user associated with the user identifier.

11. A method for wireless communication at a first network entity, comprising:

receiving, from a user equipment (UE), a consent profile registration request identifying a user identifier associated with an end-user;

receiving, from the UE, a consent profile based at least in part on the consent profile registration request, the consent profile comprising one or more consent types for the user identifier that configure one or more consent parameters for the user identifier on a least a per-user basis, wherein the one or more consent parameters configured on at least the per-user basis are for application across one or more end-user devices associated with the consent profile of the end-user;

transmitting, to a second network entity, the consent profile;

receiving, from a third network entity associated with a consent profile identifier of the consent profile, an update message identifying updated parameters for at least one consent type of the one or more consent types; and transmitting, to the UE and based at least in part on the update message, an updated confirmation message confirming the updated parameters for the at least one consent type.

12. The method of claim 11, further comprising:

receiving, from the UE, a data collection query requesting a data access status associated with the end-user associated with the consent profile identifier of the consent profile;

transmitting, to the third network entity, the data collection query and the user identifier;

receiving, from the third network entity, a data collection response based at least in part on the data collection query and the user identifier, the data collection response identifying a data provider accessing data associated with the consent profile; and transmitting, to the UE, the data collection response based at least in part on the data collection query.

13. A method for wireless communication at a user equipment (UE), comprising:

transmitting, to a network entity, a consent profile registration request, the consent profile registration request identifying a user identifier associated with an end-user;

transmitting, to the network entity, a consent profile based at least in part on the consent profile registration request, the consent profile comprising one or more consent types for the user identifier that configure one or more consent parameters for the user identifier on a least a per-user basis, wherein the one or more consent parameters configured on at least the per-user basis are for application across one or more end-user devices associated with the consent profile of the end-user;

transmitting, to a second network entity, an update message identifying updated parameters for at least one consent type of the one or more consent types; and receiving, from the network entity and based at least in part on the update message, an updated confirmation message confirming the updated parameters for the at least one consent type.

14. The method of claim 13, further comprising:

transmitting, to the network entity, a data collection query requesting a data access status associated with the consent profile; and receiving, from the network entity and based at least in part on the data collection query, a data collection response identifying a data provider accessing data associated with the consent profile.

15. A method for wireless communication at a first network entity, comprising:

receiving, from a data provider, a first request requesting access to data associated with a user identifier associated with an end-user, the data provider corresponding to at least one consent type of one or more consent types for the user identifier, wherein the one or more consent types configure one or more consent parameters for the user identifier on at least a per-user basis, wherein the one or more consent parameters configured on at least the per-user basis are for application across one or more end-user devices associated with the at least one consent type of the end-user;

transmitting, to a second network entity, a second request indicating the user identifier and requesting an access level for the data provider;

receiving, from the second network entity, a first response indicating the access level;

transmitting, to the data provider, a second response indicating the access level;

receiving, from the second network entity, an update message identifying updated parameters for at least one consent type of the one or more consent types; and transmitting, to the data provider, the update message identifying the updated parameters for at least one consent type of the one or more consent types.

16. The method of claim 15, further comprising:

transmitting, to the data provider, an indication to permit access to at least a portion of data associated with the user identifier based at least in part on the second response, wherein at least the portion of the data is based at least in part on the access level.

17. The method of claim 15, further comprising:

receiving, from a second data provider, an access level request for data associated with at least one consent type for the user identifier; and transmitting, to the second data provider, an access level response indicating a second access level of the second data provider.

18. The method of claim 15, further comprising:

identifying a set of one or more data consumers accessing data associated with the user identifier according to the one or more consent types for the user identifier.

19. The method of claim 15, further comprising:

receiving, from the data provider, a deactivate request for a subset of the one or more consent types for the user identifier; and updating the access level for the data provider to a deactivated status based at least in part on the deactivate request.

20. The method of claim 15, further comprising:

receiving, from the second network entity, a revocation request for a subset of the one or more consent types for the user identifier; and updating the access level associated with the subset of the one or more consent types to a revoked status based at least in part on the revocation request.

21. The method of claim 15, further comprising:

receiving, from the data provider, a dynamic access request message requesting access to a portion of data associated with the user identifier;

transmitting, to the second network entity, the dynamic access request message that identifies the portion of the data associated with the user identifier and the at least one consent type of the one or more consent types;

receiving, from the second network entity, a dynamic access response that authorizes or rejects access to the portion of the data associated with the user identifier; and transmitting, to the data provider, the dynamic access response.

* * * * *